US007729892B2

(12) United States Patent
Tobita et al.

(10) Patent No.: US 7,729,892 B2
(45) Date of Patent: Jun. 1, 2010

(54) SIMULATION PARAMETER DETERMINATION METHOD

(75) Inventors: Motoi Tobita, Kodaira (JP); Shirun Ho, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 11/806,195

(22) Filed: May 30, 2007

(65) Prior Publication Data

US 2007/0288175 A1 Dec. 13, 2007

(30) Foreign Application Priority Data

May 30, 2006 (JP) ............................ 2006-149108

(51) Int. Cl.
*G06F 17/10* (2006.01)

(52) U.S. Cl. ............................ 703/2; 702/27; 345/419

(58) Field of Classification Search .................... 703/2, 703/13, 18; 702/1, 22, 127, 179, 189, 27; 345/419

See application file for complete search history.

(56) References Cited

U.S. PATENT DOCUMENTS 5,980,096 A * 11/1999 Thalhammer-Reyero .... 707/100
6,983,227 B1 * 1/2006 Thalhammer-Reyero ....... 703/2
7,047,171 B1 * 5/2006 Sproch ........................ 703/12
2003/0167159 A1 * 9/2003 Goddard et al. ............... 703/12
2005/0119837 A1 * 6/2005 Prakash et al. ................ 702/27
2005/0171746 A1 * 8/2005 Thalhammer-Reyero ....... 703/2

OTHER PUBLICATIONS

Motoi Tobita et al., "BirdsAnts: A Protein-Small Molecule Interaction Viewer", Chem-Bio Informatics Journal, 2006, vol. 6, No. 1, pp. 17-28.

Vincenzo Barone et al., "a New Definition of Cavities for the Computation of Solvation Free Energies by the Polarizable Continuum Model", J. Chem. Phys. vol. 107, No. 8 (Aug. 22, 1997), pp. 3210-3221.

* cited by examiner

*Primary Examiner*—Russell Frejd
(74) *Attorney, Agent, or Firm*—Stites & Harbison PLLC; Juan Carlos A. Marquez, Esq.

(57) ABSTRACT

Provided is a method for reducing the amount of calculation time required for parameter determination, and for reducing the amount of calculation time required for parameter determination in satisfaction with a desired accuracy. The method includes preferentially selecting analysis objects, which are capable of providing parameter determination within a high degree of certainty, and controlling a calculation order of the selected analysis objects using a calculation order list.

10 Claims, 36 Drawing Sheets

POLARIZABLE CONTINUUM MODEL AND PARAMETERS USED IN THE MODEL

FLOWCHART OF THE ATOMIC PARAMETERS DETERMINATION METHOD USING A GRADIENT MATRIX

DETAILS OF PROCESS IN THE MATRIX GENERATION STEP, MATRIX-EQUATION SOLVING STEP, AND ATOMIC PARAMETERS UPDATE STEP IN THE ATOMIC PARAMETER DETERMINATION METHOD USING A GRADIENT MATRIX

FIG. 4

ATOMIC TYPE DEFINITION, DETERMINED PARAMETER VALUES, AND ATOMIC TYPES CORRESPONDING TO EACH MOLECULE IN THE ATOMIC PARAMETER DETERMINATION METHOD USING A GRADIENT MATRIX

| NUMBER | MOLECULE | $CH_3$ (C) 2.1266 | $CH_3$ (N) 1.8499 | $CH_2$ (CC) 2.0234 | $CH_2$ (CN) 1.7341 | $NH_2$ (C) 1.6564 | $NH_2$ (N) 1.6347 |
|---|---|---|---|---|---|---|---|
| 1 | $CH_3-CH_3$ | ○ | | | | | |
| 2 | $CH_3-NH_2$ | | ○ | | | ○ | |
| 3 | $NH_2-NH_2$ | | | | | | ○ |
| 4 | $C_3H_8$ | ○ | | ○ | | | |
| 5 | $CH_3-CH_2-CH_3$ | ○ | | ○ | | | |
| 6 | $CH_3-CH_2-NH_2$ | ○ | | | ○ | ○ | |
| 7 | $CH_3-CH_2-CH_2-CH_3$ | ○ | | ○ | | | |
| 8 | $CH_3-CH_2-CH_2-NH_2$ | ○ | | ○ | ○ | ○ | |
| 9 | $(CH_3)_4-C$ | ○ | | | | | |
| 10 | $C_5H_{12}$ | | | ○ | | | |

FLOWCHART OF THE PARAMETERS DETERMINATION METHOD USING A GRADIENT MATRIX

DETAILS OF PROCESS IN THE MATRIX GENERATION STEP MATRIX-EQUATION SOLVING STEP, AND ELEMENTAL PARAMETERS UPDATE STEP IN THE PARAMETER DETERMINATION METHOD USING A GRADIENT MATRIX

DETAILS OF PROCESS IN CALCULATION ORDER LIST GENERATION STEP, ONE-VARIABLE EQUATION SOLVING STEP, AND ATOMIC PARAMETERS UPDATE STEP IN THE ATOMIC PARAMETER DETERMINATION METHOD

| | |
|---|---|
| ● :VALUE ASSIGNED | ○ :VALUE NOT ASSIGNED (UNDETERMINED) |

910 911

FIG. 10
INPUT OF MOLECULAR INFORMATION
| | ITEM | EXAMPLE | |
|---|---|---|---|
| 1001 | THREE-DIMENSIONAL COODINATES OF THE MOLECULE | 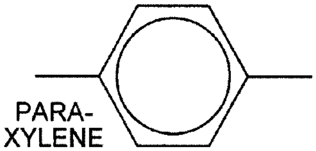 PARA-XYLENE | 1002 |
| 1003 | E : EXPERIMENTAL VALUE OF SOLVATION ENERGY | -0.80 kcal/mol | 1004 |
| 1005 | THE NUMBER OF ATOMIC PARAMETERS | 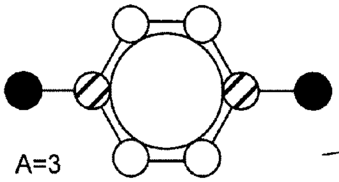 A=3 | 1006 |

INITIALIZATION OF ATOMIC PARAMETERS

HARDWARE CONTROL APPROACH IN THE ONE-VARIABLE EQUATION SOLVING STEP

AN EXAMPLE OF ATOMIC PARAMETERS UPDATE IN THE CASE THAT VALUE OF ATOMIC PARAMETER IS EXPRESSED BY A LINEAR FUNCTION OF VALUES OF TWO ATOMIC ATTRIBUTES

FIG. 16A

ATOMIC TYPE DEFINITION USED IN THE APPLICATION OF THIS INVENTION, PROCESS OF ATOMIC PARAMETER VALUES DETERMINATION, AND ATOMIC TYPE CORRESPONDING TO EACH MOLECULE (1/2)

| NUMBER | MOLECULE | UNDETERMINED | $CH_3$ | $CH_2$ | $NH_2$ |
|---|---|---|---|---|---|
| | | | UNDETERMINED | UNDETERMINED | UNDETERMINED |
| 1 | $CH_3-CH_3$ | 1 | ●2.1189 | | |
| 9 | $(CH_3)_4-C$ | 1 | ●2.1126 | | |
| 4 | $C_3H_6$ | 1 | | ●2.0120 | |
| 10 | $C_6H_{12}$ | 1 | | ●2.0903 | |
| 3 | $NH_2-NH_2$ | 1 | | | ●1.6301 |
| 7 | $CH_3-CH_2-CH_2-CH_3$ | 2 | ○ | ○ | |
| 5 | $CH_3-CH_2-CH_3$ | 2 | ○ | ○ | |
| 2 | $CH_3-NH_2$ | 2 | ○ | | ○ |
| 6 | $CH_3-CH_2-NH_2$ | 3 | ○ | ○ | ○ |
| 8 | $CH_3-CH_2-CH_2-NH_2$ | 3 | ○ | ○ | ○ |

ATOMIC TYPE DEFINITION USED IN THE APPLICATION OF THIS INVENTION, PROCESS OF ATOMIC PARAMETER VALUES DETERMINATION, AND ATOMIC TYPE CORRESPONDING TO EACH MOLECULE (1/2)

1605 1606

| NUMBER | MOLECULE | UNDETERMINED | $CH_3$ | $CH_2$ | $NH_2$ |
|---|---|---|---|---|---|
| | | | -2.0323 * I+4.5674 | 3.8382 * I-2.9689 | UNDETERMINED |
| 1 | $CH_3-CH_3$ | 0 | ●2.1189 | | |
| 9 | $(CH_3)_4-C$ | 0 | ●2.1126 | | |
| 4 | $C_3H_6$ | 0 | | ●2.0120 | |
| 10 | $C_6H_{12}$ | 0 | | ●2.0903 | |
| 3 | $NH_2-NH_2$ | 0 | | | ●1.6301 |
| 7 | $CH_3-CH_2-CH_2-CH_3$ | 0 | ●2.1173 | ●2.0833 | |
| 5 | $CH_3-CH_2-CH_3$ | 0 | ●2.1171 | ●2.0799 | |
| 2 | $CH_3-NH_2$ | 1 | ●2.1486 | | ○ |
| 6 | $CH_3-CH_2-NH_2$ | 1 | ●2.1148 | ●2.0177 | ○ |
| 8 | $CH_3-CH_2-CH_2-NH_2$ | 1 | ●2.1175 | ●2.0875, 2.0215 | ○ |

ATOMIC TYPE DEFINITION USED IN THE APPLICATION OF THIS INVENTION, PROCESS OF ATOMIC PARAMETER VALUES DETERMINATION, AND ATOMIC TYPE CORRESPONDING TO EACH MOLECULE (2/2)

| NUMBER | MOLECULE | UNDETERMINED | $CH_3$ | $CH_2$ | $NH_2$ |
|---|---|---|---|---|---|
| | | | -2.0323 * I+4.5674 | 3.8382 * I-2.9689 | UNDETERMINED |
| 1 | $CH_3-CH_3$ | 0 | ●2.1189 | | |
| 9 | $(CH_3)_4-C$ | 0 | ●2.1126 | | |
| 4 | $C_3H_6$ | 0 | | ●2.0120 | |
| 10 | $C_6H_{12}$ | 0 | | ●2.0903 | |
| 3 | $NH_2-NH_2$ | 0 | | | ●1.6301 |
| 7 | $CH_3-CH_2-CH_2-CH_3$ | 0 | ●2.1173 | ●2.0833 | |
| 5 | $CH_3-CH_2-CH_3$ | 0 | ●2.1171 | ●2.0799 | |
| 2 | $CH_3-NH_2$ | 1 | ●2.1486 | | ●1.5812 |
| 6 | $CH_3-CH_2-NH_2$ | 1 | ●2.1148 | ●2.0177 | ●1.5692 |
| 8 | $CH_3-CH_2-CH_2-NH_2$ | 1 | ●2.1175 | ●2.0875, 2.0215 | ●1.5747 |

ATOMIC TYPE DEFINITION USED IN THE APPLICATION OF THIS INVENTION, PROCESS OF ATOMIC PARAMETER VALUES DETERMINATION, AND ATOMIC TYPE CORRESPONDING TO EACH MOLECULE (2/2)

| NUMBER | MOLECULE | UNDETERMINED | $CH_3$ | $CH_2$ | $NH_2$ |
|---|---|---|---|---|---|
| | | | -2.0323 * l+4.5674 | 3.8382 * l-2.9689 | 0.2943 * q+1.8561 |
| 1 | $CH_3-CH_3$ | 0 | ●2.1189 | | |
| 9 | $(CH_3)_4-C$ | 0 | ●2.1126 | | |
| 4 | $C_3H_6$ | 0 | | ●2.0120 | |
| 10 | $C_6H_{12}$ | 0 | | ●2.0903 | |
| 3 | $NH_2-NH_2$ | 0 | | | ●1.6301 |
| 7 | $CH_3-CH_2-CH_2-CH_3$ | 0 | ●2.1173 | ●2.0833 | |
| 5 | $CH_3-CH_2-CH_3$ | 0 | ●2.1171 | ●2.0799 | |
| 2 | $CH_3-NH_2$ | 1 | ●2.1486 | | ●1.5812 |
| 6 | $CH_3-CH_2-NH_2$ | 1 | ●2.1148 | ●2.0177 | ●1.5692 |
| 8 | $CH_3-CH_2-CH_2-NH_2$ | 1 | ●2.1175 | ●2.0875, 2.0215 | ●1.5747 |

COMPARISON OF SOLVATION ENERGY PREDICTION ACCURACY

| MOLECULE (1801) | EXPERIMENTAL VALUE /kcal/mol (1802) | CALCULATION EEROR (PRIOR ART) /kcal/mol (1803) | CALCULATION EEROR (THIS INVENTION) /kcal/mol (1804) |
|---|---|---|---|
| $CH_3$-$CH_2$-$CH_2$-$CH_2$-$CH_3$ | 2.33 | -0.16 | 0.09 |
| $CH_3$-$CH_2$-$CH_2$-$CH_2$-$CH_2$-$CH_3$ | 2.49 | -0.13 | 0.20 |
| $CH_3$-$CH_2$-$CH_2$-$CH_2$-$NH_2$ | -4.09 | 0.26 | 0.00 |
| $CH_3$-$CH_2$-$CH_2$-$CH_2$-$CH_2$-$NH_2$ | -4.04 | 0.25 | -0.06 |
| $CH_3$-$CH_2$-C-$(CH_3)_3$ | 2.59 | 0.38 | 0.31 |
| $NH_2$-$CH_2$-$CH_2$-$NH_2$ | -9.75 | -0.29 | -0.62 |
| MEAN ABSOLUTE ERROR (1808) | — | 0.25 | 0.21 |

DETAILS OF PROCESS IN CALCULATION ORDER LIST GENERATION STEP, ONE-VARIABLE EQUATION SOLVING STEP, AND ELEMENTAL PARAMETERS UPDATE STEP IN THE ATOMIC PARAMETER DETERMINATION METHOD

FLOWCHART OF THE ATOMIC PARAMETER DETERMINATION METHOD UNDER THE FIXED ACCEPTABLE ERROR CONDITION

DETAILS OF PROCESSES IN CALCULATION ORDER LIST GENERATION STEP, ONE-VARIABLE EQUATION SOLVING STEP, AND ATOMIC PARAMETERS UPDATE STEP IN THE ATOMIC PARAMETER DETERMINATION METHOD UNDER THE FIXED ACCEPTABLE ERROR CONDITION

DETAILS OF CALCULATION ORDER LIST UPDATE STEP

AN EXAMPLE OF ATOMIC PARAMETERS UPDATE IN THE CASE THAT VALUE OF ATOMIC PARAMETER IS EXPRESSED BY A LINEAR FUNCTION OF A VALUE OF AN ATOMIC ATTRIBUTE

AN EXAMPLE OF ATOMIC PARAMETERS UPDATE IN THE CASE THAT VALUE OF ATOMIC PARAMETER IS EXPRESSED BY A LINEAR FUNCTION OF A VALUE OF AN ATOMIC ATTRIBUTE

AN EXAMPLE OF ATOMIC PARAMETERS UPDATE IN THE CASE THAT VALUE OF ATOMIC PARAMETER IS EXPRESSED BY A LINEAR FUNCTION OF VALUES OF TWO ATOMIC ATTRIBUTES

AN EXAMPLE OF ATOMIC PARAMETERS UPDATE IN THE CASE THAT VALUE OF ATOMIC PARAMETER IS EXPRESSED BY A LINEAR FUNCTION OF VALUES OF TWO ATOMIC ATTRIBUTES

FIG. 26

COMPARISON OF THE AMOUNT OF CALCULATION WHEN THE NUMBER OF MOLECULES N USED IN THE ATOMIC PARAMETER DETERMINATION IS SUFFICIENTLY LARGE

| | CALCULATION ORDER | THE AMOUNT OF CALCULATION FOR MOLECULE n IN THE PRIOR ART (2603) | THE AMOUNT OF CALCULATION FOR MOLECULE n IN THIS INVENTION (2604) | f(A(n)) (2605) |
|---|---|---|---|---|
| 2601 | THE EARLY STAGE (n : SMALL) | $l(1+p(n))f(A(n))$ | $(1+l'(n))f(A(n))$ | SMALL |
| 2602 | THE LAST STAGE (n : LARGE) | $l(1+p(n))f(A(n))$ | $f(A(n))$ | LARGE |

FIG. 27

COMPARISON OF THE AMOUNT OF CALCULATION BETWEEN PRIOR ART AND THIS INVENTION IN THE ATOMIC PARAMETER DETERMINATION METHOD USING 63 MOLECULES

| THE AVERAGED NUMBER OF ITERATION I (2701) | THE AMOUNT OF CALCULATION (THIS INVENTION) / min (2702) | THE LOWER BOUND OF THE AMOUNT OF CALCULATION (PRIOR ART) / min (2703) |
|---|---|---|
| 3.32 | 504 | 3,183 |

FLOWCHART OF SIMULATION PARAMETER DETERMINATION METHOD UNDER THE FIXED ACCEPTABLE ERROR CONDITION

DETAILS OF PROCESSES IN CALCULATION ORDER LIST GENERATION STEP, ONE-VARIABLE EQUATION SOLVING STEP, AND ELEMENTAL PARAMETERS UPDATE STEP IN THE ATOMIC PARAMETER DETERMINATION METHOD UNDER THE FIXED ACCEPTABLE ERROR CONDITION

AN EXAMPLE OF SCREEN DISPLAY IN THE CALCULATION ORDER LIST DISPALY STEP

FIG. 32

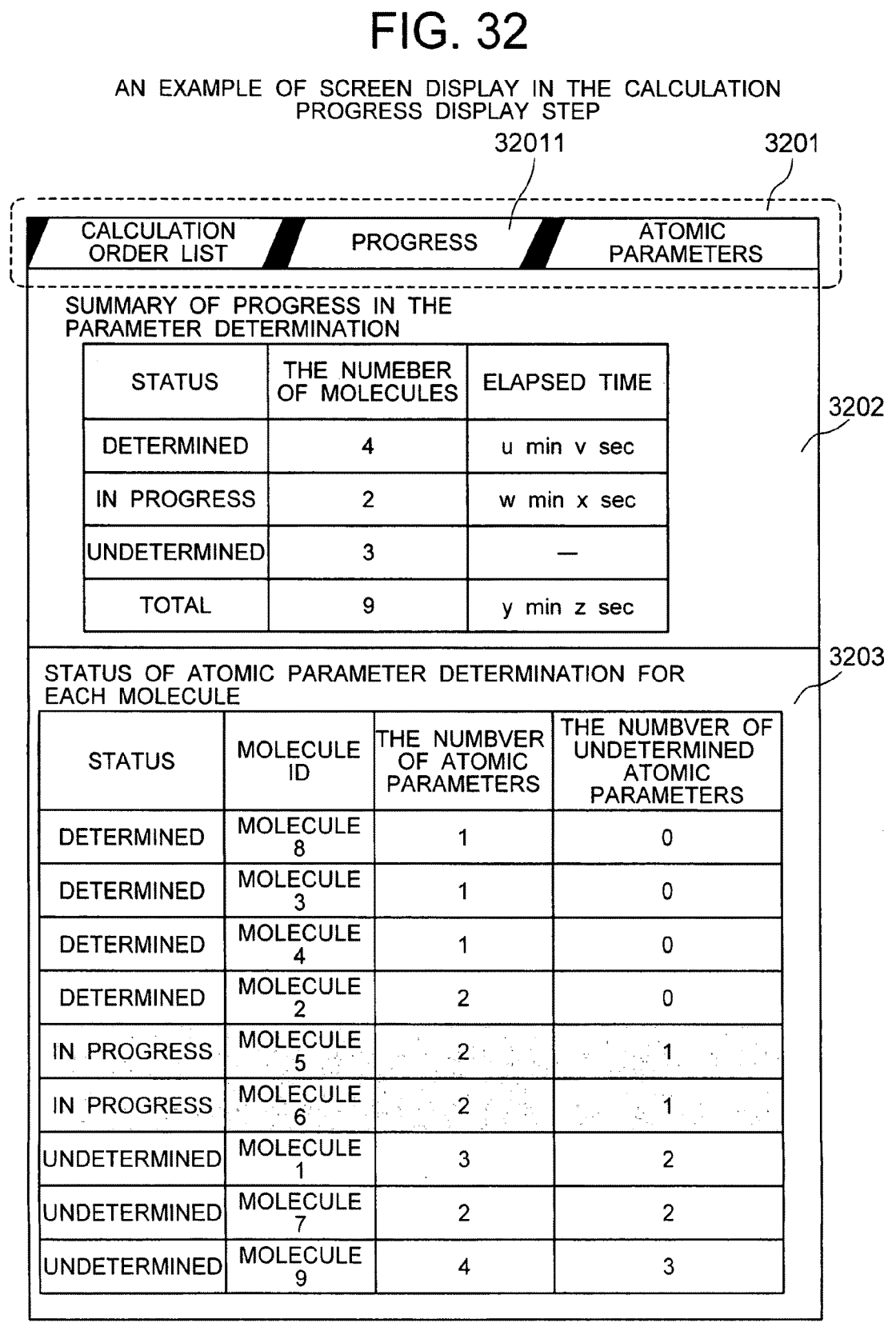

AN EXAMPLE OF SCREEN DISPLAY IN THE CALCULATION PROGRESS DISPLAY STEP 32011 3201

CALCULATION ORDER LIST | PROGRESS | ATOMIC PARAMETERS

3202

SUMMARY OF PROGRESS IN THE PARAMETER DETERMINATION

| STATUS | THE NUMEBER OF MOLECULES | ELAPSED TIME |
|---|---|---|
| DETERMINED | 4 | u min v sec |
| IN PROGRESS | 2 | w min x sec |
| UNDETERMINED | 3 | — |
| TOTAL | 9 | y min z sec |

3203

STATUS OF ATOMIC PARAMETER DETERMINATION FOR EACH MOLECULE

| STATUS | MOLECULE ID | THE NUMBVER OF ATOMIC PARAMETERS | THE NUMBVER OF UNDETERMINED ATOMIC PARAMETERS |
|---|---|---|---|
| DETERMINED | MOLECULE 8 | 1 | 0 |
| DETERMINED | MOLECULE 3 | 1 | 0 |
| DETERMINED | MOLECULE 4 | 1 | 0 |
| DETERMINED | MOLECULE 2 | 2 | 0 |
| IN PROGRESS | MOLECULE 5 | 2 | 1 |
| IN PROGRESS | MOLECULE 6 | 2 | 1 |
| UNDETERMINED | MOLECULE 1 | 3 | 2 |
| UNDETERMINED | MOLECULE 7 | 2 | 2 |
| UNDETERMINED | MOLECULE 9 | 4 | 3 |

AN EXANPLE OF DATA VIEW AT THE ATOMIC PARAMETERS DISPLAY STEP

| ATOMIC TYPE | THE NUMBER OF ATOMS | | | |
|---|---|---|---|---|
| | ALL | VALUE ASSIGNED (FIXED) | VALUE ASSIGNED (TENTATIVE) | VALUE NOT ASSIGNED (UNDETERMINED) |
| a | 4 | 3 | 1 | 0 |
| b | 3 | 1 | 1 | 1 |
| h | 3 | 2 | 1 | 0 |
| ... | ... | ... | ... | ... |

SIMULATION PARAMETER DETERMINATION METHOD

INCORPORATION BY REFERENCE

The present application claims priority from Japanese application JP2006-149108 filed on May 30, 2006, the content of which is hereby incorporated by reference into this application.

BACKGROUND OF THE INVENTION

This invention relates to a simulation parameter determination method, in particular, relates to a method of determining parameters for predicting the experimental value by simulation calculation.

With recent advances in computer technology, computer simulation has increasingly been utilized in many disciplines, particularly in fields of science. Simulation of molecular level chemical reactions occurring in the body is one example thereof. For instance, computer simulation of binding reactions between proteins and low molecular weight compounds is commonly performed in drug discovery research. Because water occupies about 60% of body composition, in binding reactions of molecules in the body, in addition to the molecules directly participating in binding, a water solvent present around the molecules largely contributes to binding energy. Therefore, a highly precise calculation of the binding energy in a water solvent is required for accurate computer simulation of binding reactions of molecules in the body. Where computer simulation is utilized in drug discovery research, it is desired that calculation accuracy for the binding energy of a water solvent be such that the calculated value relative to the experimental value is within 1.4 kcal/mol. This value corresponds to 10 times the error in binding energy that is typical in experimental measurement results of binding between proteins and low molecular weight compounds.

To obtain a highly precise calculation of solvation energy, which is defined as the difference in energy before and after the introduction of the effects of water, the use of a calculation model that provides high theoretical exactitude is necessary. Explanation will be given herein describing a polarizable continuum model based on the first principle quantum chemistry calculation, which is one example of a model that provides high theoretical exactitude, and the parameters introduced to the polarizable continuum model, with reference to FIG. 1. This model explicitly accounts for the atomic nucleus and electrons of the calculation object molecule 101 but addresses the water solvent 102 as dielectrics including the calculation object molecule 101. In addition, as shown by an outline zone in the drawing, the model requires a definition of a boundary surface 104 between the space 103 occupied by a molecule and another region, the space occupied by dielectrics. This boundary surface can be defined as the surface formed by overlap of a sphere 105 that is arranged on approximately all the atoms constituting the molecule. No arrangement of a sphere on a hydrogen atom, however, may be selected. Solvation energy can be calculated based on the charge present on the boundary surface as a result of interaction between the molecule and the water solvent. Therefore, the definition of the boundary surface has a direct influence on accuracy in calculation. Accordingly, a determination of the value of the radius 106 of a sphere arranged on an atom, as a parameter specifying the boundary surface between a solute and a solvent, is capable of providing for a highly accurate calculation of solvation energy. Hereafter, this radius will be referred to as "an atomic parameter".

As one example of an atomic parameter determination method, a method that uses a gradient matrix is provided. Explanation will be herein on an atomic parameter determination procedure that uses a gradient matrix with reference to FIG. 2 and FIG. 3.

FIG. 2 is a flowchart of the atomic parameter determination method that uses a gradient matrix. Initially, an energy convergence threshold τ2011, an the experimental values 2012 of three-dimensional coordinate information and the solvation energy of a molecule, and an atomic type 2013, which is a classification based on the chemical similarity of each atom constituting the molecule, are input from an input apparatus 201. Subsequently, in an atomic parameter initialization step 202, values of atomic parameters are initialized according to each atomic type. Then, in the matrix generation step 203, a matrix that stores the solvation energies of all molecules and a solvation energy gradient of all molecules relative to the change in each atomic parameter, is generated. Next, an updated value vector x is determined in a matrix-equation solving step 204 so as to minimize the objective function (expression 1), in which A represents a matrix generated; x represents the updated value vector of the atomic parameter; and b represents an the experimental value vector of solvation energy.

$$g=\Sigma|Ax-b|^2 \qquad \text{(Expression 1)}$$

Next, in an atomic parameters update step 205, the atomic parameter value is updated based on the update value vector. Next, in an atomic parameter calculation termination judging step 206, a determination of whether the amount of change in a residual sum of squares of solvation energy is below τ is made. In the case where the amount of change is equal to or larger than τ, the matrix generation step 203, the matrix-equation solving step 204 and the atomic parameters update step 205 are repeated. In the case where the amount of change of the atomic parameter is below τ, the converged atomic parameter value 2071 is output by the output apparatus at step 207.

FIG. 3 illustrates the details of the processes executed in the matrix-generating step, the matrix-equation solving step, and the atomic parameters update step of the atomic parameter determination method that uses a gradient matrix described with reference to FIG. 2. The processes 302 that are executed in the matrix generation step 301 involve calculation of the solvation energies 3021 of all the molecules and calculation of the solvation energy gradient 3022 of all analysis objects relative to the change in each atomic parameter. The calculation results are stored in the matrix 3023. The actual calculation that is performed for each matrix element 3024, shown by open circle marks in the matrix, involves a one-time-evaluation of solvation energy using the polarizable continuum model. The process 304 that is executed in the matrix-equation solving step 303 is a minimization calculation of an objective function g. Objective function g can be defined by a matrix-equation involving the matrix 3041 in which the number of lines generated in the matrix generation step 301 is the number of molecules and the number of columns is the total number of atomic types plus one; the solution vector 3042 having a number of elements equal to the number of atomic types plus one; and where the solvation energy the experimental value vector 3043 ahs the same number of elements as the number of molecules. The matrix 3041 and the solvation energy the experimental value vector 3043 are known, and the solution vector 3042 is an unknown amount that is the object to be solved. The process 306 to be executed in the atomic parameters update step 305 is to update the new atomic parameter vector 3061 by summing the atomic parameter vector 3062 before update and a vector 3063 corresponds to the solution vector 3042 obtained in the matrix equation solving step 303 in which the top element has been deleted. Each of the elements of the vector 3063 represents the amount of change in the atomic parameter value in the next interation. Because updating the atomic parameter value results in a change in the solvation energy or the solvation energy gradient relative to the change in the atomic parameter, the calculations in FIG. 3 are repeated from the matrix generation step to the atomic parameters update step until $g<\tau$ is satisfied.

This atomic parameter determination method, however, has two problems.

The first problem is the significant amount of calculation required in the matrix generation step 301 for calculating the solvation energies 3021 of all molecules and for calculating the solvation energy gradients 3022 of all molecules relative to the change in each atomic parameter. This is because molecular integration is calculated in the first principle quantum chemistry calculation, which increases the amount of calculation to the order of the mth-power of atomic number (for example, m=3, 4, 5, - - - , depending on calculation methods) for expressing inter-electron interactions. When the amount of calculation time required for calculating the solvation energy of one molecule is 1, the amount of calculation time required for calculation of the solvation energy gradient of one molecule using a finite difference method is also 1; therefore, the total amount of calculation time required for matrix generation is directly proportional to the number of the matrix elements 3024 shown by open circle marks in the matrix 3023. Because the matrix generation step is repeated until convergence of solvation energy, the total amount of calculation time that is required for parameter determination is directly proportional to the number of matrix elements multiplied by the total number of iterations executed.

More generally, in the expressions provided below, N represents the number of molecules used in atomic parameter determination, A(n) represents the number of atoms included in the molecule n, and f(A(n)) represents the amount of calculation time required for solvation energy calculation of the molecule n. As described above, f(A(n)) is a power function of A(n). In addition, p(n) represents the number of atomic types included in the molecule n; and T represents the amount of calculation time.

In prior art methods that use a gradient matrix, the calculations are repeated until the amount of change in the atomic parameter value is below the energy convergence threshold. When the number of iterations executed is expressed by I, then the amount of calculation time is expressed by expression 2:

$$T_{conventional} = I\sum_{n=1}^{N}(1+p(n))f(A(n)) = \sum_{n=1}^{N}(I + I\cdot p(n))f(A(n)) \quad \text{(Expression 2)}$$

In expression 2, the subsequent term after the summation symbol at the right-hand side of the first line is the amount of calculation time required for matrix generation, the "1" in the summation symbol corresponds to solvation energy calculation time, and p(n) corresponds to the gradient calculation of solvation energy relative to the change in the atomic parameter value.

Supplementary explanation will be provided on the first problem discussed above using particular examples. FIG. 4 is an example of application of the atomic parameter determination method that uses a gradient matrix for 10 molecules. In FIG. 4, an atomic type 401, a resultant atomic parameter value 402, and an atomic type 403 for each molecule contains are shown. For the atomic type 401, the following 6 types were defined: $CH_3(C)$, $CH_3(N)$, $CH_2(CC)$, $CH_2(CN)$, $NH_2(C)$, and $NH_2(N)$. The atom(s) shown in the parenthesis are bonding partner atom(s). For example, the atomic type $CH_2(CN)$ represents a carbon atom of $CH_2$ having a bond with one carbon atom and one nitrogen atom. The atomic type(s) 403 corresponding to each molecule are shown in FIG. 4 as open circle marks. For example, for $CH_3$—$CH_2$—$NH_2$ (the sixth molecule), $CH_3$ belongs to the $CH_3(C)$ atomic type, because it bonds to $CH_2$; $CH_2$ belongs to the $CH_2(CN)$ atomic type, because it bonds to $CH_3$ and $NH_2$; and $NH_2$ belongs to the $NH_2(C)$ atomic type, because it bonds to $CH_2$. As a result, three open circle marks are provided for this molecule. As an exception in the present atomic parameter determination method, for the non-methyl carbon atom of $(CH_3)_4$—C (the ninth molecule), a fixed value of 1.7 is used. This is because this atom is surrounded by 4 methyl groups and, as a result, is difficult to contact with water molecules. Therefore it is believed that the contribution of the water molecules to solvation energy for this atom is small.

For initial values of atomic parameters, 1.7 was used for 4 kinds of $CH_3(C)$, $CH_3(N)$, $CH_2(CC)$ and $CH_2(CN)$, and 1.4 for 2 kinds of $NH_2(C)$ and $NH_2(N)$. In an example implementation used to calculate the atomic parameters, a solution vector was approximately determined every iteration time using a steepest gradient method to be described below to update atomic parameters. In addition, to accelerate atomic parameter convergence, atomic parameters were updated using the solutions from previous iterations once every four iterations. Details of this example implementation will now be provided below.

1) Update Method Executed for Every Iteration 1-1) For each atom "a" that is not equivalent in view of symmetry composing molecule n, a Taylor expansion of solvation energy $E_n$ is terminated at the first order term, and based on the resultant equation and the energy residue $Z_n$, the atomic parameter, $r_{n,a,t}$, and a weight thereof, $W_{n,a,t}$, are calculated according to Expression 3 and Expression 4 as provided below.

$$r_{n,a,t} = r_{n,a,t(old)} - \frac{z_n}{\frac{\partial E_n}{\partial r_{n,a,}}\cdot w_{n,a,t}} \quad \text{(Expression 3)}$$

$$w_{n,a,t} = \frac{\left(\frac{\partial E_n}{\partial r_{n,a,t}}\right)^2}{\sum_t\left(\frac{\partial E_n}{\partial r_{n,a,t}}\right)^2} \quad \text{(Expression 4)}$$

1-2) The updated value $r_t$ of the atomic parameter is calculated as the weighted average of $r_{n,a,t}$ obtained for each molecule n.

$$r_t = \frac{\sum_{n,a} r_{n,a,t}\cdot w_{n,a,t}}{\sum_{n,a} w_{n,a,t}} \quad \text{(Expression 5)}$$

2) The Update Method Executed Once Every Four Iterations 2-1) For each atom "a" that is not equivalent in view of symmetry composing molecule n, a straight line $z_n=A\, r_{n,a,t}+B$, which approximates hysteresis of the atomic parameters $r_{n,a,t(I)}$, and a residue $z_{n,(I)}$ at I=4i−3, 4i−2, 4i−1, and 4i, are determined for calculating the atomic parameter value in which the residue becomes 0 as $r_{n,a,t}=-B/A$, assuming that I is the number of iterations executed and I is an integer.

2-2) As for each atomic type t, an updated value $r_t$ of the atomic parameter is calculated, as provided below in Expression 6, as the average of the resultant $r_{n,a,t}$. The sum of the delta function of the denominator is the number of atoms belonging to atomic type t of the atoms that are not equivalent in view of symmetry composing molecule n.

$$r_t = \frac{\sum_{n,a} r_{n,a,t}}{\sum_{n,a} \delta_{t_{n,a},t}} \qquad \text{(Expression 6)}$$

FIG. 5 shows the relationship between the amount of calculation time and calculation error obtained by the application of the atomic parameter determination method using the above-explained gradient matrix. In this drawing, the abscissa axis is the amount of calculation time, defined as the calculation time 501 required for atomic parameter determination using one computer, and the longitudinal axis is the calculation error 502, defined as the average value of the absolute calculation errors of each of the molecules. The lozenge 503 of the plotted marks shows the relationship between the amount of calculation time and calculation error. Because this method repeats execution of a matrix-equation, the calculation error becomes smaller as the number of iterations increases. According to the data of the example in FIG. 5, to attain a calculation error of 0.1 kcal/mol, a calculation time of about 500 minutes is required. As shown in this example, the amount of calculation time required is vast, even in atomic parameter determination for a relatively small number of molecules.

The second problem encountered with the atomic parameter method described above is that calculation accuracy is unpredictable when the resultant atomic parameter is applied to predict solvation energy. In general, calculation accuracy is considered to depend on definition of an atomic type. Therefore, in the case where the calculation accuracy is below a desired accuracy, re-definition of the atomic type, and re-execution of the atomic parameter determination procedure are required. In this case, iteration of entire atomic parameter determination procedure itself is required, which further expands the amount of calculation time.

This atomic parameter determination method described above can be generalized using the following substitutions: substituting "analysis objects" for molecules; substituting "elements composing analysis objects" for atoms composing molecules; substituting "elemental parameters" for atomic parameters; substituting "the experimental values" for the experimental values of solvation energy; and substituting "calculated values" for calculated values of solvation energy.

FIG. 6 is a flowchart of the parameter determination method using a gradient matrix. Initially, the convergence threshold τ6011, the necessary information and the experimental values 6012 for calculation of the analysis objects, and the elemental type 6013 for each element composing each analysis object are input by the input apparatus 601. Subsequently, in the elemental parameter initialization step 602, the elemental parameters are set according to elemental type. Then, in the matrix generation step 603, a matrix, which stores the calculated value of all analysis objects and the gradient of the calculated value of all analysis objects relative to change in each elemental parameter, is generated. Then in the matrix-equation solving step 604, such an updated value vector x, the objective function $g=\Sigma|Ax-b|^2$ is solved for an updated value vector x that minimizes the objective function, where that A represents a matrix generated; x represents the updated elemental parameter value vector; and b represents the experimental value vector. Next, in the elemental parameters update step 605, the values of the elemental parameters are updated based on the update value vector x. Next, in the elemental parameter calculation termination judging step 606, a determination of whether the amount of change in the residual sum of squares is below τ is made. In the case where the amount of change is equal to or larger than τ, the matrix generation step 603, the matrix-equation solving step 604 and the elemental parameters update step 605 are repeated. In the case where the amount of change of the elemental parameter is below τ, the converged elemental parameter 6071 is output by the output apparatus 607.

FIG. 7 shows particular details of the processes executed the matrix generation step, the matrix-equation solving step and the elemental parameters update step in the parameter determination method using a gradient matrix. The process 702 to be executed in the matrix generation step 701 is the calculation of the calculated value 7021 of all analysis objects and the gradients 7022 of the calculated values of all analysis objects relative to change in each elemental parameter. The calculation results are stored in the matrix 7023. The amount of calculation time required for each of the matrix elements 7024, shown by open circle marks in the matrix, corresponds to a one-time evaluation of the calculated values. The process 704 to be executed in the matrix-equation solving step 703 is the calculation time for minimizing the objective function g, which can be defined by a matrix-equation composed of the matrix 7041, which has the number of analysis objects as the number of rows and the number of elemental types plus 1 as the number of columns, generated in the matrix generation step 701 and the solution vector 7042, which has the number of elemental types plus 1 as the number of elements, and the experimental value vector 7043, which has the number of analysis objects as the number of elements. The matrix 7041 and the experimental value vector 7043 are known, and the solution vector 7042 is an unknown object having values to be solved. While a plurality of methods are present for solving the matrix-equation, because these methods are premised on the step of determining the calculation rate being the matrix generation step and not the matrix-equation solving step, therefore, the use of a particular method for solving may be arbitrary here. The process 706 to be executed in the elemental parameters update step 705 is to obtained the updated elemental parameter vector 7061 according to the sum of the elemental parameter vector 7062 prior to the and the vector 7063, which corresponds to the solution vector 7042 obtained in the matrix-equation solving step 703 with the top element having been deleted. Each element of the vector 7063 represents the amount of change in the next iteration of elemental parameter value calculation. When the elemental parameter vector is updated, the calculation values or the gradient of the calculation values relative to elemental parameters will change, and, therefore, the calculations executed in the matrix generation step are again repeated.

In the generalized parameter determination method, where the matrix element calculations occupy a large portion of the total calculation time, a problem arises that the amount of calculation time required for repeatedly solving the matrix-equation becomes vast. The amount of calculation time is given by expression 2. However, the function form of f(A(n)) differs depending on the analysis objects. In addition, in the case where the parameter determination result does not satisfy a desired accuracy provision, re-definition of the parameters and iteration of the entire parameter determination procedure itself are required, which further expands the amount of calculation time required.

To solve the above first problem, it is an object of this invention to reduce the amount of calculation time required for parameter determination.

In addition, it is a second object of this invention to reduce the amount of calculation time required for obtaining a parameter determination result that satisfies a desired accuracy provision.

SUMMARY OF THE INVENTION

To solve the above first problem, in the parameter determination method relevant to the embodiment of this invention described herein, only molecules having a number of undetermined atomic parameters that is equal to or less than one are selected, and the representations of the selected molecules are stored in a calculation order control list. Based on this list, the undetermined atomic parameters are sequentially determined. The selection of molecules is repeated until all atomic parameters are determined.

In the first iteration of the atomic parameter determination procedure, a molecule that has one undetermined atomic parameter is selected. To reproduce the experimental value of solvation energy of such a molecule by simulation calculations, a determination of only one atomic parameter value is needed. Therefore, the atomic parameter can unambiguously be determined.

Next, a molecule having two undetermined atomic parameters is considered. When one of the two undetermined atomic parameters can be tentatively determined based on the atomic parameter value determined in the first round of iteration, then the number of undetermined atomic parameters becomes one, and determination of only this one atomic parameter is left. In the case where the reliability of the tentatively determined atomic parameter is high, the undetermined atomic parameter can also be determined with a high degree of certainty.

To determine the tentatively determined atomic parameter with high reliability, the atomic charge and the averaged bond distance are calculated in advance for each of the atoms. Then, the atomic parameter is expressed as a function with the atomic charge and the averaged bond distance as variables. Atomic charge is a quantity relating to Coulomb interaction strength between a molecule and water solvent, and averaged bond distance is a quantity reflecting the bond environment such as the number of bonded atoms of a molecule, bond order, atoms of bonding partner, and the like. Therefore, atoms that have a similar atomic charge and averaged bond distance are also considered to be similar in atomic parameters values.

However, an atomic parameter obtained according to the above method has no guarantee that it can be used for provide for determination of solvation energy within in a desired accuracy such as, for example, 1.4 kcal/mol. Therefore, to solve the above second problem, in the parameter determination method relevant to the embodiment this invention described herein, an acceptable energy error value, which is defined as the maximal acceptable difference between a calculated value of solvation energy for a molecule obtained by simulation calculation and the experimental value of solvation energy for the molecule, is initially set. Then, a determination of whether the absolute value of the calculation error, as defined by the difference between the calculated value and the experimental value, is less than or equal to the acceptable energy error, is made for each of the molecules in the process of sequentially determining the undetermined atomic parameters based on the calculation order control list.

In the case where the absolute value of the calculation error is larger than the acceptable error, to make calculated value closer to the experimental value, the atomic parameter that gives the largest contribution to the solvation energy is identified among the plurality of atomic parameters of a molecule. This atomic parameter value, although tentatively determined, is re-set as undermined so that a new value for the atomic parameter can be determined. In this method, the value of acceptable energy error is fixed rather than the number of atomic parameters.

As explained above, the value for the tentatively determined atomic parameter was expressed as a function with atomic charge and averaged bond distance as variables. As shown in the above example, in the case where the value for the tentatively determined atomic parameter that was determined based on the simple function described above is re-set as undermined, the function that expresses the atomic parameter value becomes more complicated in re-executing the determination process.

An example will now be given for the case where two atomic parameters are already determined on a certain atomic type, and values of the atomic parameters are expressed as a linear function of atomic charge. Atomic parameter values of other atoms belonging to the same atomic type can be tentatively determined by substitution of the atomic charge of the atoms into the linear function expressing the atomic parameter values. In the case where the tentatively determined atomic parameter values were re-set as being undermined in a process of atomic parameter determination, and the values were re-determined, the values of the atomic parameters of atoms belonging to the noticed atomic type cannot be expressed by a linear function with atomic charge as a variable. However, the atomic parameter values can be expressed by using a linear function with both atomic charge and averaged bond distance as variables, or more complicated functions like two kinds of linear functions with atomic charge as a variable. Therefore, in this invention, a function expressing values of each of the atomic parameters becomes complicated in the atomic parameter determination process, so that the absolute value of the calculation error is within the acceptable error.

Explanation was given above on the atomic parameter determination method used for calculation of solvation energy of a molecule, as an example. In generalization of this example to analysis objects such as materials, parts, structures and the like instead of molecules, a means for controlling of the calculation order of analysis objects using a calculation order list is considered to be effective. Applicable scope of this invention is the case where a calculation object can be divided into elements, and an attribute value can be defined to each element, and also the case where evaluation of calculated value or gradient relative to parameter change of calculated value is a rate-determining step. In addition, such a means is also considered effective where a value of an elemental parameter is expressed by a function of value of elemental property, and, if necessary, a function form is made complicated, so that the difference between the experimental value such as characteristic value or property measured on a calculation object and a calculated value obtained by simulation is within an acceptable error. The applicable scope of this means is the case where an increase in the number of parameters is allowed, which is used to fit the experimental value and the calculated value.

A means for selection of only a molecule having a number of undetermined atomic parameters equal to or less than 1, has an effect of determining atomic parameters with high degree of certainty. For example, where a benzene molecule is composed of 6 carbon atoms that are equivalent in view of symmetry, the number of atomic parameters can be said to be 1. Therefore, the atomic parameter value, which reproduces the experimental value of solvation energy of benzene, is determined with high degree of certainty, and in this case, unambiguously.

In addition, a means for storing the calculation order control list, and for iteration of one-variable equation solving based on the list to sequentially determine undermined atomic parameters does not require the matrix generation step as in a conventional technique. Therefore, this method has effect of reducing the amount of calculation required for atomic parameter determination. In a conventional technique, the calculation was iterated for the solvation energy of all molecules and the solvation energy gradient of all molecules relative to change in each of the atomic parameters. On the other hand, embodiments of this invention determine a calculation order of molecules, and calculation is iterated on the solvation energy of each of the molecules and the solvation energy gradient relative to change in one atomic parameter.

In addition, a means for re-setting the tentatively determined atomic parameter value on a certain molecule, as being undermined, to determine a new atomic parameter value, in a process of sequential determination of undetermined atomic parameters by iteration of solving of a one-variable equation, based on the calculation order control list, has the effect of reproducing solvation energy within a desired accuracy. This is because new re-determination of the tentatively determined atomic parameter values is capable of improving the calculation accuracy of solvation energy. Under the condition that an increase in the number of parameters used to reproduce the experimental value of solvation energy is acceptable, re-definition of atomic type and re-execution of the whole procedure of atomic parameter determination can be avoided using this means.

The above effect is also similarly obtained in the case of considering analysis objects such as materials, parts, structures and the like instead of molecules. A means for selecting only one molecule having a number of undetermined atomic parameters equal to or less than 1, has the effect of determining elemental parameters with a high degree of certainty. In addition, a means for storing the selected analysis object into the calculation order control list, and for iteration of one-variable equation solving based on the list to sequentially determine undermined elemental parameters does not require a matrix generation step as in a conventional technique. Furthermore, a means for re-setting a tentatively determined elemental parameter value on a certain analysis object, as being undetermined, to determine a new elemental parameter value, in a process of sequential determination of undetermined elemental parameters by iteration of solving of a one-variable equation, based on the calculation order control list, has the effect of reproducing the calculated value within a desired accuracy.

According to this invention, the amount of calculation can be reduced as compared with the prior art.

Other objects, features and advantages of the invention will become apparent from the following description of the embodiments of the invention taken in conjunction with the accompanying drawings.

BRIEF DESCRIPTION OF THE DRAWINGS

FIG. 4 shows an atomic type definition, determined parameter values, and atomic types corresponding to each molecule in the atomic parameter determination method using a gradient matrix.

FIG. 10 shows an input of molecular information.

FIG. 16A shows an example atomic type definition, a process of atomic parameter values determination, and an atomic type corresponding to each molecule.

FIG. 16B shows an example atomic type definition, a process of atomic parameter values determination, and an atomic type corresponding to each molecule.

FIG. 16C shows an example atomic type definition, a process of atomic parameter values determination, and an atomic type corresponding to each molecule.

FIG. 16D shows an example atomic type definition, a process of atomic parameter values determination, and an atomic type corresponding to each molecule.

FIG. 18 shows a comparison of solvation energy prediction accuracy.

FIG. 26 shows a comparison of calculation amount when the number of molecules N used in the atomic parameter determination is sufficiently large.

FIG. 27 shows a comparison of calculation amount between the prior art and this invention in an atomic parameter determination involving 63 molecules.

FIG. 32 shows an example of a screen display in a calculation progress display step.

DESCRIPTION OF THE INVENTION

Explanation will be given below on embodiments of this invention with reference to drawings.

Embodiment 1

Explanation will be given on an atomic parameter determination method of this invention, with reference to FIG. 8 and FIG. 9.

Figure 1:
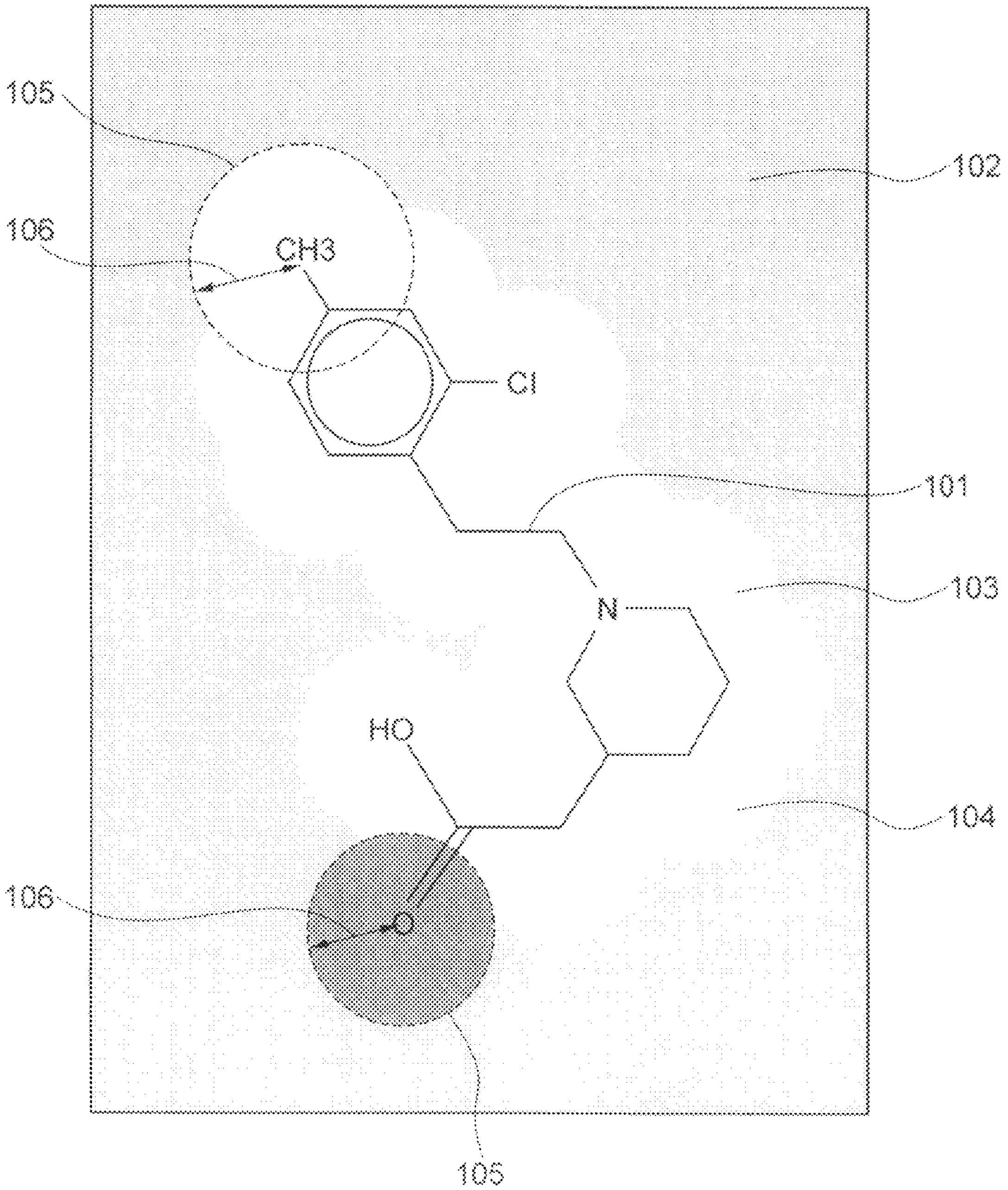
FIG. 1 shows a polarizable continuum model and parameters used in a model parameter determination method.
Figure 2:
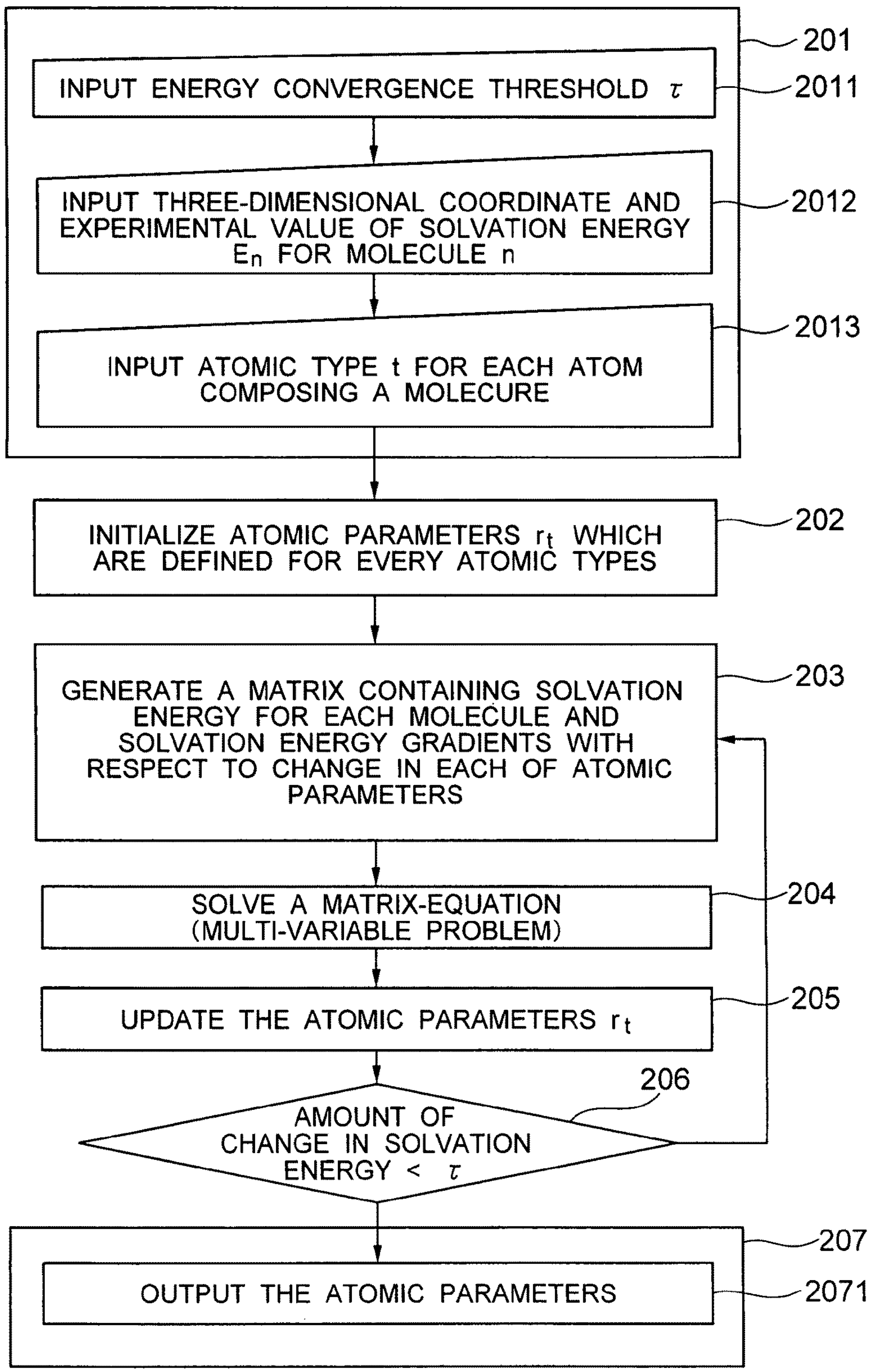
FIG. 2 is a flowchart of an atomic parameter determination method using a gradient matrix.
Figure 3:
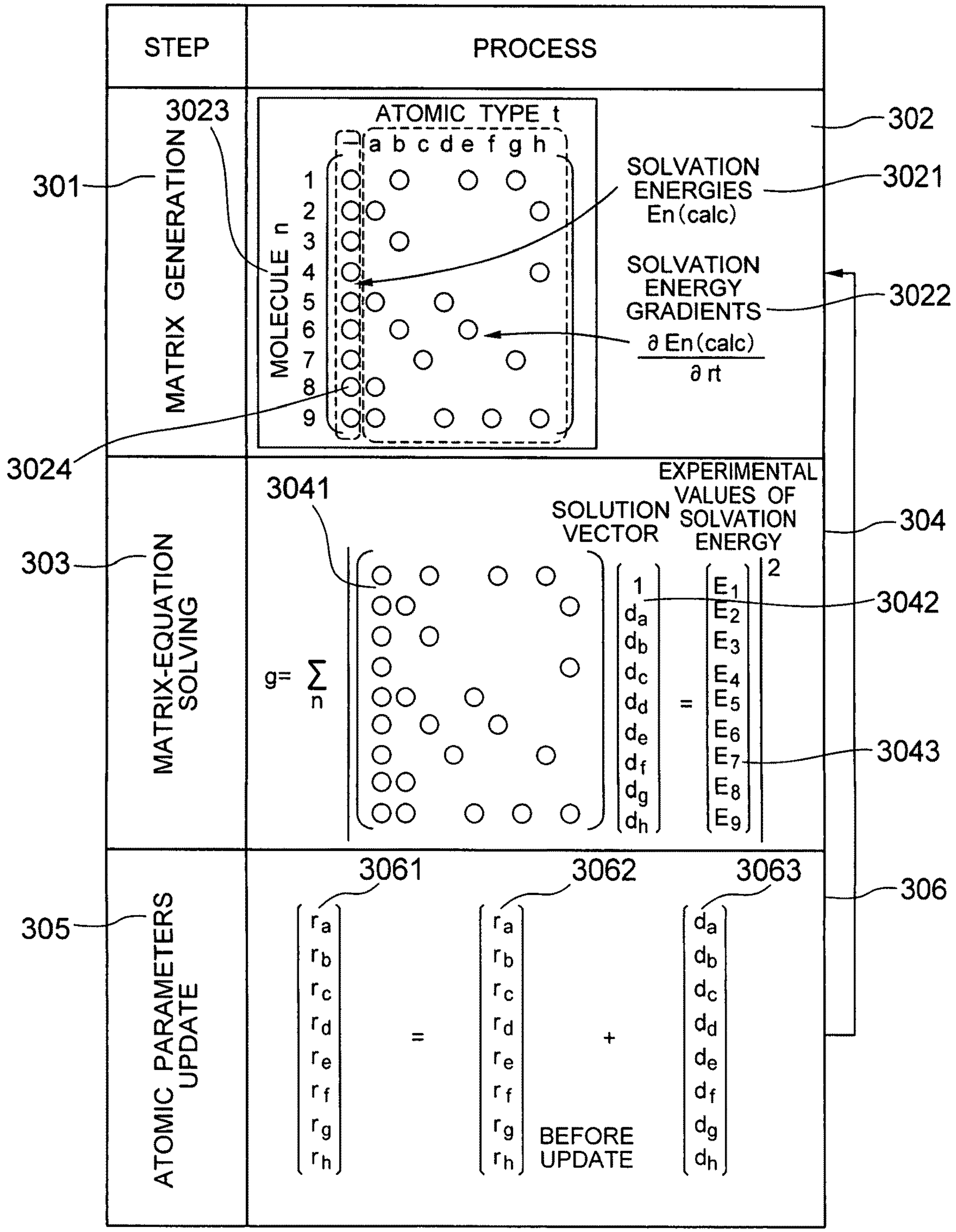
FIG. 3 shows details of processes in the matrix generating step, matrix-equation solving step, and atomic parameters update step in the atomic parameter determination method using a gradient matrix.
Figure 5:
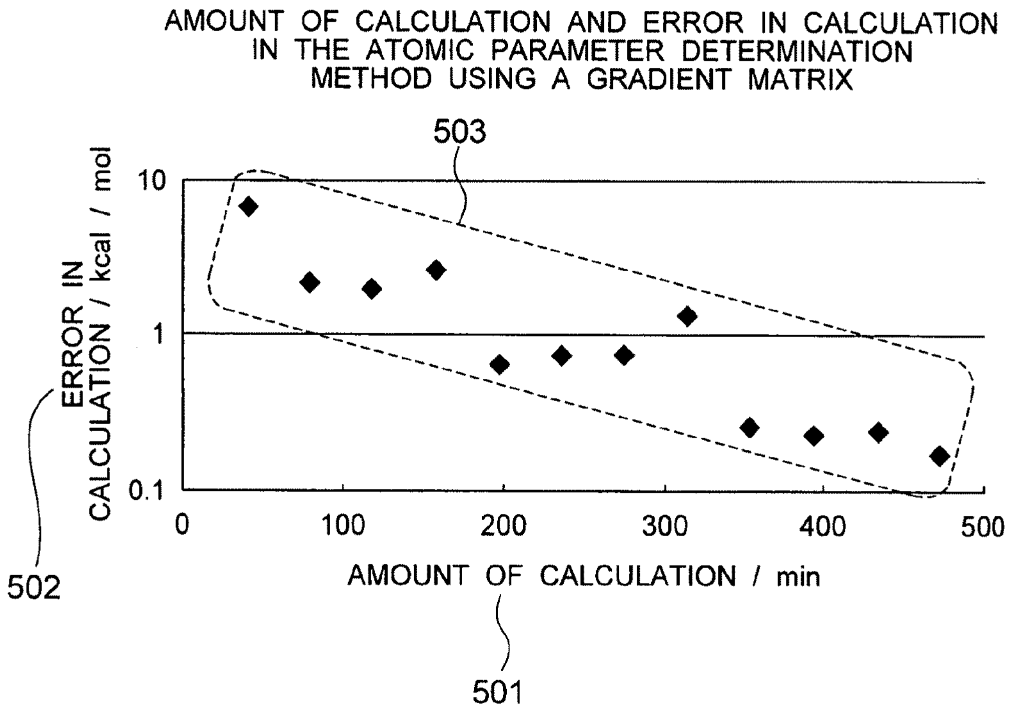
FIG. 5 shows an amount of calculation and calculation error in the atomic parameter determination method using a gradient matrix.
Figure 6:
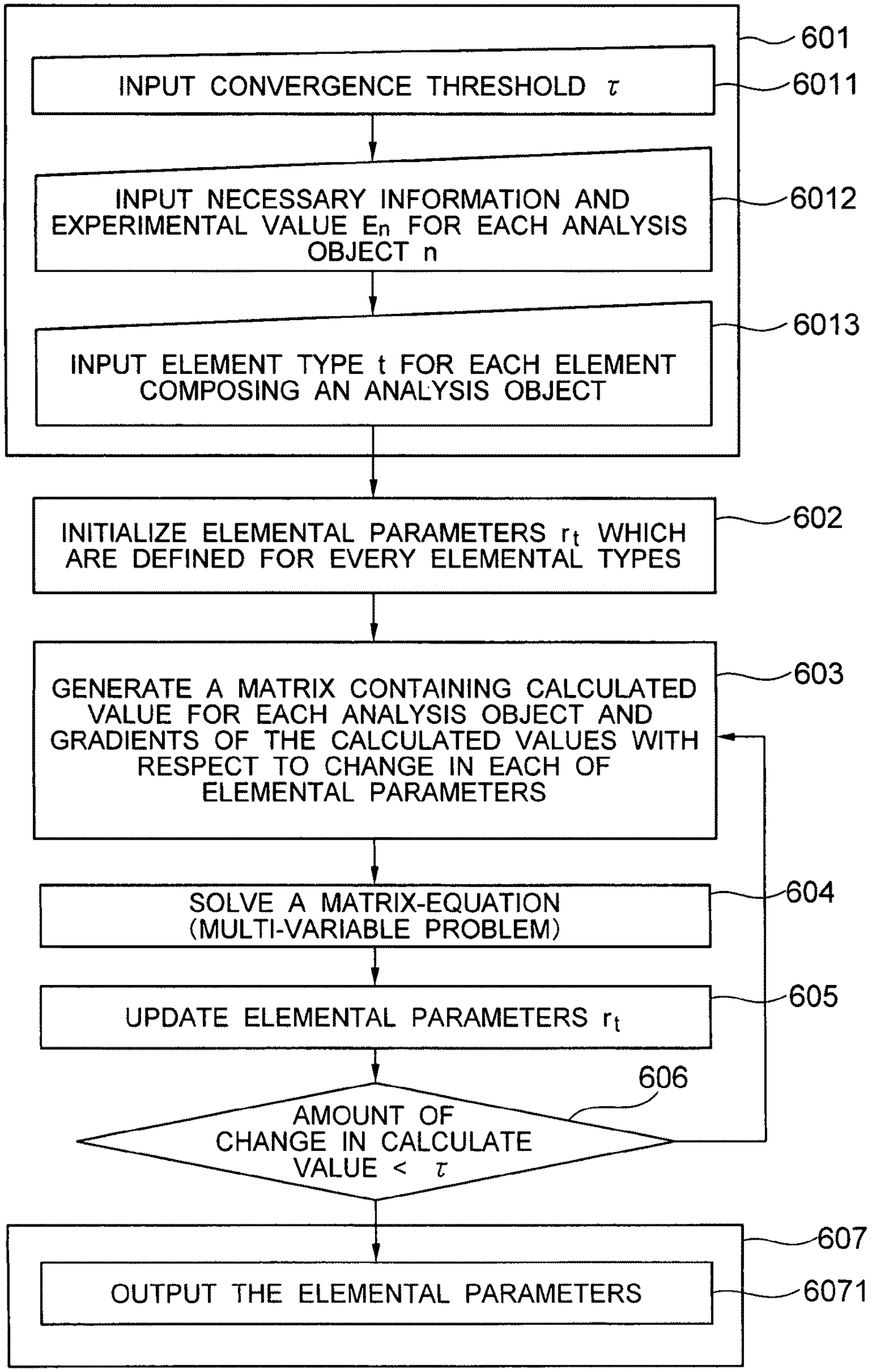
FIG. 6 is a flowchart of the parameters determination method using a gradient matrix.
Figure 7:
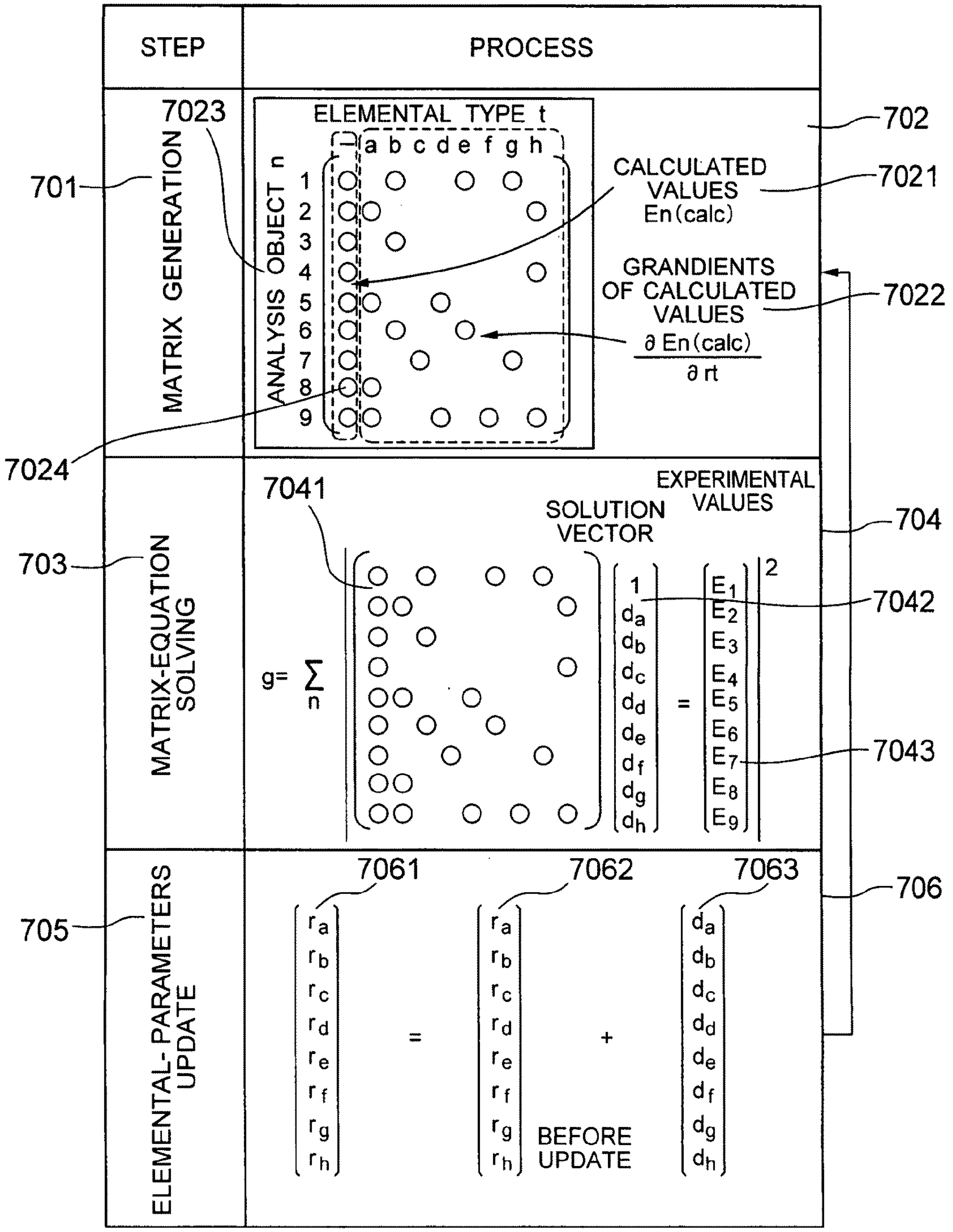
FIG. 7 shows details of processes in the matrix generation step, matrix-equation solving step, and elemental parameters update step in the parameter determination method using a gradient matrix.
Figure 8:
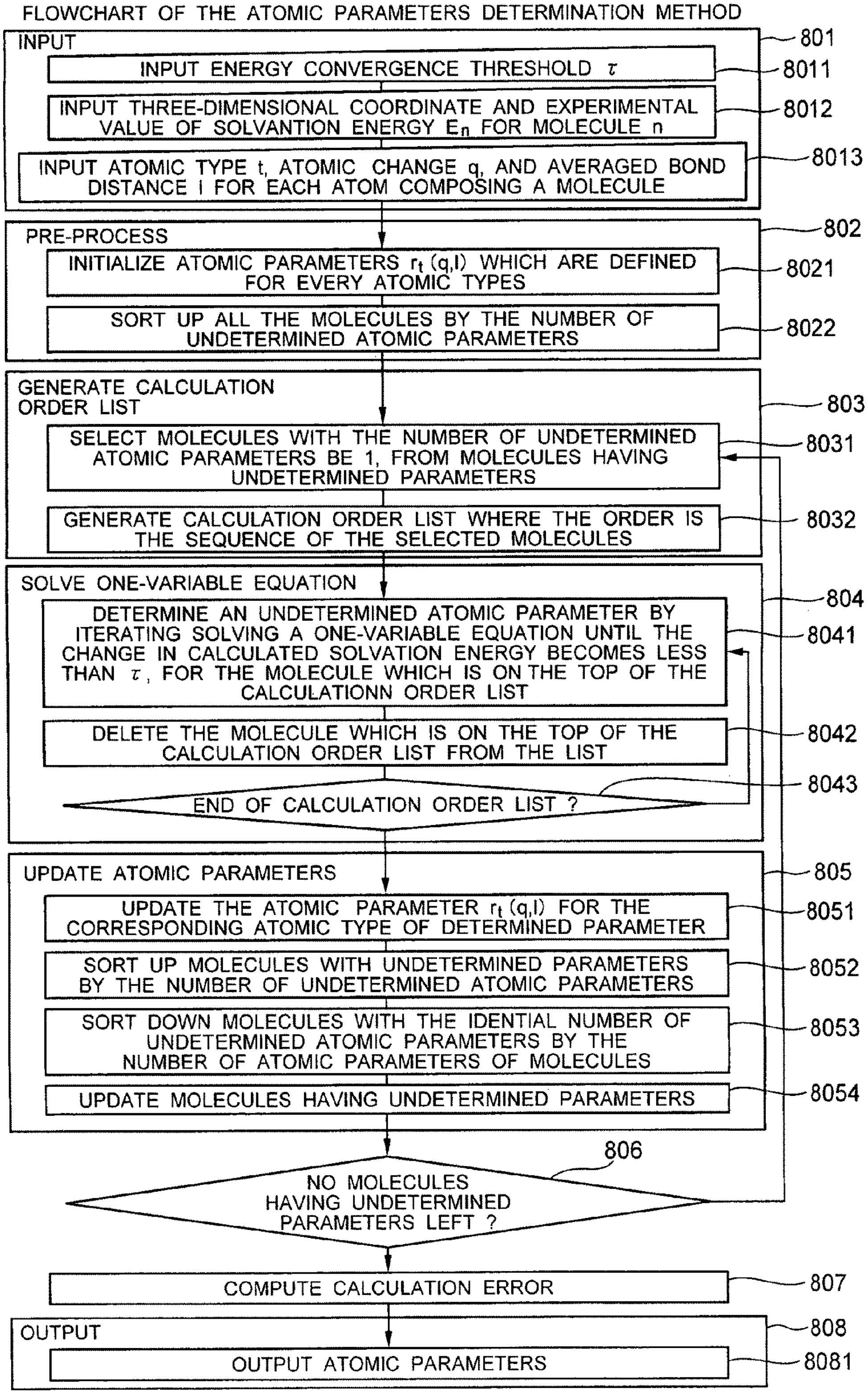
FIG. 8 is a flowchart of the atomic parameters determination method.

FIG. 8 is a flowchart of the atomic parameter determination method. First of all, an energy convergence threshold $\tau$8011, the three-dimensional coordinate information is determined either by calculation or experiment, and an the experimental value 8012 of solvation energy for a molecule, an atomic type of each atom composing a molecule, and an atomic type, an atomic charge, and an averaged bond distance 8013 for each atom are input by an input apparatus 801. Subsequently, in an initialization step 802, the atomic parameter initialization step 8021 set by each of atomic types and a sorting up step 8022 of all molecules by the number of undetermined atomic parameters are executed. Then, in a calculation order list generation step 803, the selection step 8031 of a molecule, having the number of undetermined atomic parameters is 1, from a molecule containing undetermined atomic parameters and a calculation order list generation step 8032, which stores the result of sorting selected molecules by number of atomic parameters, are executed. Then in a one-variable equation solving step 804, solving of a one-valuable equation is iterated on the molecule at the top of calculation order list, until the amount of change of the calculated value of solvation energy becomes below $\tau$, and then an undetermined atomic parameter determination step 8041 and a calculation order list update step 8042 are executed. In a calculation order list termination judging step 8043, in the case where a molecule is still present at the top of calculation order list, the procedure returns to step 8041. In the case where such a molecule is no longer present, the procedure proceeds to an atomic parameters update step 805.

Next, in the atomic parameters update step 805, on an atomic type corresponding to the determined atomic parameter, an atomic parameter expression formula update step 8051, in which an equation that is a function of atomic charge and averaged bond distance is used, a sorting up step 8052 of undetermined molecules by number of undetermined atomic parameters, a sorting down step 8053 of molecules having an identical number of undetermined atomic parameters by number of atomic parameters, and an undetermined molecule update step 8054 are executed. In an atomic parameter calculation termination judging step 806, whether an undetermined molecule is present or not, is determined. In the case where an undetermined molecule is present, the calculation order list generation step 803, the one-variable equation solving step 804 and the atomic parameters update step 805 are reiterated. In the case where an undetermined molecule is not present, the calculation error of each molecule is calculated using the resultant atomic parameter in a calculation error computing step 807, and an determined atomic parameter value 8081 is output by the output apparatus 808.

Figure 9:
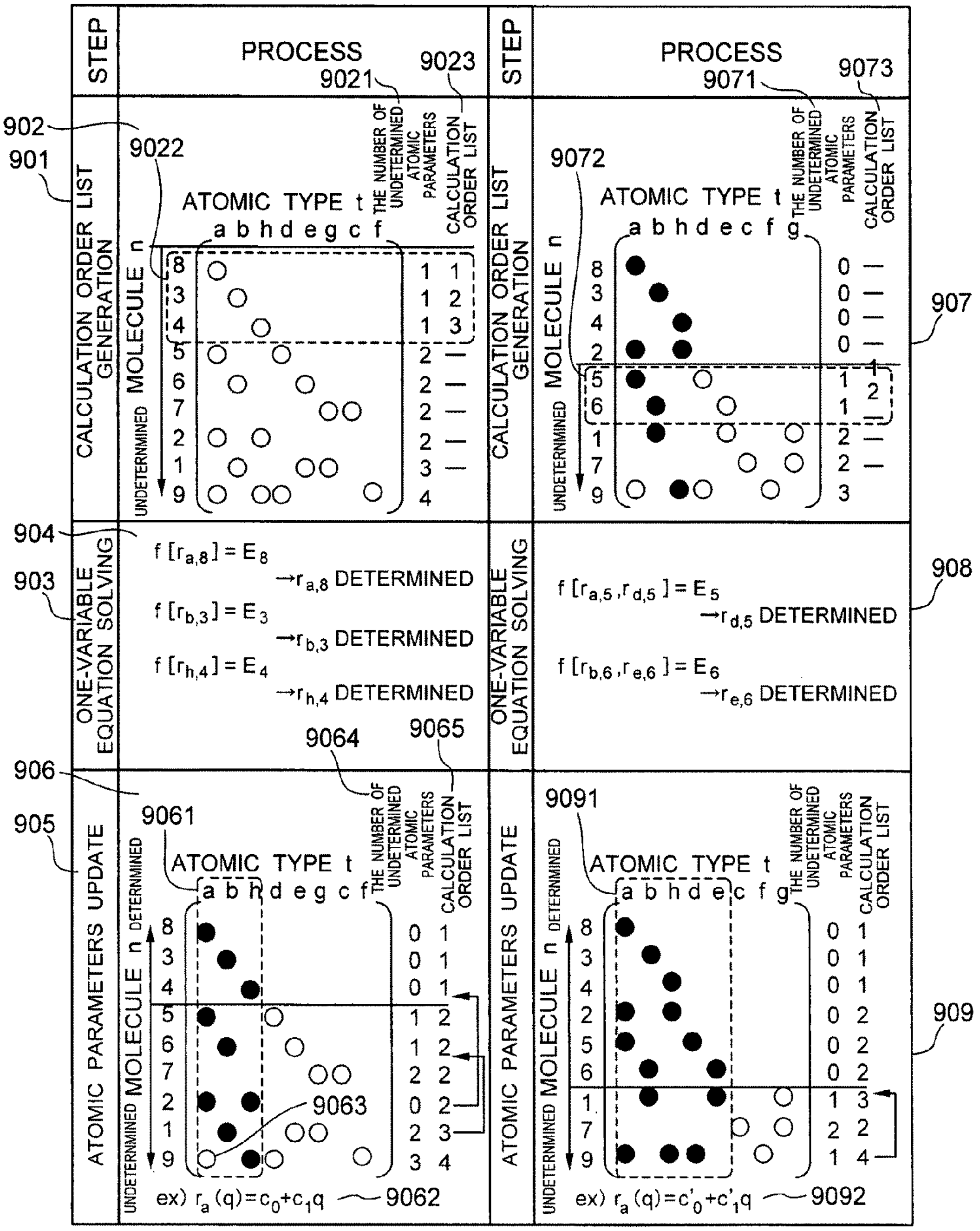
FIG. 9 shows details of processes in a calculation order list generation step, a one-variable equation solving step, and a atomic parameters update step in the atomic parameter determination method.

FIG. 9 illustrates details of processes in a the calculation order list generation step, the one-variable equation solving step, and the atomic parameters update step in the atomic parameter determination method. As an example, explanation will be given on the first and the second iterations of each of the steps, for a case where the number of molecules of 9 and the number of atomic types of 8. In the first round process 902 to be executed in the calculation order list generation step 901, a molecule having the number of undetermined atomic parameter of 1, molecules 9022 (molecule 8, molecule 3 and molecule 4) having the number of undetermined atomic parameter of 1 are selected from the molecules sorted up by the number of undetermined atomic parameters 9021 in advance. The calculation order of these molecules is thus molecule 8, molecule 3 and molecule 4, namely, the same as the arrangement order of the molecules, and this order is stored in the calculation order list 9023. In the first round process 904 to be executed in the one-variable equation solving step 903, the undetermined atomic parameter is determined based on calculation order list. Because the first calculation is on molecule 8, solvation energy is calculated first, using atomic parameter $r_{a,8}$, and the value of $r_{a,8}$ is adjusted so as to reproduce he the experimental value $E_8$. In this process, a value that can reproduce the experimental value is identified while changing $r_{a,8}$, and therefore, iterated solving of a one-variable equation is required. A similar process is executed on the two selected molecules left. In the first round process 906 to be executed in the atomic parameter update step 905, a formula expressing the atomic parameter as a function of atomic charge and averaged bond distance, is updated on a, b and h, which are of the atomic type 9061 corresponding to the determined atomic parameter. A formula expressing the atomic parameter may be a function of either one of atomic charge or averaged bond distance. For example, the atomic parameter 9062 of an atomic type a can be expressed as $r_a(q)=c_0+c_1q$; where $c_0$ and $c_1$ are coefficients. Then, the undetermined atomic parameter value classified to atomic type "a" is obtained by substitution of atomic charge q into $r_a(q)=c_0+c_1q$. However, for the atom 9063, for which the atomic charge differs from that of another atom belonging to the same atomic type by a certain threshold or more from, there may be an option of not setting the atomic parameter value. Such a "value assigned" atom 910 is indicated by a filled circle, and the "value not assigned" (undetermined) atom 911 is indicated by an open circle. Then, at this time, 6 molecules, namely molecules 5, 6, 7, 2, 1 and 9, are sorted up by the number of undetermined atomic parameters 9064. In addition, in the case where the numbers of undetermined parameters are the same, the molecules are arranged sorted down by the number 9065 of atomic parameters. Here, molecules having a number of undetermined parameters of equal to or larger than 1 become new undetermined molecules. Molecule 2 has a number of undetermined parameters of 0 at this moment, and thus is not used in atomic parameter determination.

In the second round process 907 to be executed in the calculation order list generation step 901, the molecules 9072 having a number of undetermined atomic parameters 9071 of 1 (molecule 5, and molecule 6) are selected from the molecules arranged in advance. The calculation order of these molecules is molecule 5, then molecule 6, and this order is stored in the calculation order list 9073. In the second round process 908 to be executed for the one-variable equation solving step 903, the undetermined atomic parameter is determined based on the calculation order list. The solvation energy is calculated first, using atomic parameter $r_{a,5}$ under a fixed value condition, and the undetermined atomic parameter $r_{d,5}$ and the value of $r_{d,5}$ are determined so as to reproduce the experimental value $E_5$. In this process, the value that can reproduce the experimental value is identified while changing only $r_{d,5}$, and therefore, the process to be executed is iterated for solving of a one-variable equation, even for a molecule composed of 2 atomic parameters. A similar process is executed on the 2 selected molecules left. In the second round process 909 to be executed in the atomic parameters update step 905, the formula expressing the atomic parameter, as a function of atomic charge and averaged bond distance, is updated on a, b, h, d and e that are of the atomic type 9091 corresponding to the determined atomic parameter. For example, the atomic parameter 9092 of atomic type "a" is updated using $r_a(q)=c_0+c_1q$ to $r_a(q)=c'_0+c'_1q$. After updating the formula and the determination of the atomic parameter value of an atom classified to the corresponding atomic type, re-arrangement of the undetermined molecules is iterated in the same manner as in the first round of iteration. This process is iterated until undetermined molecules are absent.

Explanation will now be specifically given on an embodiment of the process in relation to the part of a flowchart of the atomic parameter determination method shown by FIG. 8.

Figure 11:
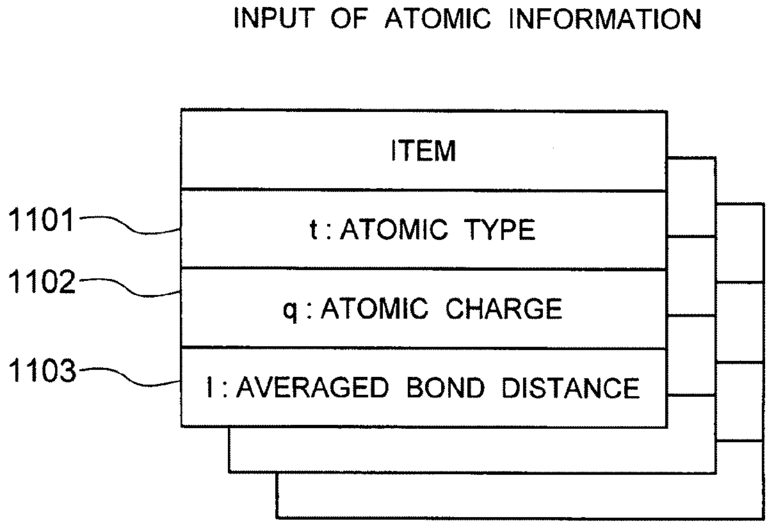
FIG. 11 shows an input of atomic information.

An example of the input 8012 of the three-dimensional coordinate information of a molecule and the experimental value of solvation energy is shown in FIG. 10. In addition, an example of the input 8013 of an atomic type t, atomic charge q, and averaged bond distance 1 for each atom composing a molecule, is shown in FIG. 11. Because these inputs are mutually related, explanation will be given on both of FIG. 10 and FIG. 11 at the same time. First of all, input information can be classified into molecular information and atomic information. Input information attributed to a molecule includes the three-dimensional coordinate information 1001 of the molecule. As an example, the structure 1002 of a para-xylene molecule is shown. The actual input is the three-dimensional coordinates of each of the atoms composing the molecule. In addition, the input information attributed to the molecule includes the experimental value 1003 of solvation energy. The experimental value 1004 of solvation energy of a para-xylene molecule is −0.80 kcal/mol. The number 1005 of atomic parameters to be determined are marked three different ways, open circle, filled circle, and hatched circle, using the example 1006 of a para-xylene molecule. Because the atoms with the same kind of mark are equivalent in view of symmetry, they have the same atomic parameter value. This information is not essential to parameter determination calculation, however, preparation thereof in advance provides convenience. Atomic information includes an atomic type 1101, an atomic charge 1102 and an averaged bond distance 1103. A molecule of para-xylene has 3 kinds of atomic parameters, and the atomic type, the atomic charge and the averaged bond distance are input on each thereof. Specifically, the atomic charge was determined by a charge assignment algorithm on each of the atomic nuclei composing the molecule, so as to provide the best approximation of the static potential of the molecule. The averaged bond distance was calculated as the average value of bond distance for the atom to which each of the atoms directly bonds.

Figure 12:
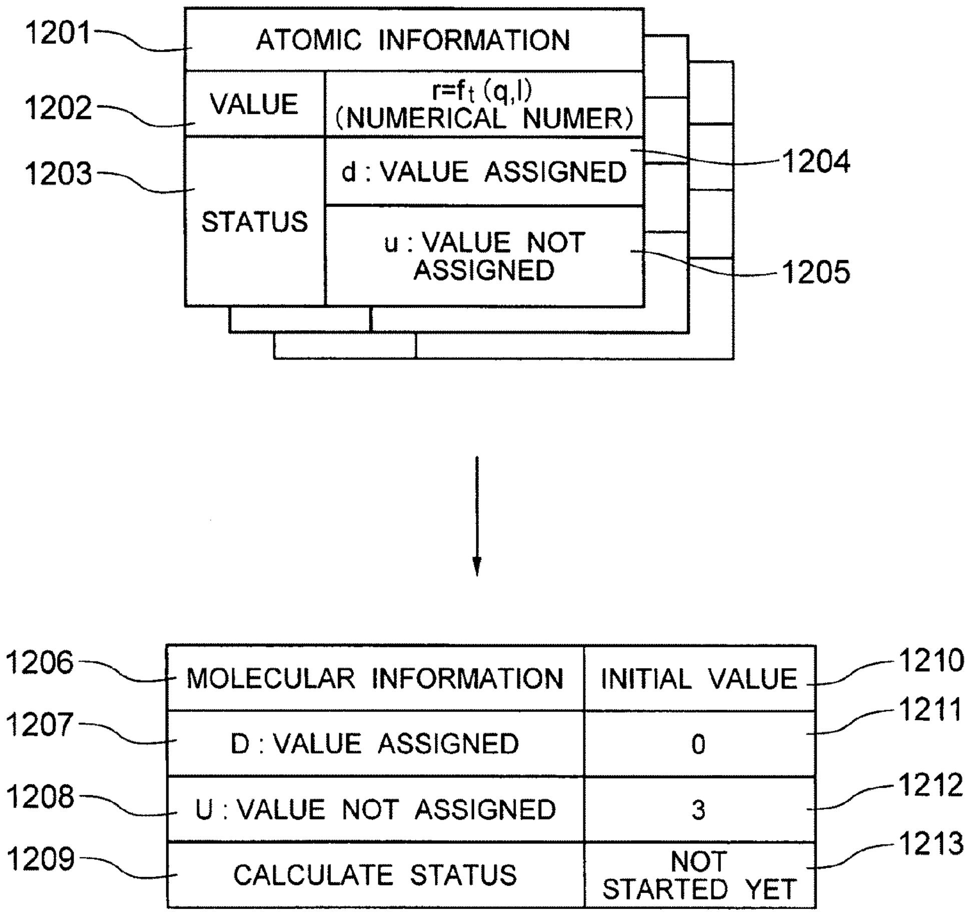
FIG. 12 shows an initialization of atomic parameters.

FIG. 12 shows an example of initialization 8021 of the atomic parameter $r_t(q, l)$, set by each of the atomic types. It is also convenient here to classify information to be handled into molecular information and atomic information. The atomic information 1201 includes the value 1202 of each atomic parameter and the status 1203 of atomic parameter. The status of an atomic parameter is either "value assigned" 1204 or "value not assigned" 1205. As the initialization value, values are not defined for all atomic parameters, and thus their status is treated as "value not assigned". The molecular information 1206 can be calculated by summation of sets of atomic information. The number 1207 of "value assigned" atomic parameters contained in a molecule is the number of atomic parameters for which an atomic parameter status is "value assigned", and the number 1208 of "value not assigned" atomic parameters also can similarly be calculated. The calculation status 1209 of a molecule is either "unfinished" or "finished"; in the case where all of the atomic parameters are "value assigned", the calculation status 1209 of a molecule thereof becomes "finished". The initial value 1210 of molecular information is only summation result of initial value sets of atomic information. In the case of para-xylene, the initial value 1211 of the number of "value assigned" atomic parameters contained in a molecule is 0, and the number 1212 of "value not assigned" atomic parameters is 3, the same as number of atomic parameters. The initial value 1213 of a calculation status is "unfinished."

Figure 13:
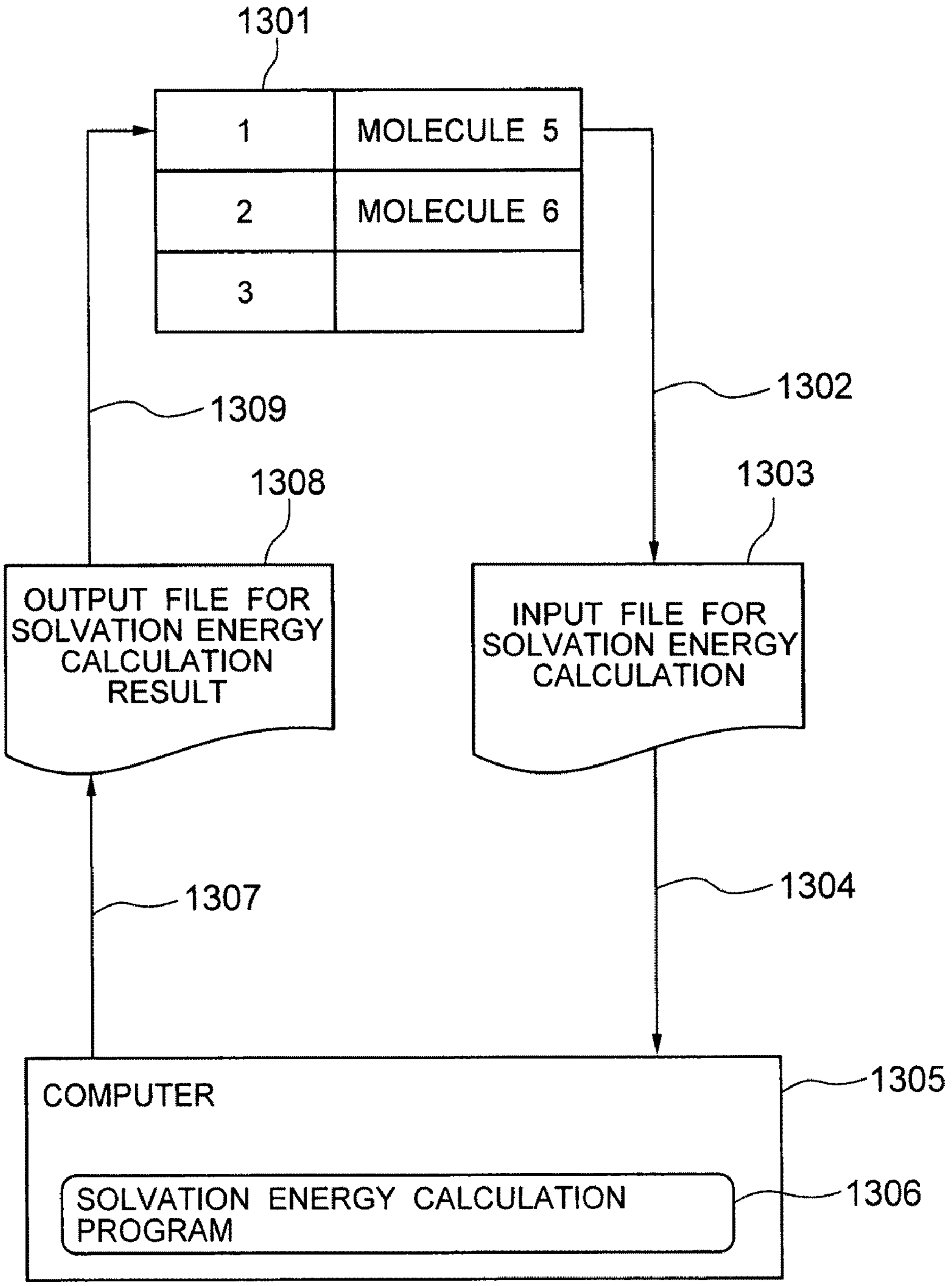
FIG. 13 shows a hardware control approach in the one-variable equation solving step.

This embodiment of this invention is characterized by having the step that controls the calculation order of solvation energy of a molecule using the calculation order list. Explanation will be given on a hardware controlled approach in the one-variable equation solving step 804, using FIG. 13.

The following process is executed on a molecule listed at the top of calculation order list 1301. First of all, in the input file generation step 1302, the input file 1303 for solvation energy calculation is prepared based on three-dimensional coordinate information of the molecule that was input in advance, and the information of the "value assigned" atomic parameters. For the "value not assigned" atomic parameters, setting of suitable value is necessary. For example, the van der Waals' radius value specified by each element may be used. In the solvation energy calculation job input step 1304, the input file 1303 is delivered to the solvation energy calculation program 1306 that is installed in the computer 1305 to calculate solvation energy. In the calculation result outputting step 1307, the calculation result is written in the output file 1308 by the solvation energy calculation program 1306. In the output result processing step 1309, based on a comparison between the experimental value of solvation energy of a molecule already input, and the calculated value, the atomic parameter is updated. Procedures from the input file generation step 1302 to the output result processing step 1309 are iterated until the amount of change of the calculation value of solvation energy becomes below an energy convergence threshold. At the termination of the iteration, the molecule at the top of calculation order list is deleted and the next top and the lower molecules in the calculation order are sequentially moved up. The above procedure is continued until the calculation order list is empty.

Explanation will now be given on embodiment of the atomic parameter, $r_r(q, l)$, update step 8051 of the atomic type corresponding to the determined atomic parameter, using FIG. 14 and FIG. 15.

Figure 14:
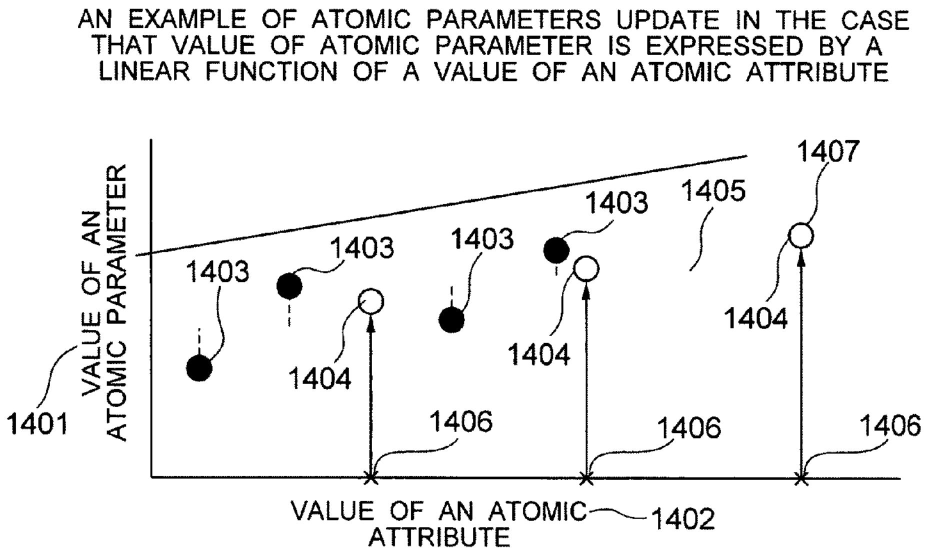
FIG. 14 shows an example of atomic parameter update in the case that the value of an atomic parameter is expressed by a linear function of a value of an atomic attribute.

FIG. 14 is an example of atomic parameter update in the case where the atomic parameter value 1401 is expressed by a linear function of the value 1402 of an atomic attribute such as the atomic charge as a variable. A filled circle in the drawing indicates the atom 1403 having a "value assigned" atomic parameter, while an open circle indicates the atom 1404 having a "value not assigned" atomic parameter. First of all, the linear function 1405 correlating the atomic parameter value with the value of an atomic attribute is defined using the "value assigned" atom 1403. Then, the value 1406 of an atomic attribute of a "value not assigned" atom is substituted in a linear function to assign atomic parameter value. Here, the value assigned to the "value not assigned" atom 1407 having the value of an atomic attribute may be far apart from the value of an atomic attribute of a "value assigned" atom, and may not necessarily be highly precise. The atomic parameter of such a molecule is determined as the last atomic parameter of a molecule to which the atom belongs.

Figure 15:
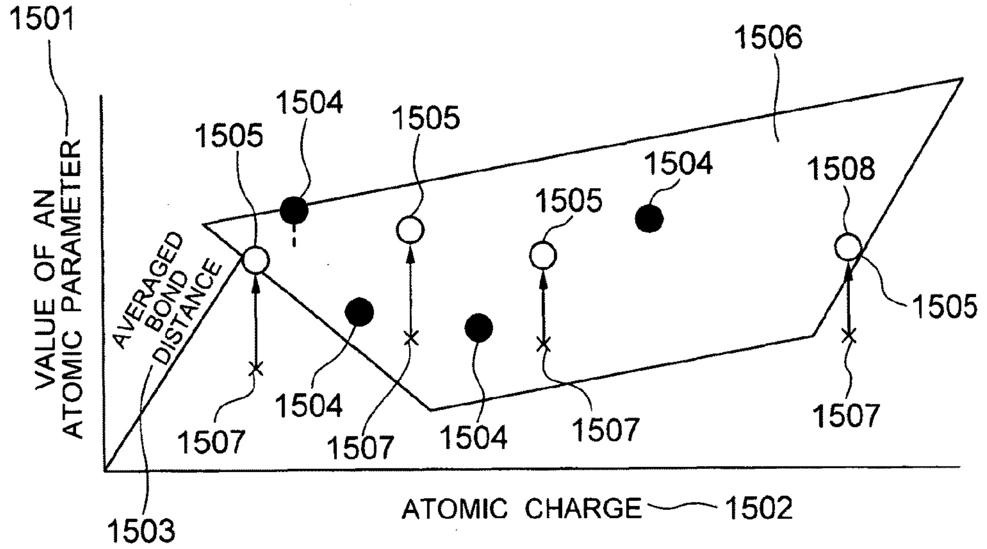
FIG. 15 shows an example of atomic parameter update in the case that value of an atomic parameter is expressed by a linear function of values of two atomic attributes.

FIG. 15 is an example of the atomic parameter update in the case where the atomic parameter value 1501 is expressed by a linear function of two values of atomic attributes such as the atomic charge 1502 and the averaged bond distance 1503 as variables. A filled circle (or a gray circle) in the drawing indicates the atom 1504 as having a "value assigned" atomic parameter, while an open circle indicates the atom 1505 as having a "value not assigned" atomic parameter. First of all, the linear function 1506 correlating the atomic parameter value with the value of an atomic attribute is defined using the "value assigned" atom 1504. Then, the atomic charge and the averaged bond distance 1507 of a "value not assigned" atom is substituted into a linear function to assign the atomic parameter value. Here, the value assigned to the "value not assigned" atom having the value of an atomic attribute may be far apart from the value of an atomic attribute of a "value assigned" atom 1508, and may not necessarily be highly precise. The atomic parameter of such a molecule is determined as the last atomic parameter of a molecule to which the atom belongs.

Finally, the amount of calculation time obtained by a conventional determination method for atomic parameter is compared with that obtained by the atomic parameter determination method according to this invention. The amount of calculation time in the prior art is described in expression 2. In this invention, the molecules are sequentially selected, and the calculation is iterated on each of the molecules until the amount of change of the calculated value of solvation energy becomes less than an energy convergence threshold. The number of iterations is represented by I(n), which differs according to molecule. However, there are molecules that are not used in the atomic parameter calculation. Therefore, the amount of calculation time can be calculated by "expression 7" using a δ function which is defined as 1 for molecules used in atomic parameter determination and as 0 for molecules not used.

$$T_{invention} = \sum_{n=1}^{N} \delta(n)(1 + I(n))f(A(n)) \qquad \text{(Expression 7)}$$

A comparison between expression 2 and expression 7 shows that a smaller amount of calculation time is used in the method of this embodiment of this invention as compared with the prior art in view of three points. First, a calculation is executed on all molecules in the prior art, while, in this embodiment of this invention, a calculation is executed on only a some of the molecules as determined by the presence of the δ function, by which the amount of calculation time is reduced. Second, the first term in the parenthesis at the right-hand side of the second line of expression 2 is "I" in the prior art, while in this embodiment of this invention, the first term in the parenthesis at the right-hand side of expression 7 is "1", by which the amount of calculation time is reduced. Third, the second term in the parenthesis is "I·p(n)" in, the prior art, while in this embodiment of this invention, the first term in the parenthesis is "I(n)". The number of iterations, "I", required for solving a matrix-equation as a multi-variable non-linear problem, is considered to be larger than the number of iterations "I(n)" required for solving a one-variable equation as a one-variable non-linear problem, and therefore the amount of calculation time in this embodiment of this invention is considered to be less.

Embodiment 2

Explanation will now be given on a determination example involving 6 atomic parameters using 10 molecules with reference to FIG. 16A through FIG. 18.

FIGS. 16A through 16D show the atomic type 1601 used in the application of the present embodiment, the determination process 1602 of atomic parameter value, and the atomic type 1603 corresponding to each molecule. Three kinds of atomic type 1601, $CH_3$, $CH_2$, and $NH_2$ were defined. However, the atomic parameters of $CH_3$, and $CH_2$ are expressed by a linear function with averaged bond distance l as a variable, and the atomic parameter of $NH_2$ is expressed by a linear function with atomic charge q as a variable. Each of the linear functions has 2 variables, and therefore, the number of variables to be determined becomes 6. The atomic parameter value at the outset is undetermined. Explanation will now be given below on the atomic parameter determination process:

First of all, in FIG. 16A, the molecules 1604 (molecules numbered 1, 9, 4, 10 and 3) having a number of undetermined atomic parameters of 1 are selected. The atomic parameters to reproduce the experimental value of solvation energy were determined for each of the molecules selected.

Then, in FIG. 16B, values are assigned for the undetermined atomic parameters. As for atomic type $CH_3$, the atomic parameter $r_{CH3}$ 1605 was determined as $r_{CH3}$=−2.0323*1+4.5674 based on the atomic parameters obtained on molecules numbered 1 and 9. Similarly, the atomic parameter $r_{CH3}$ 1606 was determined as $r_{CH2}$=3.8382*1−2.9689. As for atomic type $NH_2$, the atomic parameter was kept as "undetermined" at this point because 2 variables necessary in expressing atomic parameter by a linear function were not determined. As for atomic types $CH_3$ and $CH_2$, values were assigned to the undetermined atomic parameter 1607 by substitution of averaged bond distance 1 to the linear function determination. As a result, the number 1608 of undetermined atomic parameters becomes 0 for the molecule 7 and the molecule 5, and 1 for the molecule 2, the molecule 6 and the molecule 8.

Then, in FIG. 16C, the molecules 1609 (molecules numbered 2, 6, and 8) having a number of undetermined atomic parameters of 1, are selected. Then the atomic parameters to reproduce the experimental value of solvation energy are determined for each of the molecules selected.

Finally, in FIG. 16D, based on the 4 atomic parameters 1610 determined for atomic type $NH_2$ and the averaged bond distance, the atomic parameter $r_{NH2}$ 1611 is determined as $r_{NH2}$=0.2943*q+1.8561. As for each of the molecules numbered 3, 2, 6 and 8, because the atomic parameters determined on each of the molecules and the atomic parameters obtained by substitution of atomic charge to the linear function are different, the calculation errors are calculated using the atomic parameter values obtained finally from the latter.

Figure 17:
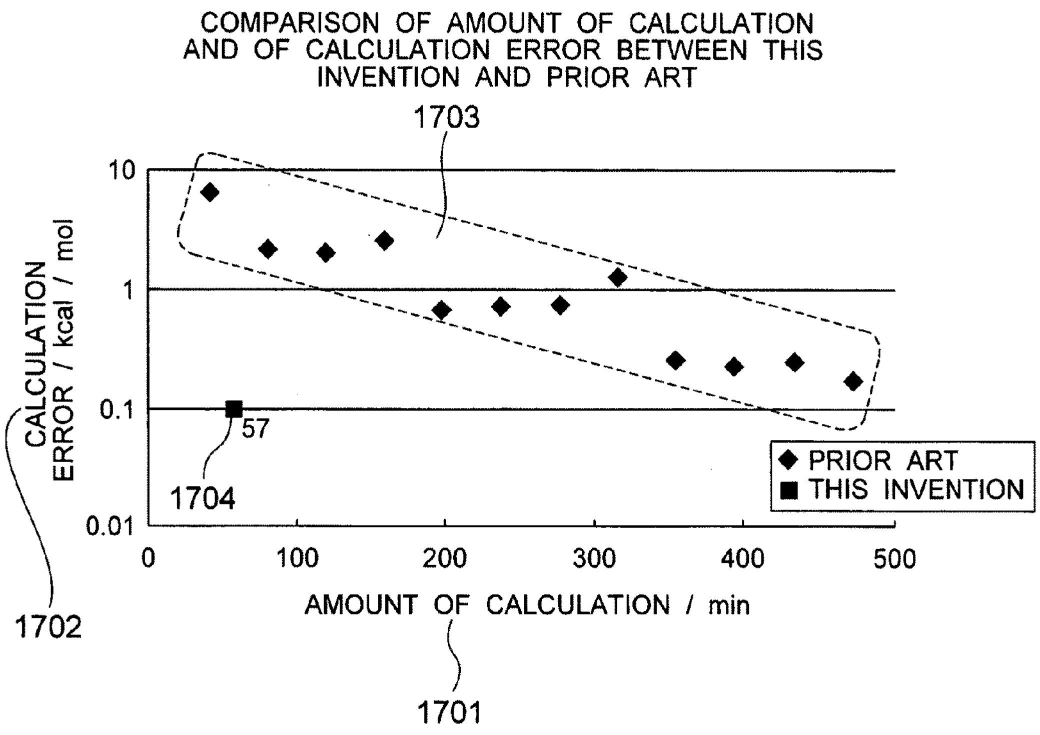
FIG. 17 shows a comparison calculation amount and calculation error between this invention and the prior art.

FIG. 17 shows a comparison of the amount of calculation time and calculation error between the prior art "conventional technique" explained above and the present embodiment. The abscissa axis in the drawing is the amount of calculation time defined as the calculation time 1701 required for determination of atomic parameter using one computer, and the longitudinal axis is the calculation error 1702 defined as average value of absolute calculation error of each of the molecules. The plot of lozenge marks 1703 shows the relation between the amount of calculation time and calculation error in the prior art, and the plot of rectangular marks 1704 shows the relation between amount of calculation time and calculation error in the present embodiment. In the present embodiment, molecules are sequentially selected and the calculation is completed at a time when all of the atomic parameters are determined. The amount of calculation time required was 57 minutes, and a calculation error of about 0.1 kcal/mol was obtained. Therefore, a method of the present embodiment may require about 9 times less the amount of calculation time required to attain an calculation error of 0.1 kcal/mol, under the calculation conditions of the present embodiment.

FIG. 18 shows a comparison of solvation energy prediction accuracy. In FIG. 18, the atomic parameters obtained after 12 iterations in the prior art, and the atomic parameters obtained by a method of the present embodiment, were applied respectively on 6 molecules. The molecules 1801 selected have a structure similar to that of the 10 molecules used in atomic parameter determination. In the drawing, the experimental value 1802, the calculation error 1803 in the prior art, the calculation error 1804 in the present embodiment and the averaged absolute error 1805 in both methods are shown. Because a method of the present embodiment always determines atomic parameters one by one, it may be considered as an approximation of the atomic parameter determination method according to the prior art. However, the averaged absolute error 1805 of the present embodiment is a little smaller as compared with the conventional method. Therefore, the present embodiment that reduces the amount of calculation time required for atomic parameter determination can also be said to maintain the prediction accuracy of solvation energy. A method for expressing atomic parameters as a function of atomic charge or averaged bond distance is considered to be rather effective in the calculation of solvation energy with high accuracy.

Embodiment 3

Generalization of the atomic parameter determination method relevant to this invention may be possible by the substitutions of a molecule with "an analysis object", atoms composing a molecule with "elements composing an analysis object", an atomic parameter with "an elemental parameter", the experimental value of solvation energy with simply "the experimental value", and calculation value of solvation energy with simply "calculation value". Explanation will be given below on a generalized parameter determination method in comparison, with the prior art with reference to FIG. 19 and FIG. 20.

Figure 19:
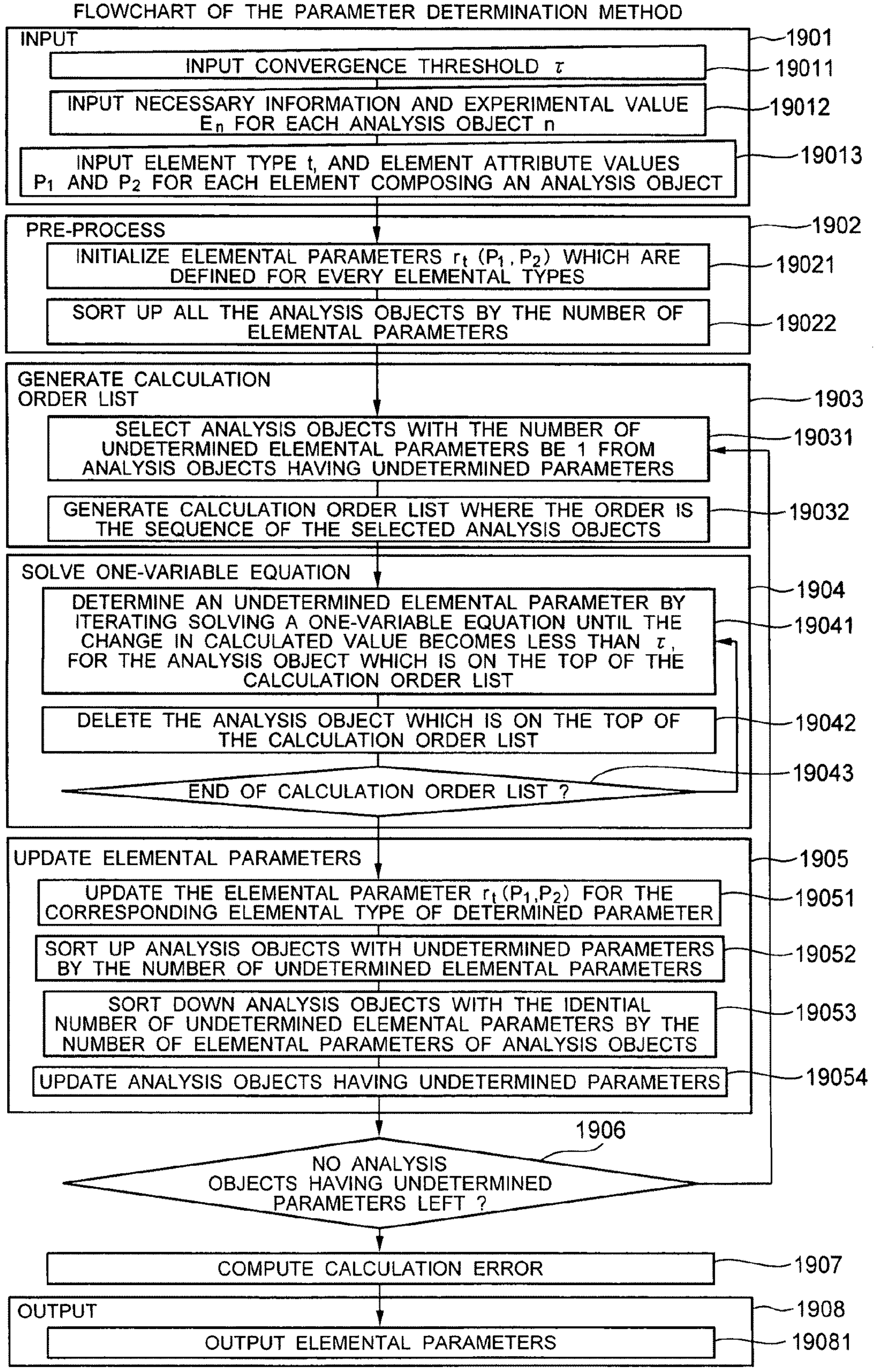
FIG. 19 is a flowchart of the parameter determination method.

FIG. 19 is a flowchart of the parameter determination method of the present embodiment. First of all, a convergence threshold τ19011, information necessary in calculation of analysis object and the experimental value 19012, and an elemental type and element attribute values 19013 of each element composing an analysis object are input from the input apparatus 1901. Subsequently, in an initialization step 1902, an initialization step 19021 of the elemental parameter set according to each of elemental types and a sorting up step 19022 of all analysis objects according to the number of undetermined elemental parameters are executed. In a calculation order list generation step 1903, an analysis objects selection step 19031 selects analysis objects having 1 as the number of undetermined atomic parameters from the analysis objects containing undetermined atomic parameters, and the order the arrangement and calculation of the selected analysis objects are determined to execute a calculation order generation step 19032. Then in a one-variable equation solving step 1904, the solving of a one-valuable equation is iterated on an analysis object on the top of calculation order list until the amount of change of the calculated value becomes below τ, and then an undetermined elemental parameter determination step 19041 and a calculation order list update step 19042 are executed. In a calculation order list termination judging step 19043, in the case where an analysis object is still present at the top of calculation order list, the procedure returns to step 19041; in the case where an analysis object is no longer present, the procedure proceeds to an elemental parameters update step 1905. Next, in the elemental parameters update step 1905, as for an elemental type corresponding to the determined elemental parameter, an elemental parameter expression formula update step 19051, which is a function of the value of the elemental attribute, a sorting up step 19052 of undetermined analysis objects by the undetermined elemental parameters, a sorting down step 19053 of analysis objects with an identical number of undetermined elemental parameters, by the number of elemental parameters and the undetermined analysis object update step 19054 are executed. Next, in an elemental parameter calculation termination judging step 1906, whether an undetermined analysis object is present or not, is judged. In the case where an undetermined analysis object is present, a calculation order list generation step 1903, a one-variable equation solving step 1904, and an elemental parameters update step 1905 are iterated. In the case where an undetermined analysis object is not present, the calculation error of each analysis object is calculated using the resultant elemental parameter, in a calculation error computing step 1907, and the determined elemental parameters 19081 is output by the output apparatus 1908.

Figure 20:
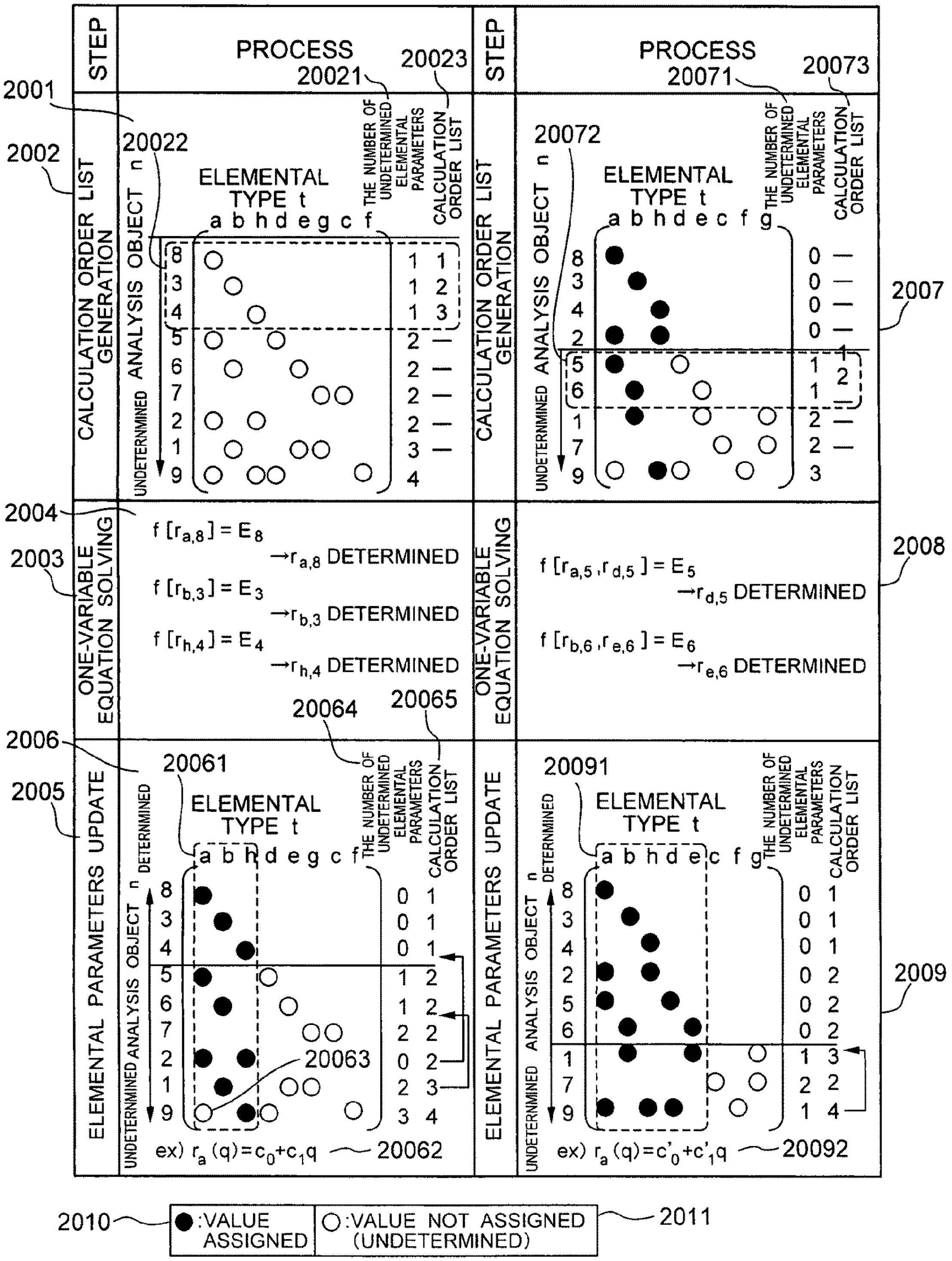
FIG. 20 shows details of processes in calculation order list generation step, one-variable equation solving step, and elemental parameters update step in the parameter determination method.

FIG. 20 illustrates the details of processes in the calculation order list generation step, the one-variable equation solving step, and the elemental parameters update step, in the parameter determination method of the present embodiment. As an example, explanation will now be given on the first and the second rounds of iterations of each of the steps, for a case where the number of analysis objects of 9 and the number of elemental type of 8. In a first round process 2002 to be executed in the calculation order list generation step 2001, the analysis objects 20022 (analysis object 8, analysis object 3 and analysis object 4) having a number of undetermined elemental parameters of 1 are selected from the analysis objects, which are arranged in an order sorted according to the number of undetermined elemental parameters 20021 in advance. The calculation order of these analysis objects is analysis object 8, analysis object 3, and analysis object 4, namely, the same as the arrangement order of the analysis objects, and this order is stored in calculation order list 20023. In a first round process 2004 to be executed in a one-variable equation solving step 2003, the undetermined elemental parameter are determined based on the calculation order list. Because the first calculation is on analysis object 8, the calculated value is obtained first, using elemental parameter $r_{a,8}$, and value of $r_{a,8}$ is determined so as to be able to reproduce the experimental value $E_8$. In this process, the value that can reproduce the experimental value is identified while changing $r_{a,8}$, therefore, iterated solving of one-variable equation is required. A similar process is executed on the 2 selected analysis objects left. In a first round process 2006 to be executed in an atomic parameters update step 2005, the formula for expressing the elemental parameter as a function of the values of the elemental attributes, is updated on a, b and h, which are of the elemental type corresponding to determined elemental parameter 20061. For example, the elemental parameter 20062 of an elemental type a, can be expressed as $r_a(q)=c_0+c_1p_1$; where $c_0$ and $c_1$ are coefficients. Then, the undetermined value of the elemental parameter classified to elemental type a is obtained by substitution of the value of elemental attribute $p_1$ into $r_a(q)=c_0+c_1p_1$. However, as for the element 20063, wherein the elemental attribute value differs from that of the element used for the parameter determination by a certain threshold or more, there may be an option of not setting the elemental parameter. The "value assigned" element 2010 is indicated by a filled circle, and the value not assigned, namely the "undetermined element" 2011 is indicated by an open circle. Then, 6 analysis objects, 5, 6, 7, 2, 1 and 9, which are the undetermined analysis objects at this time, are sorted according to the number 20064 of undetermined elemental parameters. In addition, in the case where the number of undetermined parameters is the same, the analysis objects are sorted down according to the number 20065 of elemental parameters. Here, the analysis objects having a number of undetermined parameters of equal to or greater than 1 become new undetermined molecules. Analysis object 2 has the number of undetermined parameters of 0 at this moment, and thus is not used in the elemental parameter determination.

In a second round process 2007 to be executed in the calculation order list generation step 2001, the analysis objects 20072 (analysis object 5, and analysis object 6) having the number of undetermined elemental parameters 20071 of 1, are selected from the analysis objects arranged in advance. The calculation order of these analysis objects is analysis object 5, and then analysis object 6, and this order is stored in calculation order list 20073. In a second round process 2008 to be executed in the one-variable equation solving step 2003, the undetermined elemental parameters are determined based on the calculation order list. The calculated values are obtained first using elemental parameter $r_{a,5}$, under a fixed value condition, and undetermined elemental parameter $r_{d,5}$ to determine $r_{d,5}$ so as to reproduce the experimental value $E_5$. In this process, the value that can reproduce the experimental value is identified while changing only $r_{d,5}$, and therefore, the process to be executed is the iterated solving of a one-variable equation, even for an analysis object composed of 2 elemental parameters. A similar process is executed on the 1 selected analysis object left. In a second round process 2009 to be executed in the atomic parameters update step 2005, the formula for expressing the elemental parameter as a function of the values of the elemental attributes is updated on a, b, h, d and e, which are of the elemental type 20091 corresponding to the determined elemental parameter. For example, the elemental parameter 20092 of an elemental type a is updated from $r_a(q)=c_0+c_1p_1$ to $r_a(q)=c'_0+c'_1p_1$. After updating the formula and the determination of the value of the elemental parameter of an element classified to the corresponding elemental type, the operation of re-arranging the undetermined analysis objects is executed in the same manner as the first round of iteration. This process is then iterated until an undetermined analysis object is absent.

Finally, the amount of calculation time obtained by a conventional parameter determination method and that of the parameter determination method according to the present embodiment are compared. The amount of calculation time in the prior art is described in expression 2. In the present embodiment, the analysis objects are sequentially selected, and the calculation is iterated on each of the analysis objects until the amount of change of the calculated value becomes below an energy convergence threshold. The number of iterations is represented by I(n), which differs according to analysis object, however, there are analysis objects that are not used in the elemental parameter determination. Therefore, the amount of calculation time is calculated by "expression 8" using a δ function that is defined as 1 for analysis objects used in the elemental parameter determination, and defined as 0 for analysis objects that are not used.

$$T_{invention} = \sum_{n=1}^{N} \delta(n)(1 + I(n))f(A(n)) \quad \text{(Expression 8)}$$

A comparison between expression 2 and expression 8 shows a smaller amount of calculation time in a method of present embodiment as compared with that of the prior art in view of three points. First, the calculation is executed on all analysis objects in the prior art, while in the present embodiment, the calculation is executed on a subset of the analysis objects determined according to the presence of the δ function, by which the amount of calculation time is reduced. Second, the first term in the parenthesis at the right-hand side of the second line of expression 2 is "I" in the prior art, while in the present embodiment, the first term in the parenthesis at the right-hand side of expression 8 is "1", by which the amount of calculation is reduced. Third, the second term in the parenthesis is "I·p(n)" in the prior art, while in the present embodiment, the first term in the parenthesis is "I(n)". The number of iterations, I, required for the solving of a matrix-equation as a multi-variable non-linear problem, is considered to be larger than the number of iterations "I (n)" required for solving of a one-variable equation as a one-variable non-linear problem, and therefore the amount of calculation in the present embodiment is considered less.

Embodiment 4

Explanation will now be given below on the atomic parameter determination method under a fixed acceptable error condition relevant to the present embodiment of this invention, with reference to FIG. 21 and FIG. 22.

Figure 21:
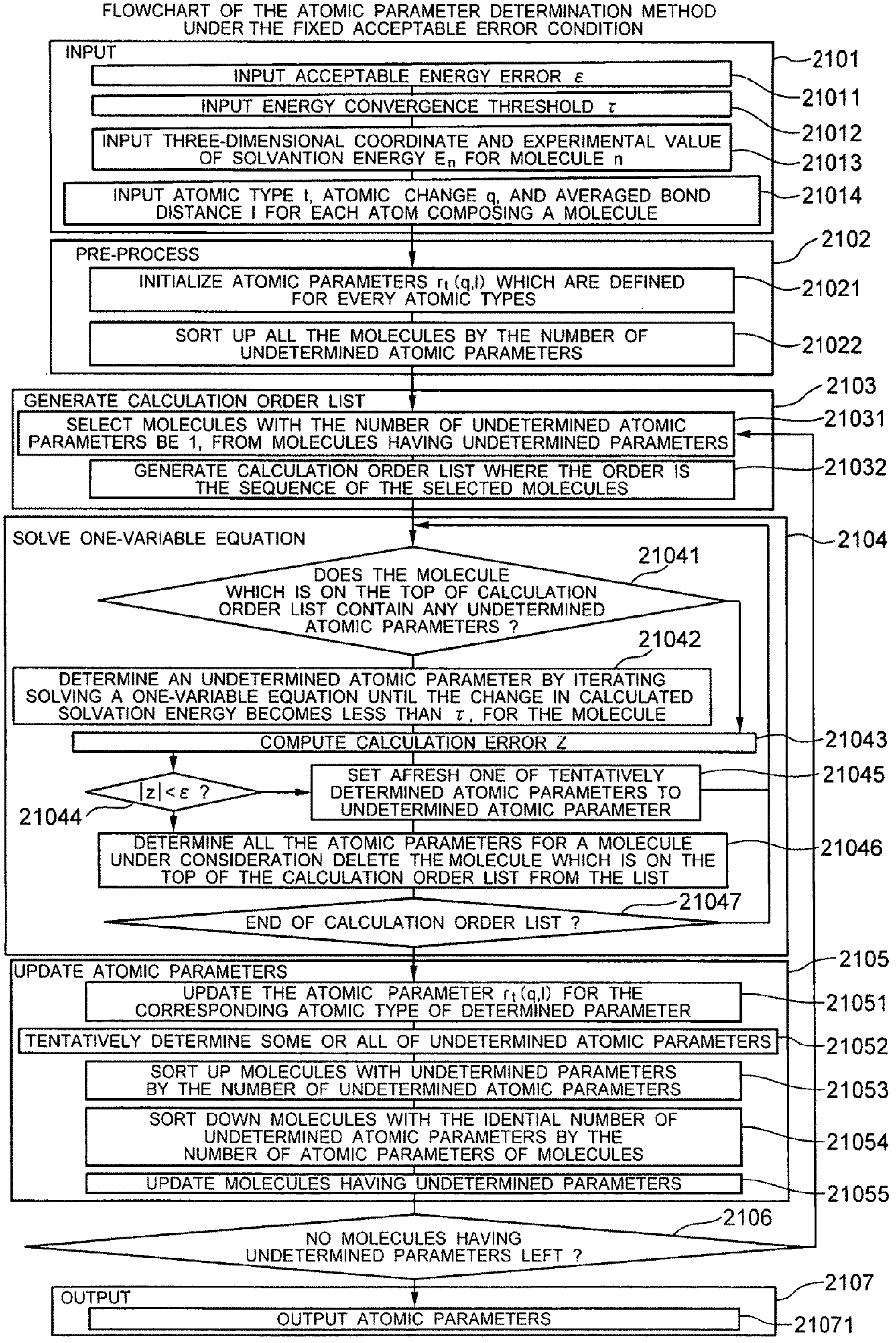
FIG. 21 is a flowchart of the atomic parameter determination method under the fixed acceptable error condition.

FIG. 21 is a flowchart of the atomic parameter determination method under the fixed acceptable error condition. First of all, an acceptable energy error c 21011, an energy convergence threshold τ21012, three-dimensional coordinate information and an the experimental value 21013 of solvation energy for a molecule and the atomic type, atomic charge, and averaged bond distance 21014 for each atom composing a molecule are input from an input apparatus 2101. Subsequently, in an initialization step 2102, an initialization step 21021 of setting atomic parameters according to each atomic type, and a sorting up step 21022 of all molecules by sorting according to the number of undetermined atomic parameters are executed. Then, in a calculation order list generation step 2103, a molecule selection step 21031 of a molecule having a number of undetermined atomic parameters of equal to or less than 1, from a molecule containing undetermined atomic parameters and a calculation order generation step 21032, by determination of a sorted order of selected molecules as the calculation order, are executed. Then in a one-variable equation solving step 2104, solving of the one-valuable equation is iterated, in the case where a molecule is determined to be included in the judgment step 21041 whether a molecule at the top of calculation order list contains undetermined atomic parameters, until the amount of change of the calculated value of solvation energy becomes below t, and an undetermined atomic parameter determination step 21042 is executed. Next, in spite of the results of the judgment step 21041, a step 21043 of calculating the difference between the calculated value and the experimental value of the molecule using the determined atomic parameter, and a step 21044 of comparing the absolute value of the calculation error with an acceptable error are executed. Where the calculation error is over the acceptable energy error, the procedure returns to the step 21041 via a setting afresh step 21045 of the undetermined atomic parameter. Where the calculation error is equal to or smaller than the acceptable energy error, a calculation order list update step 21046 is executed. In a calculation order list termination judging step 21047, in the case where a molecule is still present at the top of calculation order list, the procedure returns to the step 21041; however, in the case where a molecule is no longer present, the procedure proceeds to an atomic parameters update step 2105. Next, in the atomic parameters update step 2105, as for an atomic type corresponding to determined the atomic parameter, an atomic parameter expression formula update step 21051 where the equation is a function of atomic charge and averaged bond distance, a step 21052 for tentatively determining values of atomic parameters for some or all of the undetermined atoms, a sorting up step 21053 of sorting undetermined molecules according to the number of undetermined atomic parameters, a sorting down step 21054 of sorting molecules with the same number of undetermined atomic parameters according to the number of atomic parameters, and an undetermined molecule update step 21055 are executed. Next, in an atomic parameter calculation termination judging step 2106, whether an undetermined molecule is present or not, is determined. In the case where an undetermined molecule is present, the calculation order list generation step 2103, the one-variable equation solving step 2104 and the atomic parameters update step 2105 are iterated. In the case where an undetermined molecule is not present, the values 21071 of the determined atomic parameters is output by the output apparatus 2107.

Figure 22:
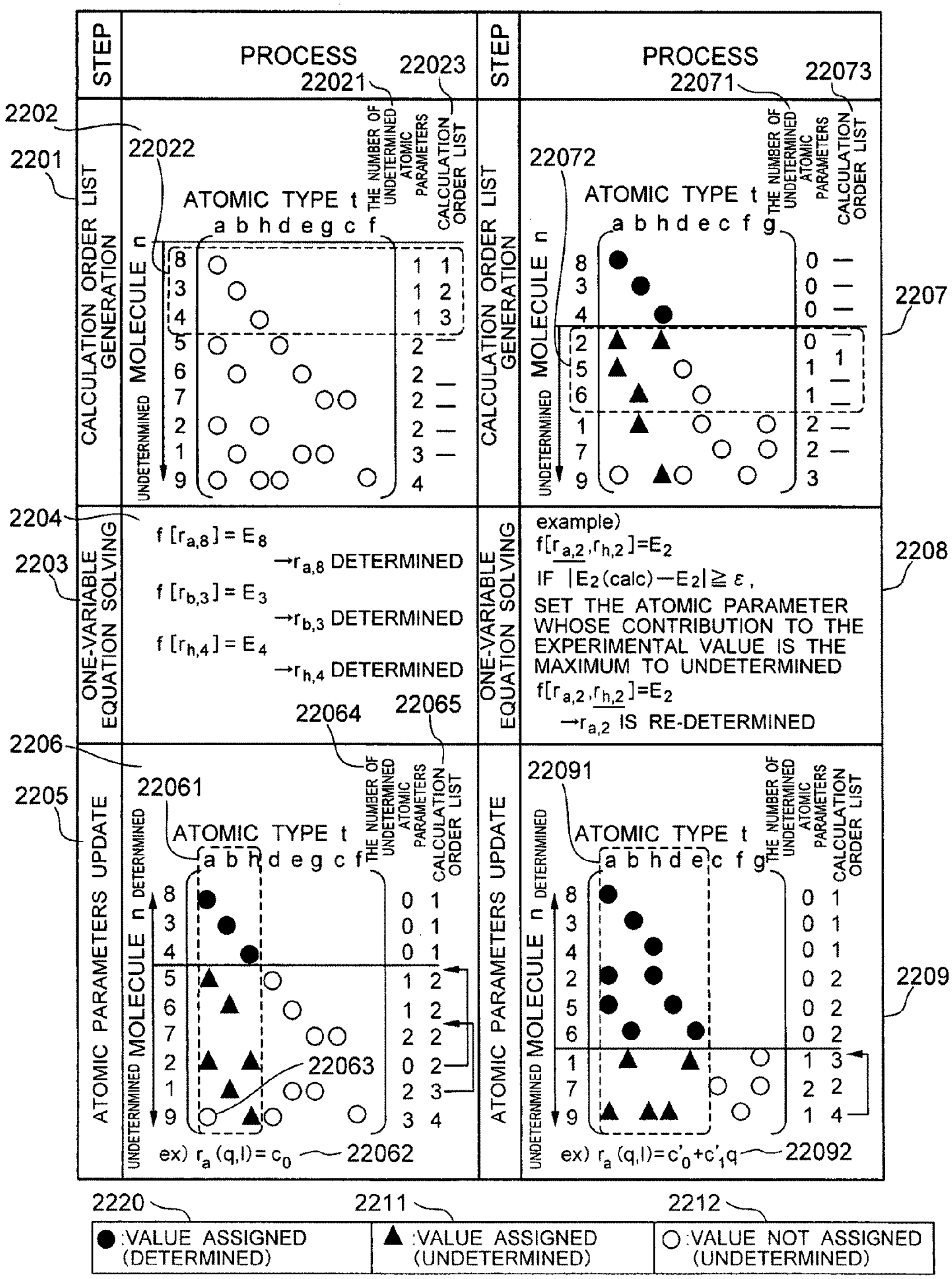
FIG. 22 shows details of processes in a calculation order list generation step, a one-variable equation solving step, and an atomic parameter update step, in the atomic parameter determination method under a fixed acceptable error condition.

FIG. 22 illustrates the details of processes in the calculation order list generation step, the one-variable equation solving step, and the atomic parameters update step, in the atomic parameter determination method. As an example, explanation will now be given on the first and second rounds of iterations of each of the steps, for the case where the number of molecules of 9, and the number of atomic types of 8. In a first round process 2202 to be executed in the calculation order list generation step 2201, the molecules 22022 (molecule 8, molecule 3 and molecule 4) having the number of undetermined atomic parameters of 1 or less are selected from molecules sorted up by the number 22021 of undetermined atomic parameters in advance. The calculation order of these molecules is molecule 8, molecule 3 and molecule 4, namely the same as the arrangement order of the molecules, and this order is stored in a calculation order list 22023. In a first round process 2204 to be executed in the one-variable equation solving step 2203, the undetermined atomic parameters are determined based on the calculation order list. Because the first calculation is on molecule 8, solvation energy is calculated first using atomic parameter $r_{a,8}$, and value of $r_{a,8}$ is determined so as to reproduce the experimental value $E_8$. In this process, the value that can reproduce the experimental value is identified while changing $r_{a,8}$, and therefore, iterated solving of the one-variable equation is required. A similar process is executed on the 2 selected molecules left. In a first round process 2206 to be executed in the atomic parameters update step 2205, the formula for expressing the atomic parameter as a function of atomic charge and averaged bond distance is updated on a, b and h, which are of the atomic type 22061 corresponding to the determined atomic parameter. The formula for expressing the atomic parameter may be a function that does not have the value of an atomic attribute as a variable. For example, the atomic parameter 22062 of atomic type a can be expressed as $r_a(q, l)=c_0=r_{a,8}$. The undetermined atomic parameter value classified to atomic type a is tentatively determined as $r_a(q, l)=c_0$. However, as for the atom 22063, wherein the atomic charge or averaged bond distance differs from the atomic charge or averaged bond distance of the atom used in parameter determination, by a certain threshold or greater, there may be an option of not tentatively determining the atomic parameter value. The atomic parameter determined atom 2210 is indicated by a filled circle, the tentatively determined atom 2211 is indicated by filled triangle, and the value not assigned, namely undetermined atom 2212, is indicated by an open circle. Then, 6 molecules 5, 6, 7, 2, 1 and 9, which are undetermined molecules at this time, are sorted up according to the number 22064 of undetermined atomic parameters. In addition, in the case where the number of undetermined parameters is the same, the molecules are sorted down according to the number 22065 of atomic parameters. Here, all of the 6 molecules become newly undetermined molecules.

In a second round process 2207 to be executed in the calculation order list generation step 2201, the molecules 22072 (molecule 2, molecule 5, and molecule 6) having a number 22071 of undetermined atomic parameters of 1 or less, are selected from the molecules arranged in advance. The calculation order of these molecules is molecule 2, molecule 5, and molecule 6, and this order is stored in the calculation order list 22073. In a second round process 2208 to be executed in the one-variable equation solving step 2203, the undetermined atomic parameters are determined based on the calculation order list. Explanation will now be given particularly on molecule 2, which has no undetermined parameters. First, the solvation energy is calculated, using the atomic parameters given. Then, it is determined whether the absolute value of the calculation error, defined as difference between the calculated value and the experimental value, is below an acceptable energy error. In the case where the absolute value of the calculation error is equal to or larger than an acceptable energy error, only one of the 2 atomic parameters $r_{a,2}$ and $r_{h,2}$ contained in molecule 2 is set as a new undetermined atomic parameter. The atomic parameter to be selected is the one having the larger solvation energy gradient relative to change in both atomic parameters. In the case where the selected parameter is $r_{a,2}$, the value of $r_{a,2}$ is determined so as to reproduce the experimental value $E_2$. In a second round process 2209 to be executed in the atomic parameters update step 2205, the formula for expressing the atomic parameter as a function of atomic charge and averaged bond distance, is updated on a, b, h, d and e, which are of the atomic type 22091 corresponding to the determined atomic parameter. For example, the atomic parameter 22092 of atomic type "a" was $r_a(q, l)=c_0=r_{a,8}$, however, because use of the newly determined value of $r_{a,2}$ is also required for the atomic parameter of an atomic type "a", based on the calculation result of molecule 2, use of a more complicated function form is required. For example, it may be updated to $r_a(q, l)=c'_0+c'_1q$. After updating the formula and the determination of the atomic parameter value of an atom classified to the corresponding atomic type, an operation of rearranging the undetermined molecules is executed in the same manner as the first round of iteration. This process is iterated until there are no undetermined molecules.

Explanation will specifically be given now on a mounting example of a process in relation to an aspect that differs from the process in embodiment 1, among the steps of a flowchart of the atomic parameter determination method under the fixed acceptable error condition, shown by FIG. 21.

Figure 23:
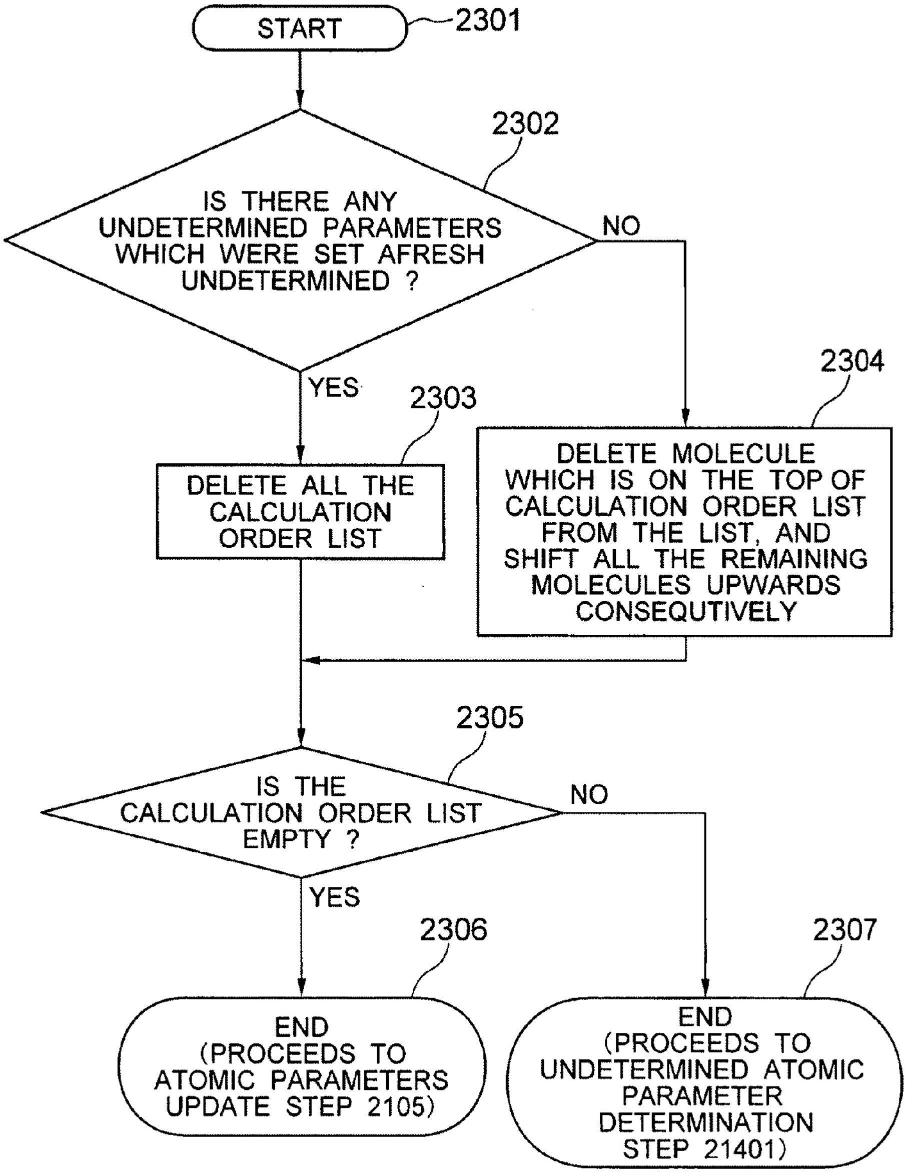
FIG. 23 shows details of a calculation order list update step.

FIG. 23 illustrates details of the calculation order list update step. At the time of a start 2301, the calculation of a molecule at the top of calculation order list is over. In a new setting judgment step 2302 of the undetermined parameter, whether a process for setting one of the tentatively determined atomic parameters as a new undetermined atomic parameter is terminated or not, is determined in a determination process of the undetermined parameter of the molecule. In the case where the result of the determination is "yes", a whole delete process 2303 of the calculation order list is executed; while where the result is "no", a delete process 2304 of deleting the molecule at the top from a calculation order list and sequentially moving forward the residual molecules in the calculation order list is executed. Then, in a calculation order list termination judging step 2305, whether the calculation list is empty or not, is determined; in the case that the list is empty 2306, the process goes forward to an atomic parameters update step; in the case that the is list is not empty 2307, the process returns to the undetermined atomic parameter determination step.

Explanation will now be given on an atomic parameter, $r_t(q, l)$, update step 21051 of the atomic type corresponding to the determined atomic parameter, using FIGS. 24A and 24B, and FIGS. 25A and 25B.

Figure 24A:
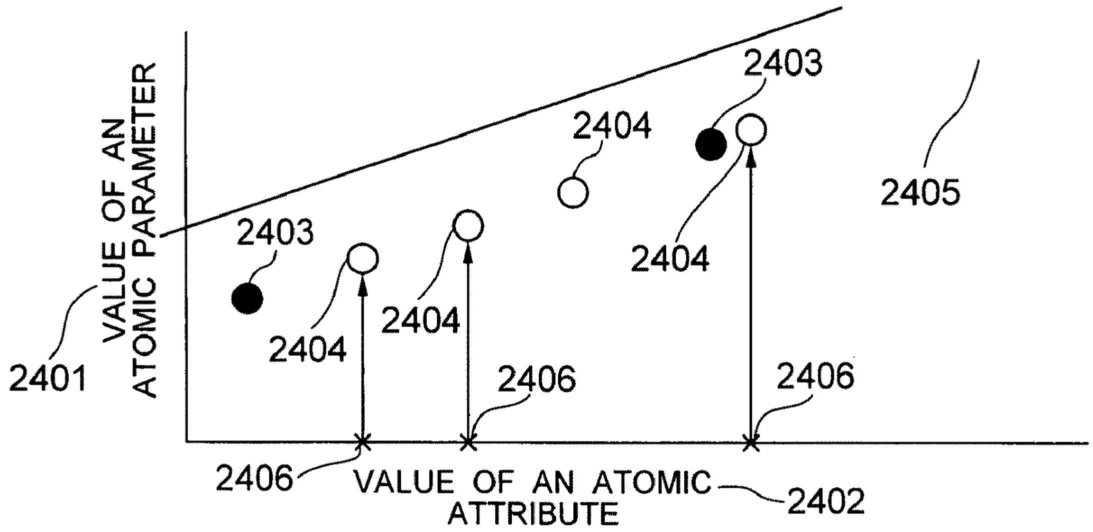
FIG. 24A shows an example of atomic parameter update in the case that the value of an atomic parameter is expressed by a linear function of the value of an atomic attribute.

FIG. 24A shows an example of the atomic parameter update in the case that the atomic parameter value 2401 is expressed by a function of the value 2402 of an atomic attribute such as atomic charge as a variable. A filled circle in the drawing indicates a "value assigned" atom 2403, and an open circle indicates a "value not assigned" atom 2404. First of all, by using the "value assigned" atom 2403, the linear function 2405 that correlates the atomic parameter value and the value of an atomic attribute is defined. Then, the value 2406 of an atomic attribute of a "value not assigned" atom is substituted to a linear function to tentatively determine the atomic parameter value.

Figure 24B:
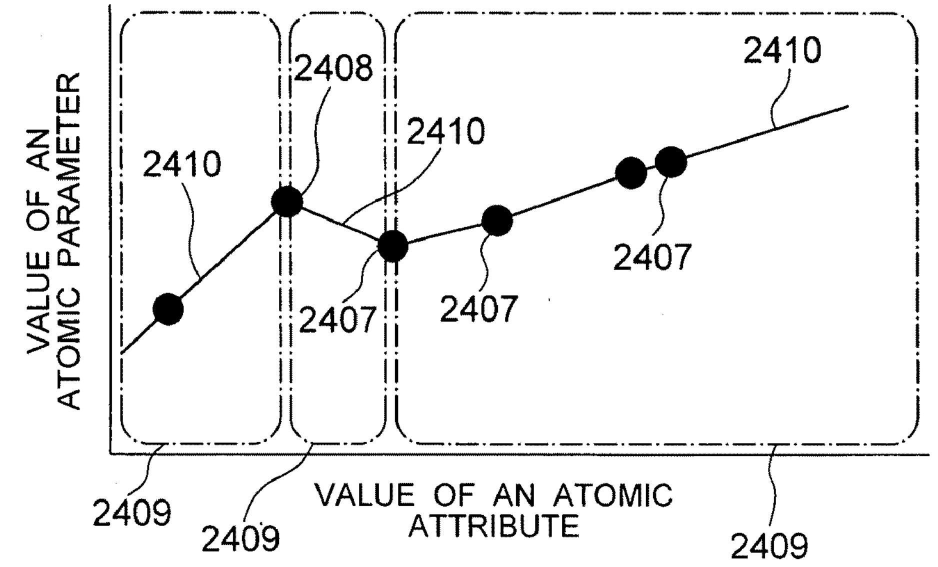
FIG. 24B shows an example of atomic parameter update in the case that the value of an atomic parameter is expressed by a linear function of the value of an atomic attribute.

FIG. 24B shows an example of the execution result of the step for preparation of the calculation order list, the step for solving a one-variable equation, and the step for atomic parameter-updating, using the tentatively determined atomic parameter value. There are the atoms 2407 having the value of the tentatively determined atomic parameter set as the determined value as it is and the atom 2408 having re-determined atomic parameter, after tentatively determining the atomic parameter value being set as the undetermined atomic parameter. The description of the atomic parameter values of these atoms by a linear function of the value of an atomic attribute varies the already determined atomic parameter values and also the solvation energy of molecules with already determined atomic parameters. However, the definition of the three regions 2409 based on the value of an atomic attribute and the definition of the linear function 2410 relative to each region can be expressed by a function using newly determined atomic parameters, without changing the solvation energy of molecules with already determined atomic parameters.

Figure 25A:
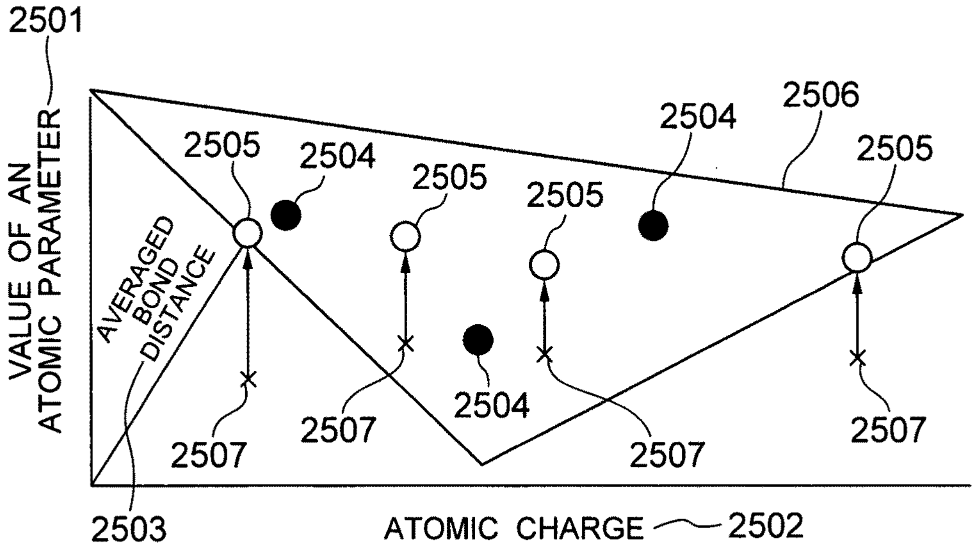
FIG. 25A shows an example of atomic parameter update in the case that the value of an atomic parameter is expressed by a linear function of values of two atomic attributes.

FIG. 25A shows an example of atomic parameter update in the case that the atomic parameter value 2501 is expressed by a function of values of two atomic attributes such as the atomic charge 2502 and the averaged bond distance 2503 as variables. A filled circle in the drawing indicates a "value assigned" atom 2504, and an open circle indicates the "value not assigned" atom 2505. First of all, by using the "value assigned" atom 2504, the linear function correlating the atomic parameter value with the value of an atomic attribute 2506 is defined. Then, the atomic charge and the averaged bond distance 2507 of the "value not assigned" atom are substituted in a linear function to tentatively determine the atomic parameter value.

Figure 25B:
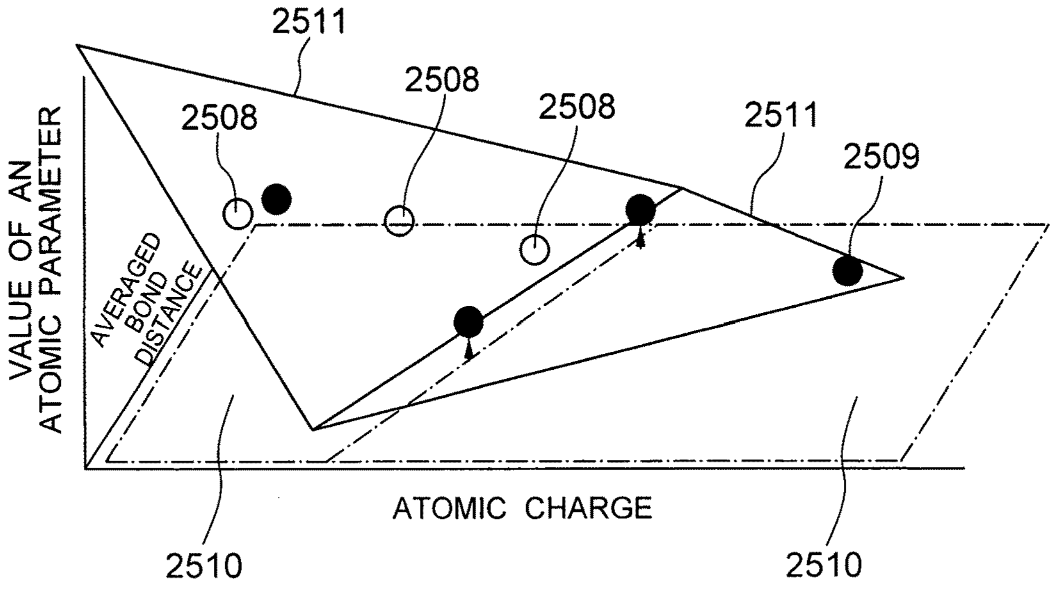
FIG. 25B shows an example of atomic parameter update in the case that value of an atomic parameter is expressed by a linear function of values of two atomic attributes.

FIG. 25B shows an example of the execution result of the step for preparing calculation order list, the step for solving a one-variable equation, and the step for updating atomic parameter, using the tentatively determined atomic parameter value. FIG. 25B shows the atom 2508, for which the tentatively determined value became the determined value as it is, and the atom 2509, for which the tentatively determined value was set as undetermined atomic parameter and the atomic parameter was re-determined. The description of values of atomic parameters of these atoms by a linear function of values of atomic attributes varies already determined atomic parameter values, and also the solvation energy of molecules with already determined atomic parameter. However, definition of the two regions 2510 on a plane formed by the atomic charge and the averaged bond distance, and definition of the linear function 2511 defined in each region based on the value of an atomic attribute can be expressed as a function using newly determined atomic parameters, without changing the solvation energy of molecules with already determined atomic parameters.

Finally, the amount of calculations in a conventional atomic parameter determination method and the atomic parameter determination method according to the present embodiment are compared. The amount of calculation in the prior art is described in expression 2. In the present embodiment, molecules are sequentially selected, and the calculation is iterated on each of the molecules until the amount of change of calculated value of solvation energy becomes below an energy convergence threshold. The number of iterations is represented by I(n), which differs according to molecule, however, there are also molecules having an undetermined atomic parameter number of 0. Therefore, the amount of calculation time is calculated by "expression 9" using a δ function, which is defined as 1 for molecules requiring determination process of undetermined atomic parameter, and defined as 0 for molecules not requiring the process.

$$T_{invention} = \sum_{n=1}^{N} (1 + I(n)\cdot\delta(n)) f(A(n)) \quad \text{(Expression 9)}$$

A comparison between expression 2 and expression 9 shows a smaller amount of calculation time in the method of the present embodiment as compared with that of the prior art in view of two points. First, the first term in the parenthesis at the right-hand side of the second line of expression 2 is "I" in the prior art, while in the present embodiment, the first term in the parenthesis is "1", by which the amount of calculation is reduced. Secondly, the second term in the parenthesis is "I·p (n)" in the prior art, while in the present embodiment, the first term in the parenthesis is "I(n)·δ(n)", which reduces the amount of calculation time for 2 reasons. One reason is that the number of iterations, I, required for the solving of a matrix-equation as a multi-variable non-linear problem, is considered to be larger than the number of iterations "I(n)" required for the solving of a one-variable equation as a one-variable non-linear problem. The second is that a minimal value of the number of atomic types p(n) included in molecule n is 1, but the δ function takes a value of 0 or 1.

Furthermore, the difference in the amount of calculation time between the prior art and the method of the present embodiment increases when number of molecules N is large. Explanation will now be given below on the reasons therefor.

In the method of the present embodiment, the atomic parameter is expressed by a function having the atomic charge and the averaged bond distance as variables. Form of the function becomes complicated during the processes of selection of a molecule and the determination of undetermined parameters. However, the range of atomic charge and averaged bond distance that can be taken by an atom is finite. Therefore, after sophistication of the function form to a certain degree, it is considered that the atomic parameter value can tentatively be determined with high accuracy for every combination of atomic charge and averaged bond distance. Therefore, in the case where the number of molecules is large, as for a molecule selected at the final phase of parameter determination process, the probability of tentative determination of the atomic parameter value with high accuracy becomes high for all atoms composing the molecule. This corresponds to the fact that, in corresponding the summation order on the molecule n in expression 9 with the calculation order of molecules used in atomic parameter determination, the probability that δ(n)=1 is high when n is small, and the probability that δ(n)=0 becomes higher as n increases. A small molecule number N is considered not to increase the probability of δ(n)=0 as much, even at the final phase of parameter determination process, but a large molecule number N is considered to increase the probability of δ(n)=0.

In addition, the method of the present embodiment has the effect of reducing the calculation number of a large molecule. The small part and large part of the constant term, which is multiplied by f(A(n)), in comparing of expression 2 with expression 9, show the amount of calculation time required for atomic parameter determination as discussed above; however, because f(A(n)) is a power function of atomic number A(n) of the molecule n, reduction of the calculation number of a molecule with a large A(n) is more important. The selection order of molecules in the present embodiment is, in general, "a small molecule early and a large molecule later." A first selected molecule is a molecule having an atomic parameter number of 1. A molecule having a non-hydrogen atom number of 1 such as methane, ammonia or the like corresponds to this type. Although there is an exception that a benzene molecule has an atomic parameter number of 1, due to having high symmetry, in spite of containing 6 carbon atoms, usually a small molecule is preferentially selected, and a large molecule is selected at the final phase of the parameter determination process. As discussed above, the probability that δ(n)=0 is high at the final phase of the parameter determination process; that is, the probability that iteration of the calculation is required to determine the undetermined atomic parameter is high.

A summary of the above discussion is provided in FIG. 26. It is assumed that the number of molecules N used in the atomic parameter determination is sufficiently large, and in addition, that the molecules are arranged in the calculation order in the present embodiment, relative to the summation symbol of expression 2 and expression 9. In spite of the early calculation stage 2601, namely when n is small, and the last calculation stage 2602, namely when n is large, the amount 2603 of calculation time for the molecule n in the prior art is constant. Because it is an iterative calculation method, in each iteration, for the solvation energy and the solvation energy gradient relative to change in the atomic parameter value, for all the atoms, the change in the calculation order of the molecules does not effect the amount of calculation. On the other hand, for the amount 2604 of calculation time for the molecule n in this embodiment of this invention, because there is a high probability of execution of the determination process of undetermined parameter at the early phase of calculation, the value of δ(n)=1 is taken in expression 9. However, because in the early calculation stage 2601, the probability is high that a selected molecule is small, and thus the amount f(A(n)) 2605 of calculation time required for the calculation of solvation energy in one iteration is small as a result. For the amount 2604 of calculation time for the molecule n at the last calculation stage, a value of δ(n)=0 is taken in expression 9, because the possibility is high that the atomic parameters are tentatively determined for all atoms composing a molecule. Because in the last calculation stage 2602, the probability is high that a selected molecule is large, the amount f(A(n)) 2605 of calculation of solvent energy in one interation, is large as result.

Embodiment 5

The present embodiment shows the atomic parameter determination result under the fixed acceptable error condition using 63 molecules. The contents of molecules used in this atomic parameter determination include 18 cations, 11 anions and 34 neutral molecules. The acceptable error was set as 1.4 kcal/mol for the cations and the anions and 0.20 kcal/mol for the neutral molecules. As a result, 57 atomic parameters were obtained.

FIG. 27 is comparison of the amount of calculation time in this embodiment of this invention and that of the prior art, for atomic parameter determination method using 63 molecules. In the present embodiment, the average number 2701 of iterations of calculation of solvation energy of each of the molecules in the sequential determination process of 57 atomic parameters was 3.32 iterations. In addition, the amount 2702 of calculation time, defined as the calculation time required for atomic parameter determination using one computer, was about 504 minutes. The calculation time for using a gradient matrix could not actually be measured, however, the lower bound 2703 of the amount of calculation time was estimated as 3183 minutes according to the following calculation. First, in expression 6, there is an actually measured value of the amount f(A(n)) of calculation time required for solvation energy calculation in one iteration, on each of the molecules n. In addition, the number of atomic types contained in each of the molecules was determined according to the definition of atomic type provided by Tomasi et al, [V. Barone, M. Cossi and J. Tomasi, "A new definition of cavities for the computation of solvation free energies by the polarizable continuum model", Journal of Chemical Physics, Vol. 107, 3210, (1997)]. Here, the only unknown value left is the number of iterations I. The minimization of an objective function defined by a matrix-equation is a multi-variable non-linear problem, and many methods for reducing the number of iterations required for solving are present. However, the number of iterations I is considered to be more than the 3.32 iterations that is the averaged value of the number of iterations required for solving a one-variable equation. Accordingly, the number of iterations was estimated to be the minimal integer I=4 that is equal to or larger than 3.32. From the result, the atomic parameter determination method of the present embodiment can be said to provide an amount of calculation time that is about 6.3 times less at a minimum than that of the prior art. In the prior art, it is required that atomic type be re-defined to iterate whole process of atomic parameter determination, when a desired accuracy is not obtained, and therefore, when this number of iterations is taken as k, the difference in the amount of calculation time becomes 6.3 times k iterations.

Embodiment 6

Generalization of the atomic parameter determination method by the fixed acceptable error condition, of the present embodiment, is possible by the substitutions of a molecule with "an analysis object", atoms composing a molecule with "elements composing an analysis object", an atomic parameter with "an elemental parameter", the experimental value of solvation energy with simply "the experimental value", and calculation value of solvation energy with simply "calculation value". Explanation will now be given below on the parameter determination method by the fixed generalized acceptable error condition, with reference to FIG. 28 and FIG. 29.

Figure 28:
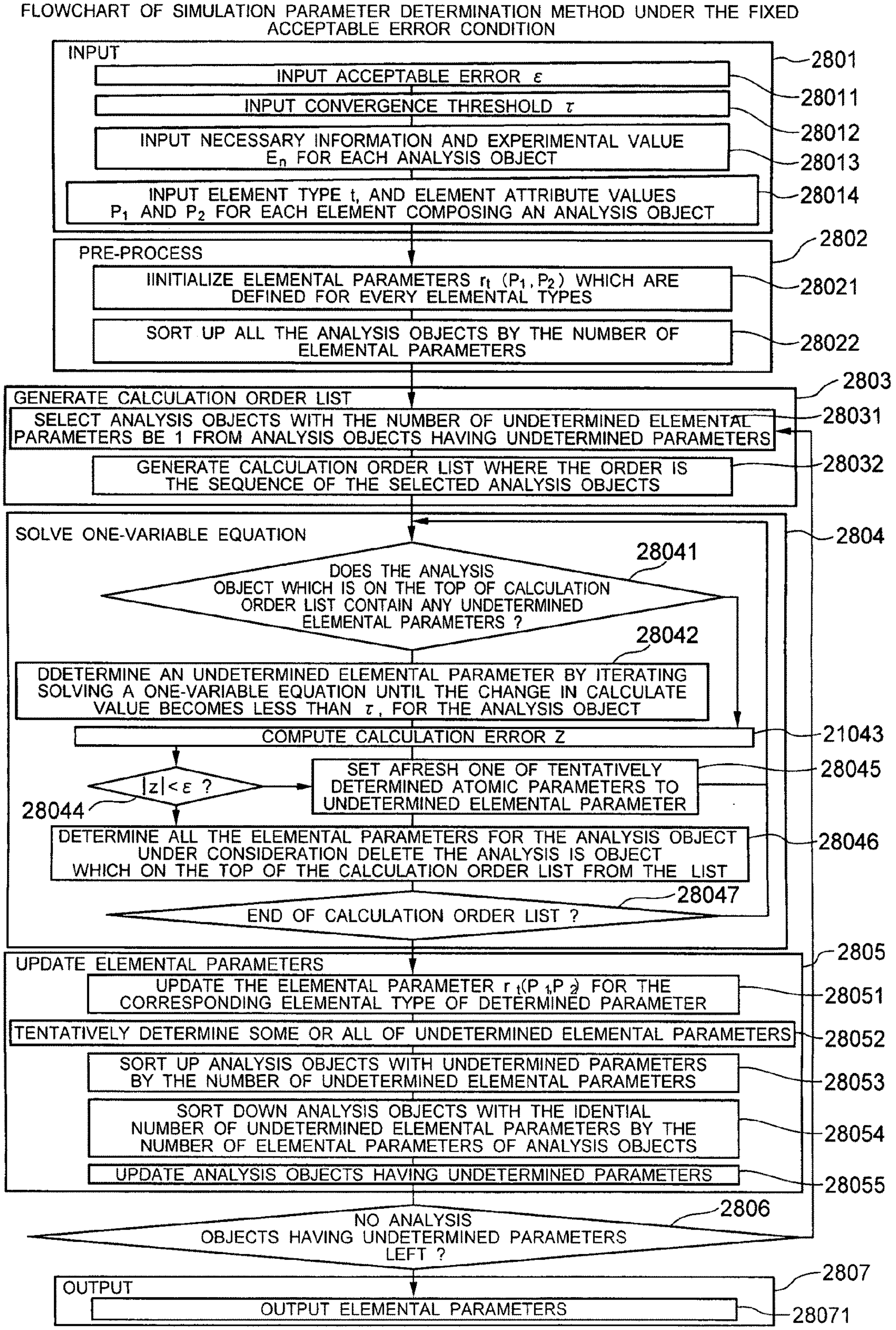
FIG. 28 is a flowchart of a simulated parameter determination method under a fixed acceptable error condition.

FIG. 28 is a flowchart of the simulation parameter determination method under the fixed acceptable error condition. First of all, an acceptable error ϵ28011, a convergence threshold τ28012, information necessary for calculation of an analysis object, and an the experimental value 28013 and the elemental type and element attribute value 28014 for each element composing an analysis object are input from an input apparatus 2801. Subsequently, in an initialization step 2802 in which elemental parameters are defined for each atomic type, an elemental parameter initialization step 28021 and a sorting up step 28022 of sorting all analysis objects according to the number of undetermined elemental parameters are executed. In a calculation order list generation step 2803, a selection step 28031 of analysis objects having an undetermined elemental parameter number of equal to or less than 1 from the analysis objects containing undetermined elemental parameters, and a calculation order list generation step 28032 in which ordering of an arrangement for calculation of the analysis objects selected is determined are executed. Then in a one-variable equation solving step 2804, in the case where "inclusion" is judged, in the judgment step 28041 on whether an analysis object at the top of a calculation order list contains undetermined elemental parameters or not, the solving of a one-valuable equation is iterated on an analysis object at the top of calculation order list, until the amount of change of the calculated value becomes below τ, and an undetermined elemental parameter determination step 28042 is executed. Then in spite of the result of the judgment step 28041, a calculation error computing step 28043 of the difference between the calculation value of the analysis object using the elemental parameter and the experimental value, and a comparing step 28404 of the calculation error with the acceptable error are executed, and in the case where the calculation error is greater than the acceptable error, the procedure returns to the step 28041 via a setting afresh step 28045 of the undetermined elemental parameter for one of the tentatively determined atomic parameters; in the case where the calculation error is equal to or less than the acceptable error, the calculation order list update step 28046 is executed. In a calculation order list termination judging step 28047, in the case where an analysis object is still present at the top of calculation order list, the procedure returns to the step 28041; in the case where an analysis object is no longer present, the procedure proceeds to an elemental parameters update step 2805. Next, in the elemental parameters update step 2805, as for an elemental type corresponding to the determined elemental parameter, an elemental parameter expression formula update step 28051 in which the equation is a function of the value of the elemental attribute, a tentatively determining step 28052 of some or all of the values of the elemental parameters of an undetermined element, a sorting up step 28053 of sorting the undetermined analysis objects according to the number of undetermined elemental parameters, a sorting down step 28054 of sorting analysis objects having the same number of undetermined elemental parameters according to the number of elemental parameters, and an undetermined analysis object update step 28055 are executed. In an elemental parameter calculation termination judging step 2806, whether an undetermined analysis object is still present or not, is judged. In the case where the undetermined analysis object is present, the calculation order list generation step 2803, the one-variable equation solving step 2804 and the elemental parameters update step 2805 are iterated; and in the case where no undetermined analysis object is present, the determined elemental parameters 28071 are output by the output apparatus 2807.

Figure 29:
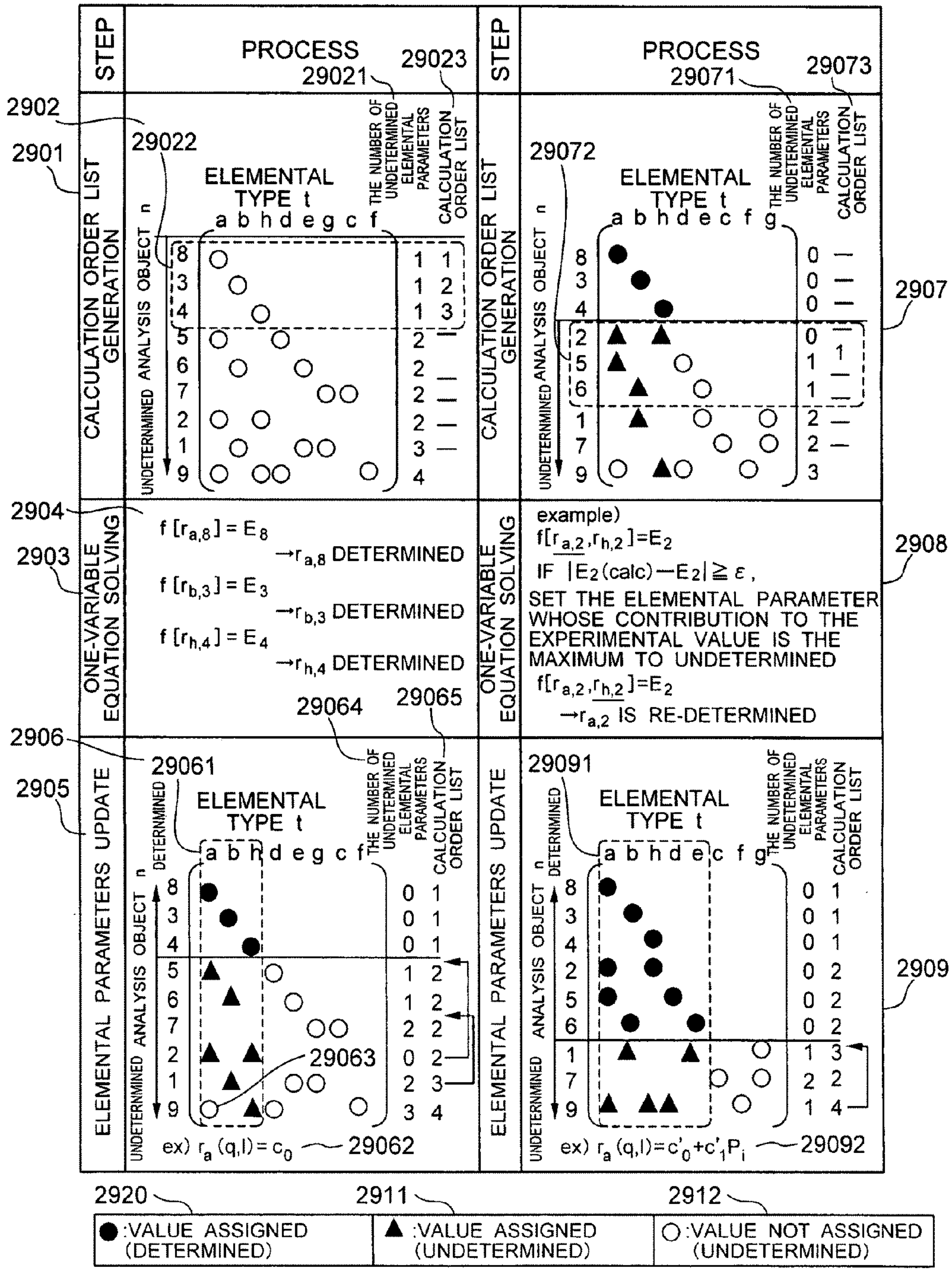
FIG. 29 shows details of processes in a calculation order list generation step, a one-variable equation solving step, and an elemental parameter update step, in the parameter determination method under a fixed acceptable error condition.

FIG. 29 illustrates the details of processes in the calculation order list generation step, the one-variable equation solving step, and the elemental parameters update step, in the elemental parameter determination method. As an example, explanation will now be given on the first and second rounds of iterations of each of the steps, for the case where the number of analysis objects is 9 and the number of elemental type of 8. In a first round process 2902 to be executed in the calculation order list generation step 2901, the analysis objects 29022 (analysis object 8, analysis object 3 and analysis object 4) having the number of undetermined elemental parameters of 1 or less are selected from analysis objects sorted up according to the number 29021 of undetermined elemental parameters in advance. The calculation order of these analysis objects is analysis object 8, analysis object 3 and analysis object 4, that is, the same as the arrangement order of the analysis objects, and this order is stored in a calculation order list 29023. In a first round process 2904 to be executed in the one-variable equation solving step 2903, the undetermined elemental parameters are determined based on the calculation order list. Because the first calculation is on analysis object 8, the calculated value is obtained using elemental parameter $r_{a,8}$, and the value of $r_{a,8}$ is determined so as to reproduce the experimental value $E_8$. In this process, the value that can reproduce the experimental value is identified while changing $r_{a,8}$, and therefore, iterated solving of a one-variable equation is required. A similar process is executed on the 2 selected analysis objects left. In a first round process 2906 to be executed in an elemental parameters update step 2905, the formula for expressing the elemental parameter as a function of values of the elemental attributes, is updated on a, b and h, which are of the elemental type 29061 corresponding to the determined elemental parameter. The formula for expressing the elemental parameter may be a function not having the value of an elemental attribute as a variable. For example, the elemental parameter 29062 of an elemental type a can be expressed as $r_a(p_1,p_1)=c_0=r_{a,8}$. Then, the undetermined elemental parameter value that is classified to elemental type a is obtained as $r_a(p_1,p_2)=c_0$. However, on the element 29063, where elemental attribute value differs from that of other elements belonging to the identical elemental type by a certain threshold or more, there may be an option of not tentatively determining the elemental parameter. The element 2910 having the determined value of the elemental parameter is indicated by a filled circle, tentatively determined element 2911 is indicated by a filled triangle, and the value not assigned, namely the undetermined element 2912 is indicated by an open circle. Then, at this time, 6 analysis objects 5, 6, 7, 2, 1 and 9 are re-arranged in an order sorted up according to the number 29064 of undetermined elemental parameters. In addition, in the case where the number of undetermined parameters is the same, the analysis objects are re-sorted down according to the number 29065 of elemental parameters. Here, all 6 of these analysis objects become new undetermined analysis objects. In a second round process 2907 to be executed in the calculation order list generation step 2901, the analysis object, having the number 29072 (analysis object 2, analysis object 5 and analysis object 6) of undetermined elemental parameters 29071 of 1 or less, are selected from the analysis objects arranged in advance. The calculation order of these analysis objects is analysis object 2, analysis object 5, and analysis object 6, and this order is stored in a calculation order list 29073. In a second round process 2908 to be executed in the one-variable equation solving step 2903, the undetermined elemental parameters are determined based on the calculation order list. Explanation will particularly be given on analysis object 2, which does not have undetermined parameters. First of all, the calculation value is obtained using an elemental parameter given. Then, whether the absolute value of the calculation error, defined as the difference between the calculated value and the experimental value, is below an acceptable error or not, is determined. In the case where the absolute value of the calculation error is equal to or larger than acceptable error, any one of the 2 elemental parameters, $r_{a,2}$, and $r_{h,2}$, contained in analysis object 2 is reset as an undetermined elemental parameter. The elemental parameter to be selected should be the one having the larger gradient of the calculation value relative to change in both elemental parameters. In the case where the selected parameter is $r_{a,2}$, the value of $r_{a,2}$ is determined so as to reproduce the experimental value $E_2$. In a second round process 2909 to be executed in the atomic parameters update step 2905, the formula for expressing the elemental parameter, as a function of the value of an elemental attribute, is updated on a, b, h, d and e, which are of the elemental type 29091 corresponding to the determined elemental parameter. For example, the elemental parameter 29092 of an elemental type a, is updated from $r_a(p_1,p_2)=c_0=r_{a,8}$, however, use of more complicated function form is required, because the use of the newly determined value of $r_{a,2}$ is required as an elemental parameter of elemental type a, based on calculation result of analysis object 2. For example, updating to $r_a(p_1,p_2)=c'_0+c'_1\,p_1$ may be allowed. After updating the formula and the determination of value of elemental parameter of an element classified to the corresponding elemental type, the undetermined analysis objects are rearranged in the same manner as the first round of iteration. This process is iterated until no undetermined analysis objects are present.

Finally, the amount of calculation time in the parameter determination method by the prior art and that of the parameter determination method according to the present embodiment are compared. The amount of calculation time in the prior art is described in expression 2. In the present embodiment, the analysis objects are sequentially selected, and the calculation is iterated for each of the analysis objects until the amount of change of the calculated value becomes below a convergence threshold. The number of iterations is expressed by I(n), which differs according to analysis object, however, there are analysis objects having an undetermined elemental parameter number of 0. Therefore, the amount of calculation time is calculated by "expression 10" using a δ function, which is defined as 1 for analysis objects requiring the undetermined elemental parameter determination process, and defined as 0 for analysis objects that do not require the process.

$$T_{invention} = \sum_{n=1}^{N} (1 + I(n)\cdot\delta(n))f(A(n)) \qquad \text{(Expression 10)}$$

Comparison between expression 2 and expression 10 shows a smaller amount of calculation time in the method of the present embodiment as compared with the prior art in view of 2 points. First, the first term in the parenthesis at the right-hand side of the second line of expression 2 is "I" in the prior art, while in the present embodiment, the first term in the parenthesis is "1", by which the amount of calculation time is reduced. Second, the second term in the parenthesis is "I·p (n)" in the prior art, while in the present embodiment, the first term is "I(n)·δ(n)", therefore, the amount of calculation time is less by the following two reasons. One reason is that the number of iterations, I, required for solving a matrix-equation as a multi-variable non-linear problem, is considered to be larger than the number "I(n)" of iterations required for solving a one-variable equation as a one-variable non-linear problem. The second reason is that the minimum value of the number p(n) of elemental types contained in an analysis object n is 1; on the other hand, the δ function takes a value of either 0 or 1.

Embodiment 7

Explanation will be given on a mounting example of a user interface accompanying the atomic parameter determination method, using FIG. 30 to FIG. 33.

Figure 30:
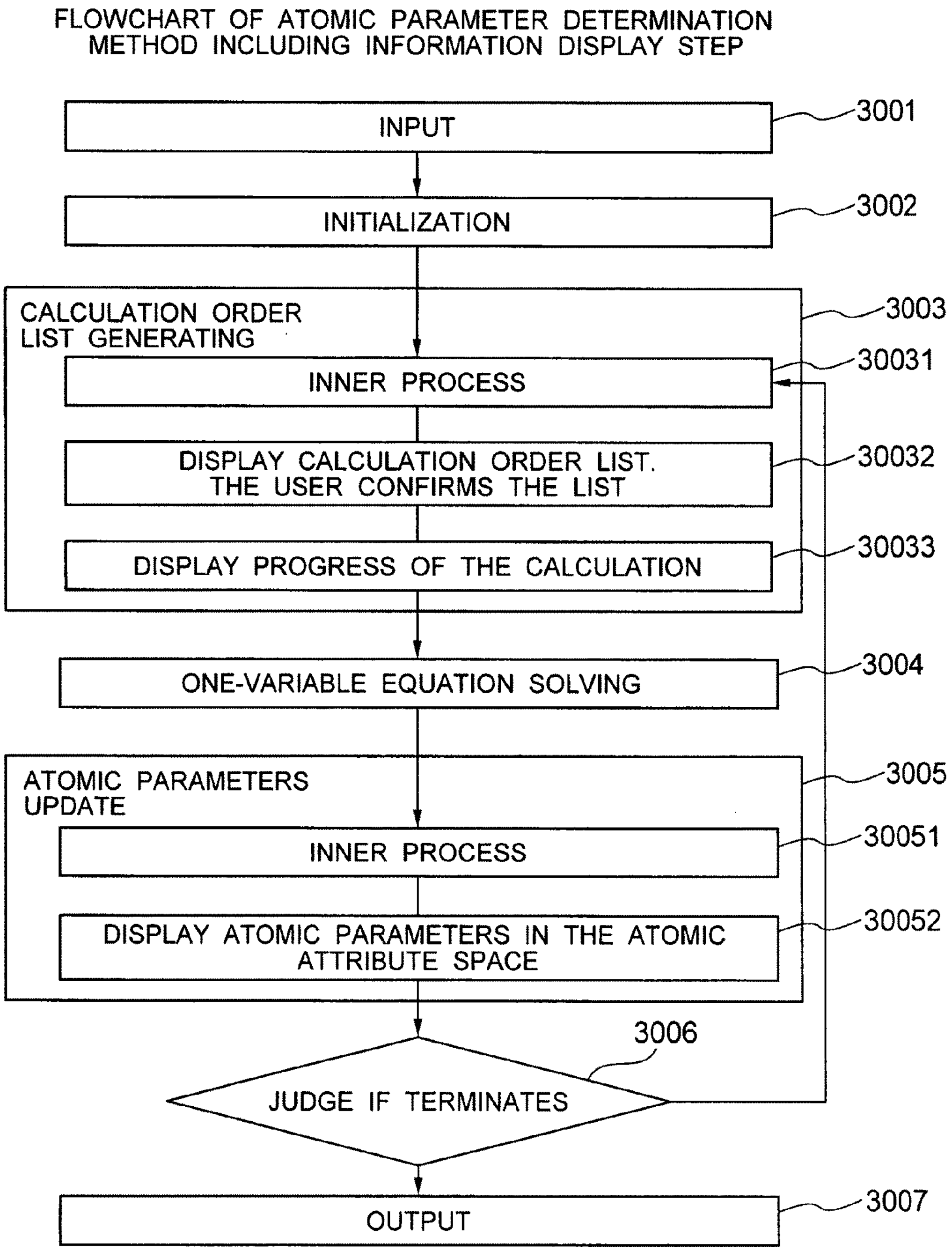
FIG. 30 is a flowchart of an atomic parameter determination method that includes an information display step.

FIG. 30 is a flowchart in the atomic parameter determination method that includes the information display step. Explanation has been provided in detail, in embodiment 1 and embodiment 4, on sections not relating to information display, and therefore such explanation is simplified here. In the atomic parameter determination according to the present embodiment, an input step 3001 and an initialization step 3002 are executed first. Then, in a calculation order list generation step 3003, a calculation order list is displayed on a screen by a calculation order list display step 30032 via an inner process 30031. A user may add changes to the calculation order displayed on a screen, and finally settle the calculation order. In the calculation progress display step 30033, an outline of the progress of the atomic parameter calculation and a calculation progress according to molecule are displayed. Then, an equation solving step 3004 is executed. In an atomic parameters update step 3005, via an inner process 30051, in an atomic parameter display step 30052, the atomic parameter is displayed using space formed by the atomic parameter, the atomic charge, and the averaged bond distance. Finally, an output step 3007 is executed via an termination judging step 3006. In the above flowchart, processes relating to the information display are 3-fold: the calculation order list display step 30032, the calculation progress display step 30033 and the atomic parameter display step 30052.

Figure 31:
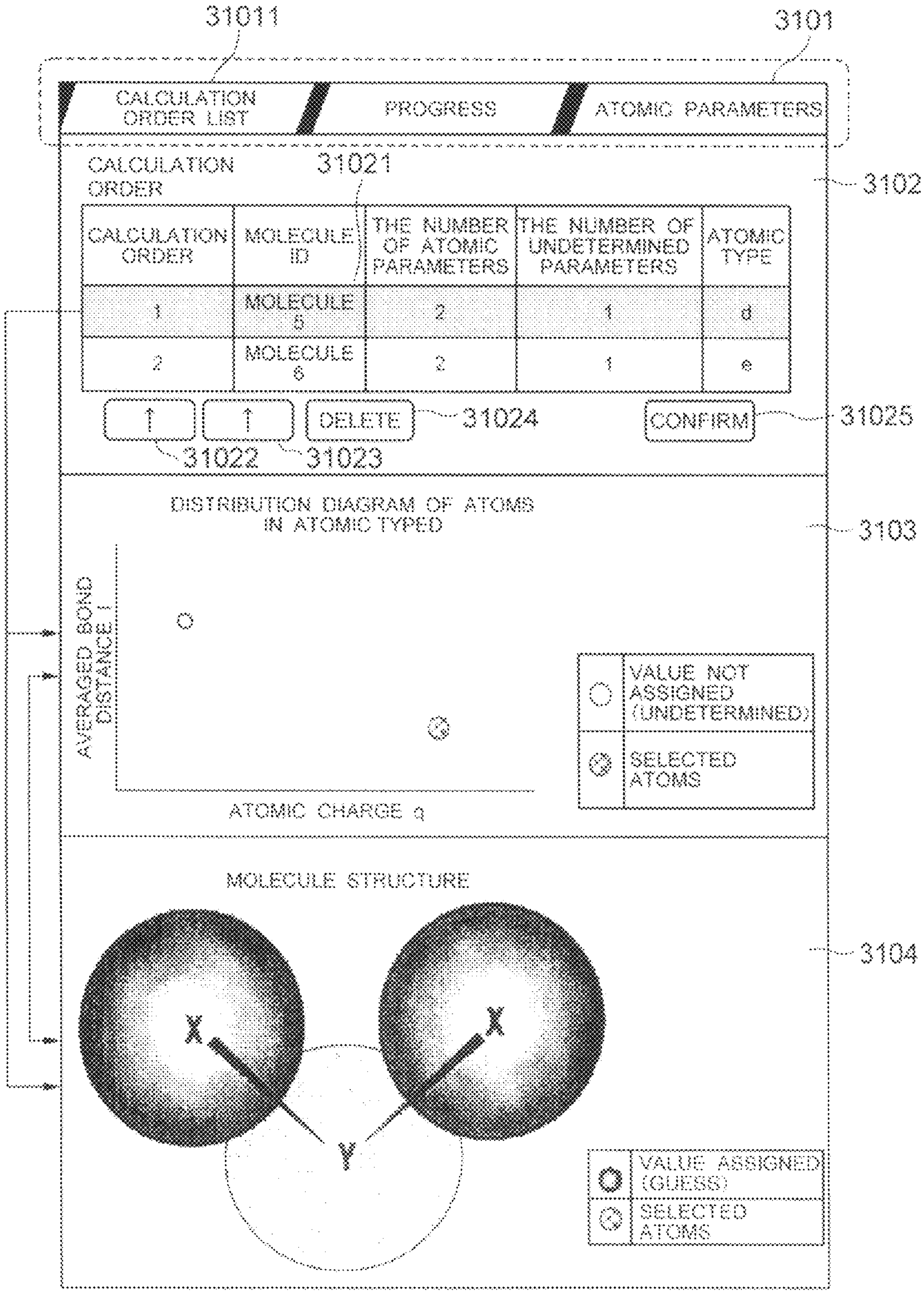
FIG. 31 shows an example of a screen display in a calculation order list display step.

FIG. 31 is an example of a screen display in the calculation order list display step. A calculation order list tab 31011 is selected among 3 display objects contained in the display object displaying tab 3101. A display view of the calculation order list is divided into 3 regions; namely, the calculation order display region 3102, the distribution diagram display region 3103 and the molecular structure map display region 3104. At the early display stage, the calculation order list 31021 is displayed in the calculation order display region 3102. These tables can be selected line by line, and, in this example, molecule 5 is in a selected status. The calculation order of selected molecules can be adjusted by an up-arrow button 31022 or a down-arrow button 31023. In addition, by a delete button 31024, a "no-calculation" choice for the selected molecule is also possible. When a user pushes a confirm button 31025, the calculation order is settled. Supporting data for a user to judge change in the calculation order includes a distribution chart and a molecular structure chart. In the distribution diagram display region 3103, an example of an atomic distribution chart is shown where the undetermined atomic parameters of molecule 5 are classified into atomic type d, to which it belongs. Atoms are plotted on a plane formed by atomic charge and averaged bond distance. The plot has different shapes or a patterns to represent statuses of "value assigned", "value not assigned" or the like for atomic parameters corresponding to each atom, or a selection status in a calculation order list 31021. In the present embodiment, the number of atoms classified to atomic type d is only 2, and both atoms are plotted at different positions on a plane; therefore, it is visually understood that even if one atomic parameter is determined, the other atomic parameter cannot necessarily be tentatively determined with high accuracy based on thus determined atomic parameter. Based on this information, a user may choose to descend the calculation priority order of molecule 5. In the molecular structure map display region 3104, a molecular conformation and a sphere having a radius corresponding to the atomic parameter values of each molecule forming the molecule are displayed in an overlapped way. The sphere is also displayed here with different patterns representing statuses of "value assigned", "value not assigned" or the like for atomic parameters corresponding to each atom, or a selection status in calculation order list 31021. Molecule 5 is a molecule composed of 3 non-hydrogen atoms, and two of them are understood to be equivalent in view of symmetry. Atomic parameter value for the atom X has been tentatively determined already, and the value has been assigned. On the other hand, it is visually understood that the atomic parameter value for the atom Y will be determined from now. Atoms in a molecule displayed in a plot in the distribution diagram display region 3103 or in the molecular structure map display region 3104 may also be selected. When a plot is selected for a structure of a molecule to which the corresponding atom belongs, it is displayed in the molecular structure map display region 3104. In addition, when an atom is selected, a distribution chart of an atom related to the corresponding atomic type is displayed in the distribution diagram display region 3103. These functions are capable of furnishing information on other molecules that directly relate to the parameter determination of molecule 5 recognized.

FIG. 32 is an example of a screen display in the calculation progress display step. The progress tab 32011 is selected among 3 display objects contained in the display object displaying tab 3201. The display view of a calculation progress is divided into the display region for the summary of an atomic parameter calculation progress 3202 and the display region of an atomic parameter calculation progress for each molecule 3203. In the display region for the summary of an atomic parameter calculation progress 3202, a summary of the result of a calculation status for a molecule such as "determined", "in progress" or "undetermined", and the calculation elapsed time, are displayed. In addition, in the display region of an atomic parameter calculation progress for each molecule 3203, a calculation status for each molecule, a molecular ID, a number of atomic parameters and a number of undetermined atomic parameters are displayed. From these sets of information, a progress degree of the parameter determination procedure can be understood.

Figure 33:
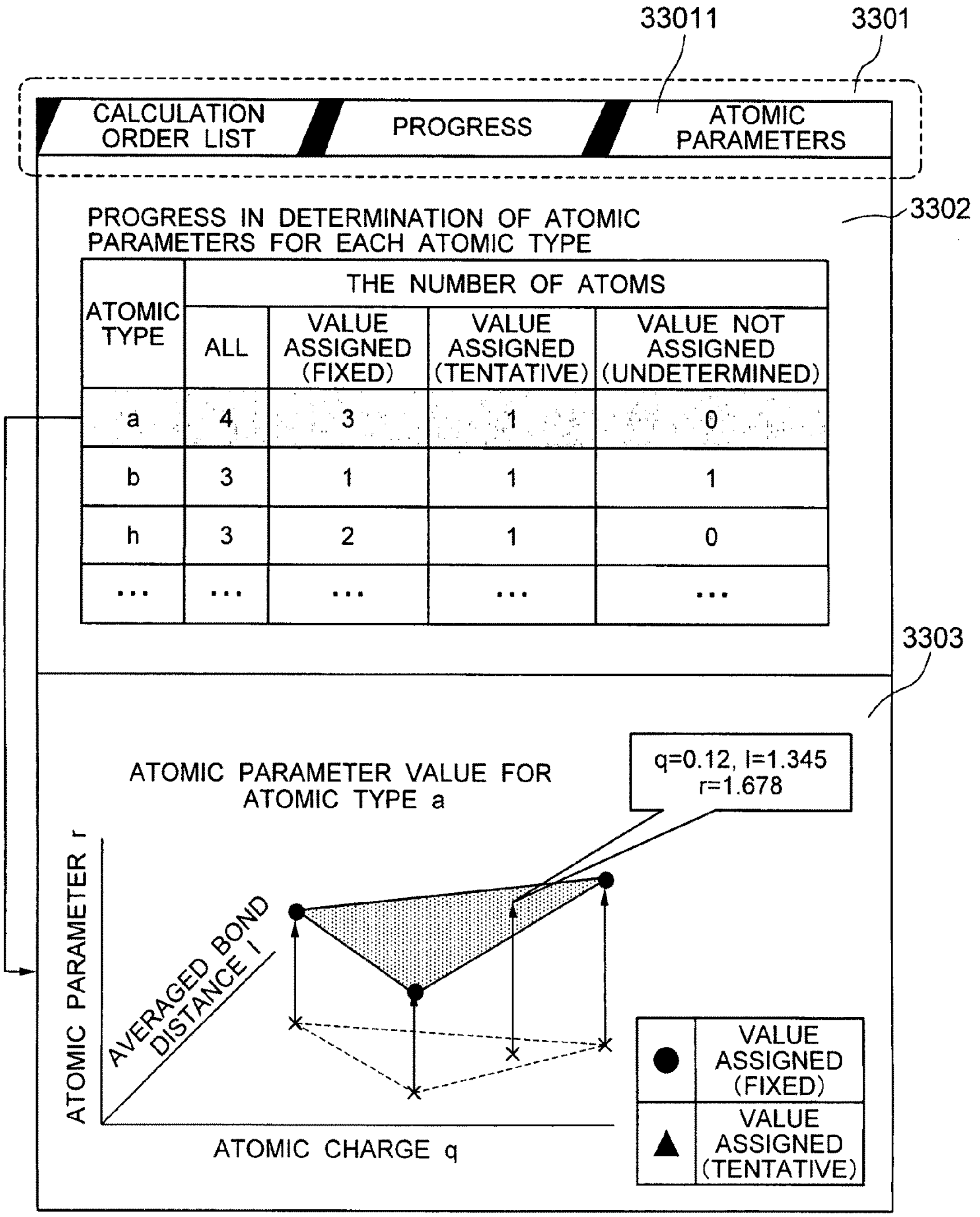
FIG. 33 shows an example of a data view in an atomic parameter display step.

FIG. 33 is an example of a screen display in the atomic parameter display step. The atomic parameter tab 33011 is selected among 3 display objects contained in the display object displaying tab 3301. A display view of atomic parameters is divided into the display region of the atomic parameter determination status for each atomic type 3302, and the display region of the atomic parameter value 3303. At the early display stage, an atomic type, a total number of atoms belonging to the corresponding atomic type, a number of atoms having atomic parameters determined, a number of atoms being tentatively determined, and a number of undetermined atoms are displayed in a table form in the display region of the atomic parameter determination status for each atomic type 3302. These tables can be selected by each line, and in this drawing, atomic type a is in a selected status. In the display region of atomic parameter value 3303, the atomic parameter value in a selected atomic type is displayed using the space formed by the atomic parameter, the atomic charge, and the averaged bond distance. By graphically displaying the atomic parameter value in a three-dimensional space, dependence of the atomic parameter on atomic charge and averaged bond distance can intuitively be understood.

Description will now be given below on the effect of the above-described embodiments.

By a system for preferentially selecting a molecule containing atomic parameters that can be determined with high certainty and for controlling the calculation order of solvation energy relating to the selected molecule according to the calculation order list, as in the present embodiment, atomic parameter determination that requires a smaller amount of calculation time as compared with the prior art is possible.

In embodiment 1, the possibility of atomic parameter determination used in the calculation of solvation energy of a molecule, requiring a smaller amount of calculation time as compared with the prior art was shown. In embodiment 2, by demonstration a calculation involving 10 molecules, it was shown that the atomic parameter determination method of the present embodiment is capable of determining atomic parameters with equivalent accuracy, and in a smaller amount of calculation time, as compared with the prior art method. In embodiment 4, it was shown that atomic parameters used in the calculation of solvation energy of a molecule can be determined in a smaller amount of calculation time as compared with the prior art, and that the calculation error can also be controlled by the atomic parameter determination method with a fixed acceptable error. In embodiment 5, it was shown, by an example calculation involving 63 molecules, that the amount of calculation time required for the atomic parameter determination method under the fixed acceptable error condition is smaller than the estimation level of the amount of calculation required for the method of the prior art.

In addition, by a system for preferentially selecting an analysis object containing parameters that can be determined with high certainty and for controlling calculations relating to the analysis objects selected, by using a calculation order list, according to the present embodiment, atomic parameter determination that requires a smaller amount of calculation time as compared with the prior art is possible.

The embodiments of this invention are capable of dividing calculation objects into elements, and defining the values of the attributes of each of the elements, and thus is applicable to the case where evaluation of the calculated value or the gradient relative to parameter change of the calculated value is the rate determining step of calculation time.

Furthermore, embodiments of this invention are capable of reflecting user knowledge to parameter determination, because the determination process of calculation order of analysis objects, as important elements of the parameter determination method, is visualized, and function for a user to change the calculation order is provided. In embodiment 7, a display example of supporting data for a user to judge change in the calculation order was shown.

It should be noted that the description of the reference numerals is as follows.

101: Calculation object molecule
102: Water-based solvent
103: Space occupied by a molecule
104: Space occupied by dielectrics
105: Sphere arranged on an atom
106: Radius of a sphere arranged on an atom
201: Input apparatus
2011: Input of energy convergence threshold τ
2012: Input of a structure and the experimental value of solvation energy of a molecule
2013: Input of atomic type for each atom composing a molecule
202: The atomic parameter initialization step
203: The matrix generation step
204: The matrix-equation solving step
205: The atomic parameters update step
206: The atomic parameter calculation termination-judging step
207: Output apparatus
2071: Output of converged atomic parameter value
301: The matrix generation step
302: Process to be executed in the matrix generation step
3021: Solvation energies of all molecules
3022: Solvation energy gradient of all molecules relative to change in each atomic parameter
3023: Matrix composed of molecular number as the number of line, and (the number of atomic type+1) as the number of columns
3024: Matrix element
303: The matrix-equation solving step
304: Process to be executed in the matrix-equation solving step
3041: Matrix
3042: Solution vector having the number of element of (the number of atomic type+1)
3043: The experimental value vector of solvation energy, having the same element number as the number of molecule
3044: Objective function
305: The atomic parameters update step
306: Process to be executed in the atomic parameters update step
3061: New atomic parameter vector
3062: Atomic parameter vector before update
3063: Vector deleted only top element from the solution vector obtained in the matrix equation-solving step 303
401: Atomic type
402: The resultant atomic parameter value
403: Atomic type that each atom contains
501: Calculation amount
502: Calculation error
503: Plot of lozenge marks
601: Input apparatus
6011: Input of convergence threshold t
6012: Input of necessary information and the experimental value for calculation of analysis object
6013: Input of an elemental type for each element composing an analysis object
602: The elemental parameter initialization step
603: The matrix generation step
604: The matrix-equation solving step
605: The elemental parameters update step
606: The elemental parameter calculation termination-judging step
607: Output apparatus
6071: Output of converged elemental parameter
701: The matrix generation step
702: Process to be executed in the matrix generation step
7021: Calculated value of all analysis objects
7022: Gradients of calculated value of all analysis objects to change of each elemental parameter
7023: Matrix composed of analysis object number as the number of line, and (elemental type number+1) as the number of columns
7024: Matrix element
703: The matrix-equation solving step
704: Process to be executed in the matrix-equation solving step
7041: Matrix
7042: Solution vector having the number of element of (elemental type number+1)
7043: The experimental value vector having the same elemental number as analysis object number
7044: Objective function
705: The elemental parameters update step
706: Process to be executed in the elemental parameters update step
7061: New elemental parameter vector
7062: Elemental parameter vector before update
7063: Vector deleted only top element from the solution vector obtained in the matrix-equation solving step 303
801: Input apparatus
8011: Input of energy convergence threshold
8012: Input of three-dimensional coordinate information and the experimental value of solvation energy for molecule
8013: Input of atomic type, atomic charge, and averaged bond distance for each atom

802: The initialization step
8021: The initialization step of atomic parameter
8022: The sorting up step of all the molecules by the number of undetermined atomic parameters
803: Calculation order list generation step
8031: The molecule selection step
8032: The calculation order determination step
804: The one-variable equation solving step
8041: The undetermined atomic parameter determination step
8042: Calculation order list update step
8043: Calculation order list termination judging step
805: The atomic parameters update step
8051: The atomic parameter expression formula update step
8052: The sorting up step of undetermined molecules by the number of undetermined atomic parameters
8053: The sorting down step of molecules with the identical number of undetermined atomic parameters by the number of atomic parameters
8054: The undetermined molecule update step
806: The atomic parameter calculation termination judging step
807: The calculation error computing step
808: Output apparatus
8081: Output of determined atomic parameter value
901: Calculation order list generation step
902: First round process to be executed in calculation order list generation step
9021: The number of undetermined atomic parameters
9022: Molecule having the number of undetermined atomic parameter of 1
9023: Calculation order list
903: The one-variable equation solving step
904: First round process to be executed in the one-variable equation solving step
905: The atomic parameters update step
906: First round process to be executed in the atomic parameters update step
9061: Atomic type corresponding to determined atomic parameter
9062: Atomic parameter of the atomic type a
9063: Atom, wherein atomic charge is apart from that of other atom belonging to the identical atomic type by certain threshold or more
9064: The number of undetermined atomic parameters
9065: The number of atomic parameters
907: Second round process to be executed in calculation order list generation step
9071: The number of undetermined atomic parameters
9072: Molecule having the number of undetermined atomic parameters of 1
9073: Calculation order list
908: Second round process to be executed in the one-variable equation solving step
909: Second round process to be executed in the atomic parameters update step
9091: Atomic type corresponding to determined atomic parameter
9092: Atomic parameter of atomic type a
910: "Value assigned" atom
911: "Value not assigned" (undetermined) atom
1001: Three-dimensional coordinate information of the molecule
1002: Structure of para-xylene molecule
1003: The experimental value of solvation energy
1004: The experimental value of solvation energy of a para-xylene molecule
1005: The number of atomic parameters
1006: The number of atomic parameters of a para-xylene molecule
1101: Atomic type
1102: Atomic charge
1103: Averaged bond distance
1201: Atomic information
1202: Atomic parameter value
1203: Status of atomic parameter
1204: Status of atomic parameter (value assigned)
1205: Status of atomic parameter (value not assigned)
1206: Molecular information
1207: The number of "value assigned" atomic parameters contained in a molecule
1208: The number of "value not assigned" atomic parameters contained in a molecule
1209: Calculation status of the molecule
1210: Initial value of molecular information
1211: Initial value of number of "value assigned" atomic parameters contained in the molecule
1212: Initial value of Number of "value not assigned" atomic parameters contained in the molecule
1213: Initial value of calculation status of the molecular
1301: Calculation order list
1302: The input file generation step
1303: Input file for solvation energy calculation
1304: The solvation energy calculation job input step
1305: Computer
1306: Solvation energy calculation program
1307: The calculation result outputting step
1308: Output file for solvation energy calculation result
1309: The output result processing step
1401: Atomic parameter value
1402: Value of an atomic attribute
1403: Atom having "value assigned" atomic parameter
1404: Atom having "value not assigned" atomic parameter
1405: A linear function correlating atomic parameter value with value of an atomic attribute
1406: Value of an atomic attribute of a "value not assigned" atom
1407: "Value not assigned" atom having value of an atomic attribute far apart from value of an atomic attribute of a "value assigned" atom
1501: Atomic parameter value
1502: Atomic charge
1503: Averaged bond distance
1504: Atom having "value assigned" atomic parameter
1505: Atom having "value not assigned" atomic parameter
1506: A linear function correlating atomic parameter value with value of an atomic attribute
1507: Atomic charge and averaged bond distance of a "value not assigned" atom
1508: "Value not assigned" atom having value of an atomic attribute far apart from value of an atomic attribute of a "value assigned" atom
1601: Atomic type
1602: Determination process of atomic parameter value
1603: Atomic type that each atom contains
1604: Molecule having the number of undetermined atomic parameters of 1
1605: Atomic parameter $r_{CH3}$
1606: Atomic parameter $r_{CH3}$
1607: Undetermined atomic parameter
1608: The number of undetermined atomic parameters
1609: Molecule having the number of undetermined atomic parameters of 1

1610: Four atomic parameters determined with respect to atomic type $NH_2$

1611: Atomic parameter $r_{NH2}$

1701: Amount of calculation

1702: Calculation error

1703: Plot of lozenge marks

1704: Plot of rectangular marks

1801: Molecule

1802: The experimental value of solvation energy

1803: Calculation error in the prior art

1804: Calculation error in an embodiment of this invention

1805: Averaged absolute error

1901: Input apparatus

19011: Input of energy convergence threshold $\tau$

19012: Input of necessary information and the experimental value for calculation of analysis object

19013: Input of elemental type and element attribute value of each element

1902: The initialization step

19021: The elemental parameter initialization step

19022: The sorting up step of all analysis objects by the number of undetermined elemental parameters

1903: Calculation order list generation step

19031: The analysis objects selection step

19032: The calculation order determination step

1904: The one-variable equation solving step

19041: The undetermined elemental parameter determination step

19042: Calculation order list update step

19043: Calculation order list termination judging step

1905: The elemental parameters update step

19051: The elemental parameter expression formula update step

19052: The sorting up step of undetermined analysis objects by the number of undetermined elemental parameters

19053: The sorting down step of analysis objects with the identical number of undetermined elemental parameters by the number of elemental parameters

19054: The undetermined analysis objects update step

1906: The elemental parameter calculation termination judging step

1907: The calculation error computing step

1908: Output apparatus

19081: Output of determined elemental parameters

2001: Calculation order list generation step

2002: First round process to be executed in calculation order list generation step

20021: The number of undetermined elemental parameters

20022: Analysis object having the number of undetermined elemental parameters of 1

20023: Calculation order list

2003: The one-variable equation solving step

2004: First round process to be executed in the one-variable equation solving step

2005: The elemental parameters update step

2006: First round process to be executed in the atomic parameters update step

20061: Elemental type corresponding to determined elemental parameter

20062: Elemental parameter of an elemental type a

20063: Element, wherein elemental attribute value is apart from that of element used for the parameter determination by certain threshold or more

20064: The number of undetermined elemental parameters

20065: The number of elemental parameters

2007: Second round process to be executed in calculation order list generation step

20071: The Number of undetermined elemental parameters

20072: Analysis object having the number of undetermined elemental parameters of 1

20073: Calculation order list

2008: Second round process to be executed in the one-variable equation solving step

2009: Second round process to be executed in the atomic parameters update step

20091: Elemental type corresponding to determined elemental parameter

20092: Elemental parameter of elemental type a

2010: "Value assigned" element

2011: "Value not assigned" (undetermined) element

2101: Input apparatus

21011: Input of acceptable energy error c

21012: Input of energy convergence threshold t

21013: Input of three-dimensional coordinate information and the experimental value of solvation energy for molecule

21014: Input of atomic type, atomic charge and averaged bond distance for each atom

2102: The initialization step

21021: The atomic parameter initialization step

21022: The sorting up step of all molecules by the number of undetermined atomic parameters

2103: The calculation order list generation step

21031: The molecule selection step

21032: The calculation order determination step

2104: The one-variable equation solving step

21041: The judgment step whether the molecule on the top of calculation order list contains undetermined atomic parameters or not

21042: The undetermined atomic parameter determination step

21043: The calculation error computing step

21044: The step for comparing the calculation error with the acceptable error

21045: The setting afresh step of undetermined atomic parameter

21046: Calculation order list update step

21047: Calculation order list termination judging step

2105: The atomic parameters update step

21051: The atomic parameter expression formula update step

21052: The step for tentatively determining some or all of undetermined atomic parameters.

21053: The sorting up step of undetermined molecules by the number of undetermined atomic parameters

21054: The sorting down step of molecules with the identical number of undetermined atomic parameters by the number of atomic parameters

21055: The undetermined molecule update step

2106: The atomic parameter calculation termination judging step

2107: Output apparatus

21071: Output of value of determined atomic parameters

2201: The calculation order list generation step

2202: First round process to be executed in the calculation order list generation step

22021: The number of undetermined atomic parameters

22022: Molecule having the number of undetermined atomic parameters of 1 or less

22023: Calculation order list

2203: The one-variable equation solving step

2204: First round process to be executed in the one-variable equation solving step

2205: The atomic parameters update step
2206: First round process to be executed in the atomic parameters update step
22061: Atomic type corresponding to determined atomic parameter
22062: Atomic parameter of atomic type a
22063: Atom, wherein atomic charge is apart from that of other atom belonging to the identical atomic type by certain threshold or more
22064: The number of undetermined atomic parameters
22065: The number of atomic parameters
2207: Second round process to be executed in calculation order list generation step
22071: The number of undetermined atomic parameters
22072: Molecule having the number of undetermined atomic parameters of 1 or less
22073: Calculation order list
2208: Second round process to be executed in the one-variable equation solving step
2209: Second round process to be executed in the atomic parameters update step
22091: Atomic type corresponding to determined atomic parameter
22092: Atomic parameter of atomic type a
2210: "Value assigned" (determined) atom
2211: "Value assigned" (tentatively determined) atom
2212: "Value not assigned" (undetermined) atom
2301: Start
2302: The new setting judgment step of undetermined parameter
2303: Delete process of all calculation order list
2304: Delete process of molecule on the top from a calculation order list
2305: Calculation order list termination judging step
2306: Termination (proceed to the atomic parameters update step).
2307: Termination (proceed to the undetermined atomic parameter determination step).
2401: Atomic parameter value
2402: One value of an atomic attribute
2403: "Value assigned" atom
2404: "Value not assigned" atom
2405: A linear function correlating atomic parameter value with value of an atomic attribute
2406: Value of an atomic attribute of a "value not assigned" atom
2407: Atom having value of tentatively determined atomic parameter set as undetermined atomic parameter as it is
2408: Atom having re-determined atomic parameter, after tentatively determined atomic parameter value being set as undetermined atomic parameter
2409: Three regions based on value of an atomic attribute
2410: A linear function defined in each region
2501: Atomic parameter value.
2502: Atomic charge.
2503: Averaged bond distance.
2504: "Value assigned" atom
2505: "Value not assigned" atom
2506: A linear function correlating atomic parameter value with value of an atomic attribute
2507: Atomic charge and averaged bond distance of a "value not assigned" atom
2508: Atom, which the tentatively determined value became the determined value as it is
2509: Atom, which the tentatively determined value was set as undetermined atomic parameter, and atomic parameter was re-determined
2510: Two regions on a plane formed by atomic charge and averaged bond distance
2511: A linear function defined in each region
2601: The early calculation stage
2602: The last calculation stage
2603: The amount of calculation for molecule n in the prior art
2604: The amount of calculation for molecule n in this invention
2605: The amount of calculation required for calculation of solvent energy in one time
2701: Averaged number of iterations
2702: The amount of calculation in using Embodiment of this invention
2703: The lower bound of the amount of calculation using a gradient-matrix
2801: Input apparatus
28011: Input of acceptable error c
28012: Input of convergence threshold
28013: Input of necessary information and the experimental value for calculation of analysis object
28014: Input of elemental type and value of element attribute for each element
2802: The initialization step
28021: The elemental parameter initialization step
28022: The sorting up step of all analysis objects by the number of undetermined elemental parameters
2803: Calculation order list generation step
28031: The analysis objects selection step
28032: The calculation order determination step
2804: The one-variable equation solving step
28041: The judgment step of whether an analysis object on the top of a calculation order list contains undetermined elemental parameter or not
28042: The undetermined elemental parameter determination step
28043: The calculation error computing step
28044: The step for comparing the calculation error with the acceptable error
28045: The setting afresh step of undetermined elemental parameter
28046: Calculation order list update step
28047: Calculation order list termination judging step
2805: The elemental parameters update step
28051: The elemental parameter expression formula update step
28052: The tentatively determining step of some or all of values of elemental parameters of undetermined element
28053: The sorting up step of undetermined analysis objects by number of undetermined elemental parameters
28054: The sorting down step of analysis objects with the identical number of undetermined elemental parameters by number of elemental parameters
28055: The undetermined analysis object update step
2806: The elemental parameter calculation termination judging step
2807: Output apparatus
28071: Output of determined elemental parameters
2901: Calculation order list generation step
2902: First round process to be executed in calculation order list generation step
29021: The number of undetermined elemental parameters
29022: Analysis object having the number of undetermined elemental parameters of 1 or less
29023: Calculation order list

2903: The one-variable equation solving step
2904: First round process to be executed in the one-variable equation solving step
2905: The elemental parameters update step
2906: First round process to be executed in the elemental parameters update step
29061: Elemental type corresponding to determined elemental parameter
29062: Elemental parameter of the elemental type a
29063: Element, wherein elemental attribute value is apart from that of other element belonging to the identical elemental type by certain threshold or more
29064: The number of undetermined elemental parameters
29065: The number of elemental parameters
2907: Second round process to be executed in calculation order list generation step
29071: The number of undetermined elemental parameters
29072: Analysis object having the number of undetermined elemental parameters of 1 or less
29073: Calculation order list
2908: Second round process to be executed in the one-variable equation solving step
2909: Second round process to be executed in the atomic parameters update step
29091: Elemental type corresponding to determined elemental parameter
29092: Elemental parameter of an elemental type a
2910: "Value assigned" (determined) element
2911: "Value assigned" (tentatively assigned) element
2912: "Value not assigned" (undetermined) element
3001: The input step
3002: The initialization step
3003: The calculation order list generation step
30031: Inner process
30032: The calculation order list display step
30033: The calculation progress display step
3004: The equation solving step
3005: The atomic parameters update step
30051: Inner process
30052: The atomic parameter display step
3006: The termination judging step
3007: The output step
3101: Display object displaying tab
31011: Calculation order list tab
31021: Calculation order list
31022: Up-arrow button
31023: Down-arrow button
31024: Delete button
31025: Confirm button
3102: Calculation order display region
3103: Distribution diagram display region
3104: Molecular structure map display region
3201: Display object displaying tab
32011: Progress tab
3202: Display region of summary of the atomic parameter calculation progress
3203: Display region of the atomic parameter calculation progress for each molecule
3301: Display object displaying tab
33011: Atomic parameter tab
3302: Display region of the atomic parameter determination status
3303: Display region of atomic parameter value It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of implementing a computer simulation to determine elemental parameters utilizable to reproduce, through computer simulated calculation, experimentally measured values of characteristics or properties of a plurality of analysis objects of any of a plurality of kinds of molecules, materials, parts or structures, where each analysis object is composed of one or more elements and each element of each analysis object has a corresponding elemental type of a plurality of elemental types or has one of a plurality of elemental attribute values, the method comprising:

(1) storing input data from an input file into a memory unit, the input data specifying:

(1-1) an acceptable error $\epsilon$ value that corresponds to a maximum acceptable value for a difference between calculated values obtained through simulated calculation and experimental values;

(1-2) a convergence threshold $\tau$ that corresponds to a standard value for judging convergence of calculated values;

(1-3) information necessary for calculating a respective value of each analysis object, and experimental values for each analysis object; and (1-4) each corresponding elemental type for each element of each analysis object, and each elemental attribute value of each element of each analysis object, (2) executing pre-processing operations using the input data stored in the memory unit comprising:

(2-1) initializing a respective elemental parameter value for each element of each analysis object having a corresponding elemental type according to a respective initialization value for the corresponding elemental type and setting a respective elemental parameter value for each element that does not have a corresponding elemental type as undetermined; and (2-2) sorting an arrangement order of the analysis objects from lowest to highest number of elements of each analysis object for which the respective elemental parameter value is undetermined utilizing a respective data set for each of the analysis objects that specifies the respective elemental parameter value of each element for the analysis object;

(3) generating a calculation order list by:

(3-1) selecting each analysis object from the plurality of analysis objects that has no more than one element for which the respective elemental parameter value is undetermined, and (3-2) selecting a first analysis object from the plurality of analysis objects that has no more than one element for which the respective elemental parameter value is undetermined, and (3-3) generating the calculation order list according to the arrangement order of analysis objects;

(4) solving a one-variable equation for the respective value of each analysis object by:

(4-1) where the analysis object at a top of the calculation order list has at least one element for which the respective elemental parameter value is undetermined, iteratively solving the one-variable equation for determination of the undetermined respective elemental parameter values for the elements of the analysis object at the top of the calculation order list until an amount of change between iterations of the respective value for the analysis object according to the respective elemental parameter values is less than the convergence threshold;

(4-2) calculating a calculation error as a difference between the value calculated for said analysis object at the top of the calculation order list using the respective elemental parameter values for the elements of the analysis object and a respective experimental value for the analysis object;

(4-3) comparing an absolute value of said calculation error to said acceptable error;

(4-4) where said calculation error for said analysis object at the top of the calculation order list is greater than the acceptable error, resetting the respective elemental parameter values for one of the elements of the analysis object as an undetermined elemental parameter value and returning to step (4-1); and (4-5) where said calculation error for said analysis object at the top of the calculation order list is equal to or less than the acceptable error, deleting the analysis object from the calculation order; and then, where an analysis object is present on the top of the calculation order list, returning to step (4-1);

(5) updating elemental parameter values by:

(5-1) updating the respective initialization value for each elemental type as a function of the elemental attribute values of the elements having an elemental attribute value and the elemental parameter values determined by solving the one-variable equation for the respective value of each analysis object;

(5-2) determining at least some of the respective elemental parameter values for each element having a corresponding elemental type as a function of the updated respective initialization value for the corresponding elemental type;

(5-3) sorting the arrangement order of the analysis objects from lowest to highest number of elements of each analysis object for which the respective elemental parameter value is undetermined utilizing the respective data set for each of the analysis objects;

(5-4) sorting between the analysis objects in the arrangement order having the same number of elements for which the respective elemental parameter value is undetermined from lowest to highest number of elements of each analysis object utilizing the respective data set for each of the analysis objects;

(5-5) determining whether any of the respective data sets includes one or more undetermined elemental parameter values, and (6) returning to step (3) if any of the respective data sets includes one or more undetermined elemental parameter values, or outputting the respective data sets of the analysis objects for rendering on an output device and terminating if none of the respective data sets includes one or more undetermined elemental parameter values.

2. A method of implementing a computer simulation to determine elemental parameters utilizable to reproduce, through computer simulated calculation, experimentally measured values of characteristics or properties of a plurality of analysis objects of any of a plurality of kinds of molecules, materials, parts or structures, where each analysis object is composed of one or more elements and each element of each analysis object has a corresponding elemental type of a plurality of elemental types or has one of a plurality of elemental attribute values, the method comprising:

(1) storing input data from an input file into a memory unit, the input data specifying:

(1-1) a convergence threshold $\tau$ that corresponds to a standard value for judging convergence of calculated values;

(1-2) for each analysis object, an experimental value or three-dimensional coordinate information of each of the elements of the analysis objects necessary for calculating an experimental value for the analysis object; and (1-3) each corresponding elemental type for each element of each analysis object, and each elemental attribute value of each element of each analysis object, (2) executing pre-processing operations using the input data stored in the memory unit comprising:

(2-1) initializing a respective elemental parameter value for each element of each analysis object having a corresponding elemental type according to a respective initialization value for the corresponding elemental type and setting a respective elemental parameter value for each element that does not have a corresponding elemental type as undetermined; and (2-2) sorting an arrangement order of the analysis objects from lowest to highest number of elements of each analysis object for which the respective elemental parameter value is undetermined utilizing a respective data set for each of the analysis objects that specifies the respective elemental parameter value of each element for the analysis object;

(3) generating a calculation order list by:

(3-1) selecting each analysis object from the plurality of analysis objects that has one element for which the respective elemental parameter value is undetermined, and (3-1) selecting a first analysis object from the plurality of analysis objects that has no more than one element for which the respective elemental parameter value is undetermined, and (3-2) generating the calculation order list according to the arrangement order of the analysis objects (4) solving a one-variable equation for the respective value of each analysis object by:

(4-1) for the analysis object at a top of the calculation order list, iteratively solving the one-variable equation for determination of the undetermined respective elemental parameter values for the elements of the analysis object at the top of the calculation order list until an amount of change between iterations of the respective value for the analysis object according to the respective elemental parameter values is less than the convergence threshold; and (4-2) deleting the analysis object from the calculation order; and then, where an analysis object is present on the top of the calculation order list, returning to step (4-1);

(5) updating elemental parameter values by:

(5-1) updating the respective initialization value for each elemental type as a function of the elemental attribute values of the elements having an elemental attribute value and the elemental parameter values determined by solving the one-variable equation for the respective value of each analysis object;

(5-2) sorting the arrangement order of the analysis objects from lowest to highest number of elements of each analysis object for which the respective elemental parameter value is undetermined utilizing the respective data set for each of the analysis objects;

(5-3) sorting between the analysis objects in the arrangement order having the same number of elements for which the respective elemental parameter value is undetermined from lowest to highest number of elements of each analysis object utilizing the respective data set for each of the analysis objects (5-4) determining whether any of the respective data sets of the analysis objects includes one or more undetermined elemental parameter values, and (6) returning to step (3) if any of the respective data sets includes one or more undetermined elemental parameter values, or outputting the respective data sets of the analysis objects for rendering on an output device and terminating if none of the respective data sets includes one or more undetermined elemental parameter values.

3. A method of implementing a computer simulation to determine atomic parameters utilizable to reproduce, through computer simulated calculation, experimentally measured values of each respective solvation energy of a plurality of kinds of molecules, where each molecule is composed of a plurality of atoms and each atom of each molecule has a corresponding atomic type of a plurality of atomic types or has one of a plurality of atomic attribute values, the method comprising:

(1) storing input data from an input file into a memory unit, the input data specifying:

(1-1) an acceptable energy error $\epsilon$ value that corresponds to a maximum acceptable value for a difference between calculated values of solvation energy obtained through simulated calculation and experimental values of solvation energy;

(1-2) an energy convergence threshold $\tau$ that corresponds to a standard value for judging convergence of calculated values of solvation energy;

(1-3) for each molecule, an experimental value of solvation energy or three-dimensional coordinate information of each of the atoms of the molecules necessary for calculating an experimental value of solvation energy for the molecule; and (1-4) each corresponding atomic type for each atom of each molecule, and an atomic attribute value of each atom of each molecule, (2) executing pre-processing operations using the input data stored in the memory unit comprising:

(2-1) initializing a respective atomic parameter value for each atom of each molecule having a corresponding atomic type according to a respective initialization value for the corresponding atomic type and setting a respective atomic parameter value for each atom that does not have a corresponding atomic type as undetermined; and (2-2) sorting an arrangement order of the molecules from lowest to highest number of atoms of each molecule for which the respective atomic parameter value is undetermined utilizing a respective data set for each of the molecules that specifies the respective atomic parameter value of each atom for the molecule;

(3) generating a calculation order list by:

(3-1) selecting each molecule from the plurality of molecules that has no more than one atom for which the respective atomic parameter value is undetermined, and (3-2) selecting a first molecule from the plurality of molecules that has no more than one atom for which the respective atomic parameter value is undetermined, and (3-3) generating the calculation order list according to the arrangement order of the molecules, (4) solving a one-variable equation for the respective value of each molecule by:

(4-1) where the molecule at a top of the calculation order list has at least one atom for which the respective atomic parameter value is undetermined, iteratively solving the one-variable equation for determination of the undetermined respective atomic parameter values for the atoms of the molecule at the top of the calculation order list until an amount of change between iterations of the respective value of solvation energy for the molecule according to the respective atomic parameter values is less than the energy convergence threshold;

(4-2) calculating a calculation error as a difference between the value of solvation energy calculated for said molecule at the top of the calculation order list using the respective atomic parameter values for the atoms of the molecule and a respective experimental value of solvation energy for the molecule;

(4-3) comparing an absolute value of said calculation error to said acceptable energy error;

(4-4) where said energy calculation error for said molecule at the top of the calculation order list is greater than the acceptable energy error, resetting the respective atomic parameter values for one of the atoms of the m as an undetermined atomic parameter value and returning to step (4-1); and (4-5) where said calculation error for said molecule at the top of the calculation order list is equal to or less than the acceptable energy error, deleting the molecule from the calculation order; and then, where a molecule is present on the top of the calculation order list, returning to step (4-1);

(5) updating atomic parameter values by:

(5-1) updating the respective initialization value for each atomic type as a function of the atomic attribute values of the atoms having an atomic attribute value and the atomic parameter values determined by solving the one-variable equation for the respective value of solvation energy of each molecule;

(5-2) determining at least some of the respective atomic parameter values for each atom having a corresponding atomic type as a function of the updated respective initialization value for the corresponding atomic type;

(5-3) sorting the arrangement order of the molecules from lowest to highest number of atoms of each molecule for which the respective atomic parameter value is undetermined utilizing the respective data set for each of the molecules;

(5-4) sorting between the molecules in the arrangement order having the same number of atoms for which the respective atomic parameter value is undetermined from lowest to highest number of atoms of each molecule utilizing the respective data set for each of the molecules (5-5) determining whether any of the respective data sets of the molecules includes one or more undetermined atomic parameter values, and (6) returning to step (3) if any of the respective data sets includes one or more undetermined atomic parameter values, or outputting the respective data sets of the molecules for rendering on an output device and terminating if none of the respective data sets includes one or more undetermined atomic parameter values.

4. A method of implementing a computer simulation to determine atomic parameters utilizable to reproduce, through computer simulated calculation, experimentally measured values of each respective solvation energy a plurality of kinds of molecules, where each molecule is composed of a plurality of atoms and each atom of each molecule has a corresponding atomic type of a plurality of atomic types or has one of a plurality of atomic attribute values, the method comprising:

(1) storing input data from an input file into a memory unit, the input data specifying:

(1-1) an energy convergence threshold $\tau$ that corresponds to a standard value for judging convergence of calculated values of solvation energy;

(1-3) for each molecule, an experimental value of solvation energy or three-dimensional coordinate information of each of the atoms of the molecules necessary for calculating an experimental value of solvation energy for the molecule; and (1-4) each corresponding atomic type for each atom of each molecule, and an atomic attribute value of each atom of each molecule, (2) executing pre-processing operations using the input data stored in the memory unit comprising:

(2-1) initializing a respective atomic parameter value for each atom of each molecule having a corresponding atomic type according to a respective initialization value for the corresponding atomic type and setting a respective atomic parameter value for each atom that does not have a corresponding atomic type as undetermined; and (2-2) sorting an arrangement order of the molecules from lowest to highest number of atoms of each molecule for which the respective atomic parameter value is undetermined utilizing a respective data set for each of the molecules that specifies the respective atomic parameter value of each atom for the molecule;

(3) generating a calculation order list by:

(3-1) selecting each molecule from the plurality of molecules that has one atom for which the respective atomic parameter value is undetermined, and (3-1) selecting a first molecule from the plurality of molecules that has no more than one atom for which the respective atomic parameter value is undetermined, and (3-2) generating the calculation order list according to the arrangement order of the molecules (4) solving a one-variable equation for the respective value of each molecule by:

(4-1) iteratively solving the one-variable equation for determination of the undetermined respective atomic parameter values for the atoms of the molecule at the top of the calculation order list until an amount of change between iterations of the respective value of solvation energy for the molecule according to the respective atomic parameter values is less than the energy convergence threshold; and (4-2) deleting the molecule from the calculation order; and then, where a molecule is present on the top of the calculation order list, returning to step (4-1);

(5) updating atomic parameter values by:

(5-1) updating the respective initialization value for each atomic type as a function of the atomic attribute values of the atoms having an atomic attribute value and the atomic parameter values determined by solving the one-variable equation for the respective value of solvation energy of each molecule;

(5-2) sorting the arrangement order of the molecules from lowest to highest number of atoms of each molecule for which the respective atomic parameter value is undetermined utilizing the respective data set for each of the molecules;

(5-3) sorting between the molecules in the arrangement order having the same number of atoms for which the respective atomic parameter value is undetermined from lowest to highest number of atoms of each molecule utilizing the respective data set for each of the molecules (5-4) determining whether any of the respective data sets of the molecules includes one or more undetermined atomic parameter values, and (6) returning to step (3) if any of the respective data sets includes one or more undetermined atomic parameter values, or outputting the respective data sets of the molecules for rendering on an output device and terminating if none of the respective data sets includes one or more undetermined atomic parameter values.

5. The method according to claim 3, wherein a user interface is provided with a function that, in generating a calculation order list, upon display of the calculation order list and a selection of one molecule in said calculation order list, an atomic distribution map at a plane formed by atomic charge and averaged bond distance, and a molecular structure map that expresses an atomic parameter determination status of said selected molecule, by a three-dimensional structure of the molecular, and spheres drawn on each atom composing the molecule are displayed in an overlapping manner according to the respective atomic type of an atom of the selected molecule having an undetermined atomic parameter value, and wherein the user interface allows a user to change the calculation order list based on the displayed information by the function.

6. The method according to claim 4, wherein a user interface is provided with a function that, in generating a calculation order list, upon display of the calculation order list and a selection of one molecule in said calculation order list, an atomic distribution map at a plane formed by atomic charge and averaged bond distance, and a molecular structure map that expresses an atomic parameter determination status of said selected molecule, by a three-dimensional structure of the molecular, and spheres drawn on each atom composing the molecule are displayed in an overlapping manner according to the respective atomic type of an atom of the selected molecule having an undetermined atomic parameter value, and wherein the user interface allows a user to change the calculation order list based on the displayed information by the function.

7. The method according to claim 3, wherein a user interface is provided with a function that, in generating a calculation order list, after generation of the calculation order list or after a user executes a re-arrangement or a deletion of molecules in the calculation order list, a summary of a calculation status of the molecule is displayed and the number of atomic parameter values and the number of undetermined atomic parameter values of each molecule are displayed.

8. The method according to claim 4, wherein a user interface is provided with a function that, in generating a calculation order list, after generation of the calculation order list or after a user executes a re-arrangement or a deletion of molecules in the calculation order list, a summary of a calculation status of the molecule is displayed and the number of atomic parameter values and the number of undetermined atomic parameter values of each molecule are displayed.

9. The method according to claim 3, wherein a user interface is provided with a function that, in updating atomic parameters, a number of all atoms of all molecules, a number of atoms having a determined respective atomic parameter values, a number of atoms having a tentatively determined atomic parameter value, and a number of atoms having an undetermined atomic parameter value are displayed by each atomic type, as an atomic parameter determination status of each atomic type, and upon selection of one atomic type, an atomic parameter value of an atom belonging to said atomic type is displayed in a space formed by atomic charge, averaged bond distance and atomic parameter.

10. The method according to claim 3, wherein a user interface is provided with a function that, in updating atomic parameters, a number of all atoms of all molecules, a number of atoms having a determined respective atomic parameter values, a number of atoms having a tentatively determined atomic parameter value, and a number of atoms having an undetermined atomic parameter value are displayed by each atomic type, as an atomic parameter determination status of each atomic type, and upon selection of one atomic type, an atomic parameter value of an atom belonging to said atomic type is displayed in a space formed by atomic charge, averaged bond distance and atomic parameter.

* * * * *